(12) United States Patent
Nishikawa et al.

(10) Patent No.: US 9,008,899 B2
(45) Date of Patent: Apr. 14, 2015

(54) WHEEL BEARING WITH SENSOR

(75) Inventors: Kentarou Nishikawa, Iwata (JP);
Takayuki Norimatsu, Iwata (JP); Toru Takahashi, Iwata (JP)

(73) Assignee: NTN Corporation, Osaka (JP)

( * ) Notice: Subject to any disclaimer, the term of this patent is extended or adjusted under 35 U.S.C. 154(b) by 99 days.

(21) Appl. No.: 13/699,531

(22) PCT Filed: May 19, 2011

(86) PCT No.: PCT/JP2011/061493
§ 371 (c)(1),
(2), (4) Date: Nov. 21, 2012

(87) PCT Pub. No.: WO2011/148846
PCT Pub. Date: Dec. 1, 2011

(65) Prior Publication Data
US 2013/0066517 A1    Mar. 14, 2013

(30) Foreign Application Priority Data

| May 24, 2010 | (JP) | 2010-118248 |
| Jun. 2, 2010 | (JP) | 2010-126668 |
| Jun. 4, 2010 | (JP) | 2010-128657 |
| Jun. 4, 2010 | (JP) | 2010-128658 |

(51) Int. Cl.
*G01M 17/007* (2006.01)
*B21K 1/00* (2006.01)
(Continued)

(52) U.S. Cl.
CPC .......... *G01M 17/007* (2013.01); *F16C 19/186* (2013.01); *F16C 19/522* (2013.01);
(Continued)

(58) Field of Classification Search
CPC ...... G01M 17/007; B21K 1/00; F16C 19/186; F16C 19/522; F16C 2326/02; G01L 5/0019
USPC ................... 701/34.4; 29/898; 73/1.15, 760
See application file for complete search history.

(56) References Cited

U.S. PATENT DOCUMENTS 6,849,973 B2    2/2005  Kurosawa et al.
7,762,128 B2    7/2010  Ozaki et al.
(Continued)

FOREIGN PATENT DOCUMENTS

JP    2003-530565    10/2003
JP    2004-15889     1/2004
(Continued)

OTHER PUBLICATIONS

International Search Report of Corresponding PCT Application PCT/JP2011/061493 mailed Aug. 9, 2011.
(Continued)

*Primary Examiner* — John Q Nguyen
*Assistant Examiner* — Anshul Sood

(57) ABSTRACT

A sensor equipped wheel support bearing assembly having good assemblability with a compact structure and capable of accurately detecting load acting on a bearing of a vehicle wheel is provided. One of an outer member and an inner member that serves as a stationary member has a vehicle body fitting flange to be fitted to a knuckle. One or more load detecting sensor unit is provided on the stationary member and includes a strain generating member having two or more contact fixing segments fixed to the stationary member, and one or more sensors fitted to the strain generating member for detecting a strain occurring in the strain generating member. A circuit fixing stay is provided on a side face of the vehicle body fitting flange and a calculation processing circuit is fitted to this stay for calculating and processing an output signal of the sensor.

19 Claims, 45 Drawing Sheets

(51) Int. Cl.

| | | |
|---|---|---|
| *F16C 19/18* | (2006.01) | |
| *F16C 19/52* | (2006.01) | |
| *G01L 5/00* | (2006.01) | |
| *B60B 27/00* | (2006.01) | |
| *G01L 25/00* | (2006.01) | |

(52) U.S. Cl.
CPC ........... *F16C2326/02* (2013.01); *G01L 5/0019* (2013.01); *B21K 1/00* (2013.01); *B60B 27/0068* (2013.01); *B60B 27/0005* (2013.01); *G01L 25/00* (2013.01)

(56) References Cited

U.S. PATENT DOCUMENTS

| | | | |
|---|---|---|---|
| 7,926,362 | B2 | 4/2011 | Andersson et al. |
| 2004/0051404 | A1 | 3/2004 | Kurosawa et al. |
| 2009/0114004 | A1* | 5/2009 | Ozaki et al. ................. 73/117.01 |
| 2009/0301221 | A1 | 12/2009 | Andersson et al. |
| 2010/0129016 | A1* | 5/2010 | Isobe et al. .................... 384/448 |
| 2011/0185823 | A1 | 8/2011 | Nishikawa et al. |
| 2011/0209562 | A1* | 9/2011 | Ono et al. ................. 73/862.045 |
| 2012/0192636 | A1* | 8/2012 | Norimatsu et al. ......... 73/115.07 |
| 2012/0229004 | A1* | 9/2012 | Takahashi et al. .......... 310/67 R |
| 2013/0223778 | A1* | 8/2013 | Takahashi et al. ............ 384/448 |
| 2014/0086517 | A1* | 3/2014 | Norimatsu et al. ............ 384/448 |

FOREIGN PATENT DOCUMENTS

| | | |
|---|---|---|
| JP | 2006-194221 | 7/2006 |
| JP | 2007/239848 | 9/2007 |
| JP | 2008-185496 | 8/2008 |
| JP | 2008-185497 | 8/2008 |
| JP | 2008-542735 | 11/2008 |
| JP | 2010-112419 | 5/2010 |
| JP | 2011-89604 | 5/2011 |
| WO | WO 01/77634 A2 | 10/2001 |
| WO | WO 2006/128878 A1 | 12/2006 |
| WO | WO 2010/044228 A1 | 4/2010 |
| WO | WO 2010/052864 A1 | 5/2010 |

OTHER PUBLICATIONS

Japanese Office Action issued Nov. 19, 2013 in corresponding Japanese Patent Application No. 2010-128657.

Japanese Notification of Reasons for Rejection issued Mar. 11, 2014, in corresponding Japanese Patent Application No. 2010-118248.

Japanese Notification of Reasons for Rejection issued Mar. 11, 2014, in corresponding Japanese Patent Application No. 2010-128658 English.

Chinese Office Action issued Aug. 4, 2014 in corresponding Chinese Patent Application No. 201180025686.4.

PCT Preliminary Report on Patentability issued Dec. 10, 2012 in corresponding PCT Application No. PCT/JP2011/061493.

* cited by examiner

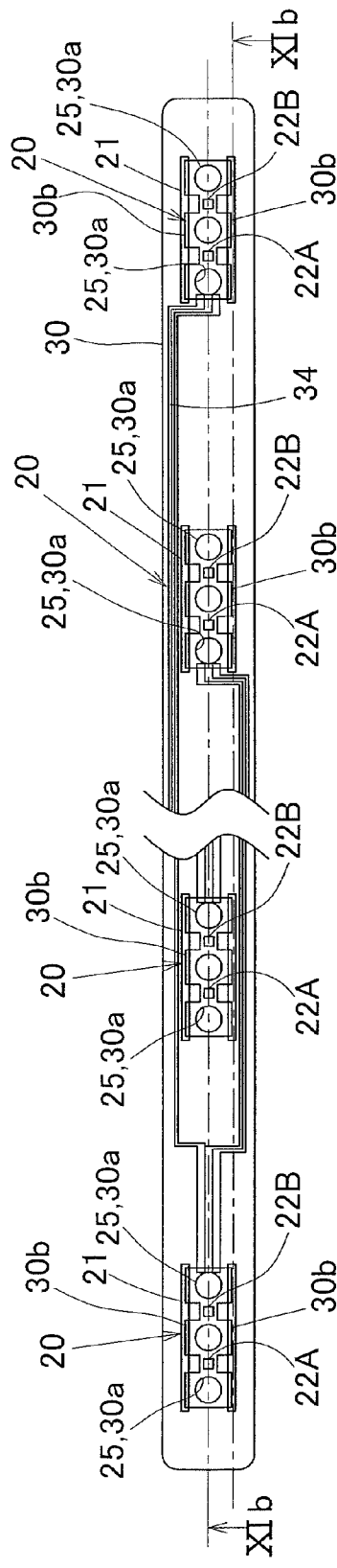

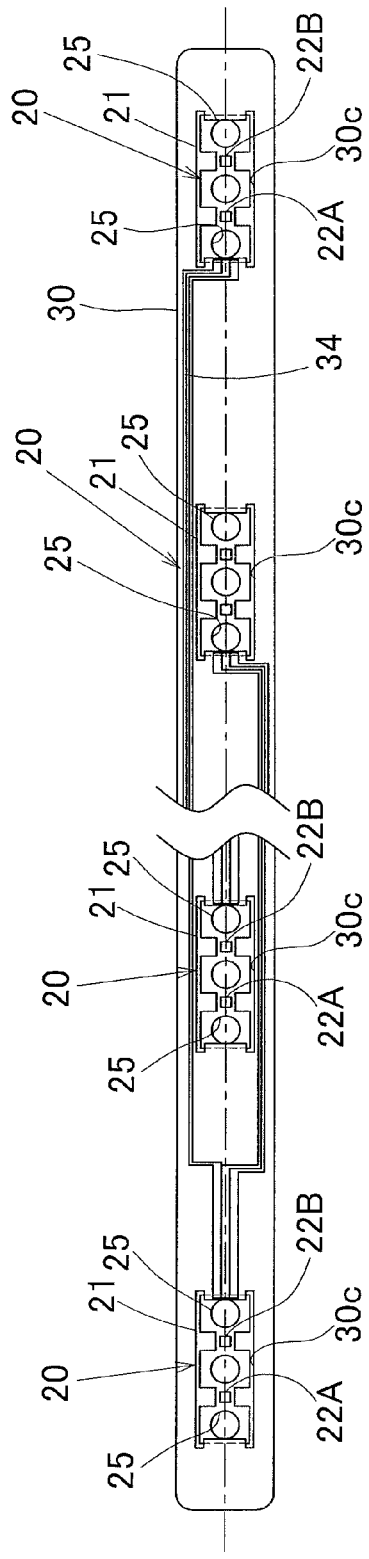
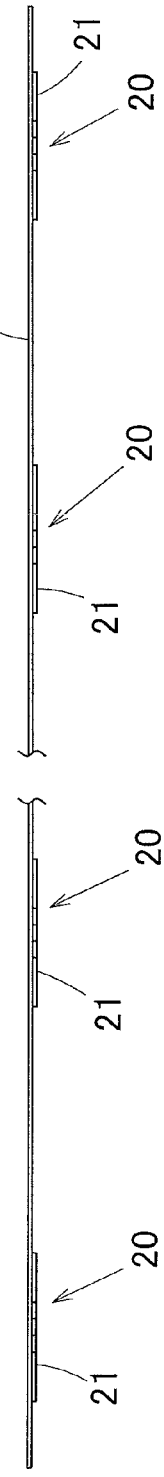

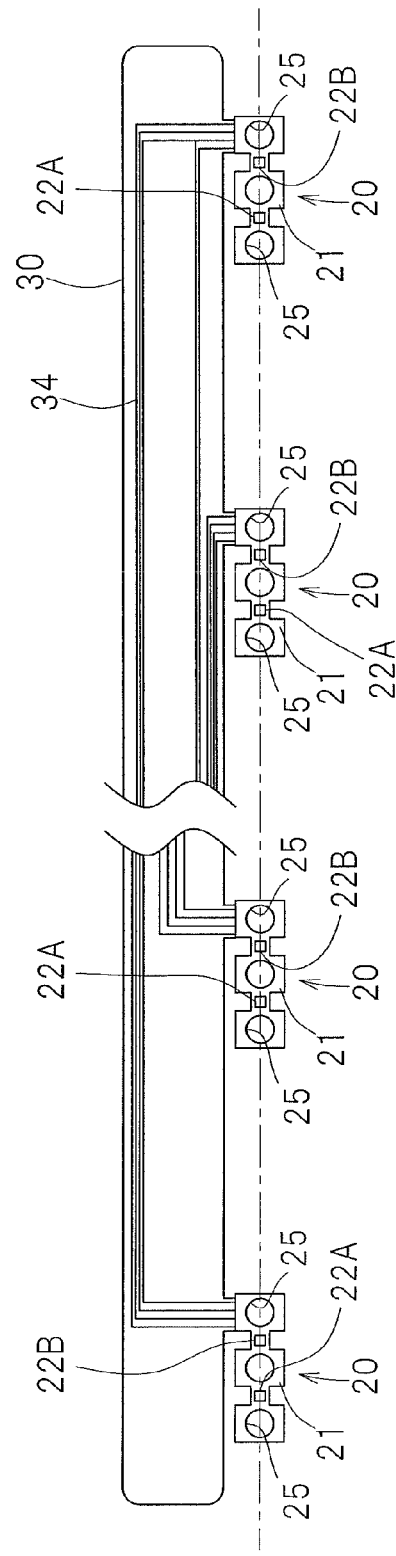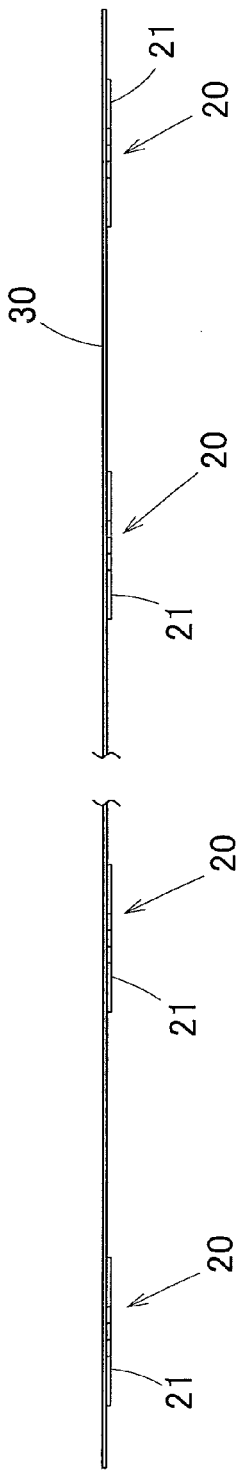
Fig. 13A
Fig. 13B

Fig. 14
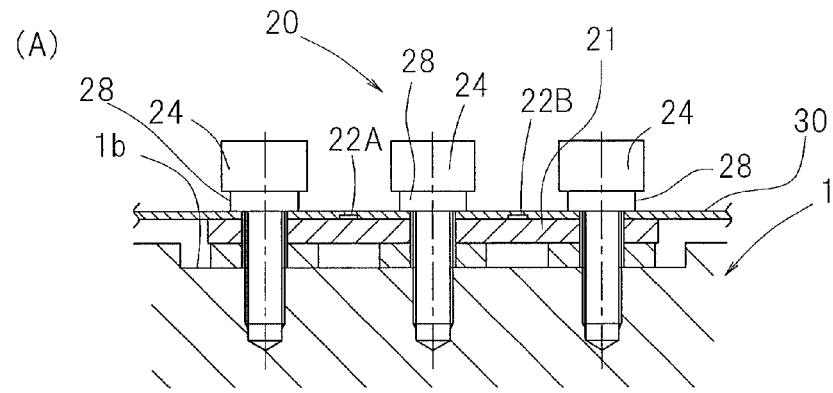
(A)
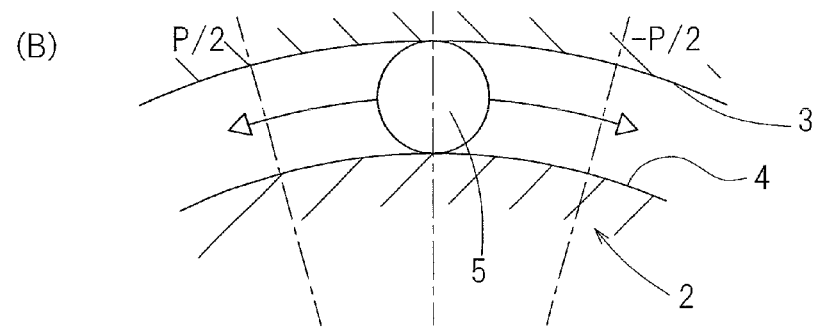
(B)
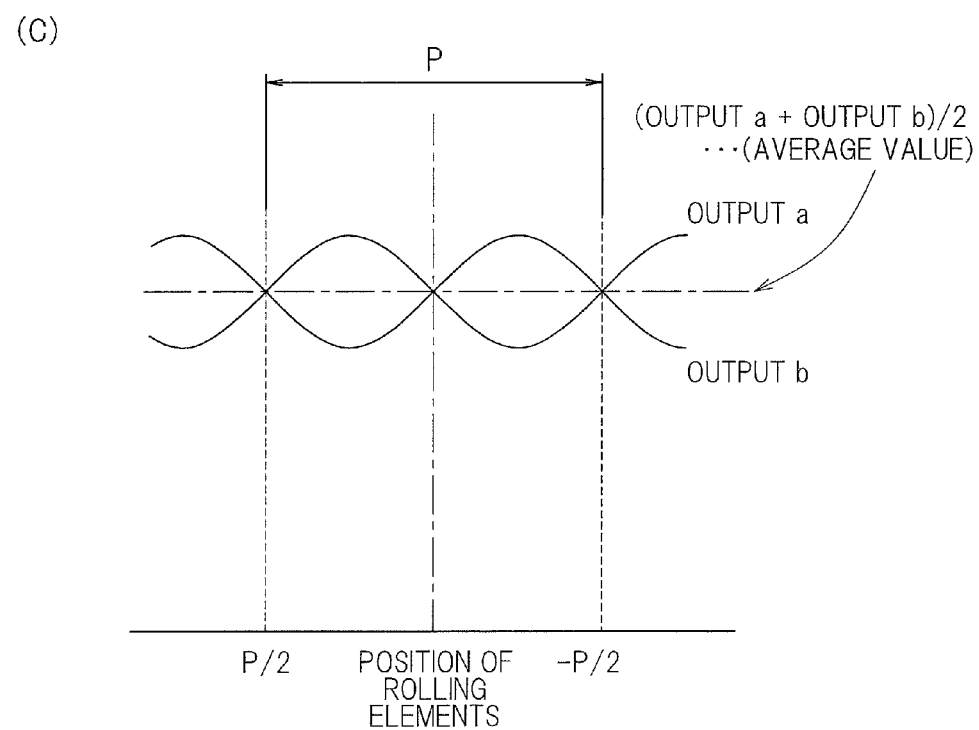
(C)

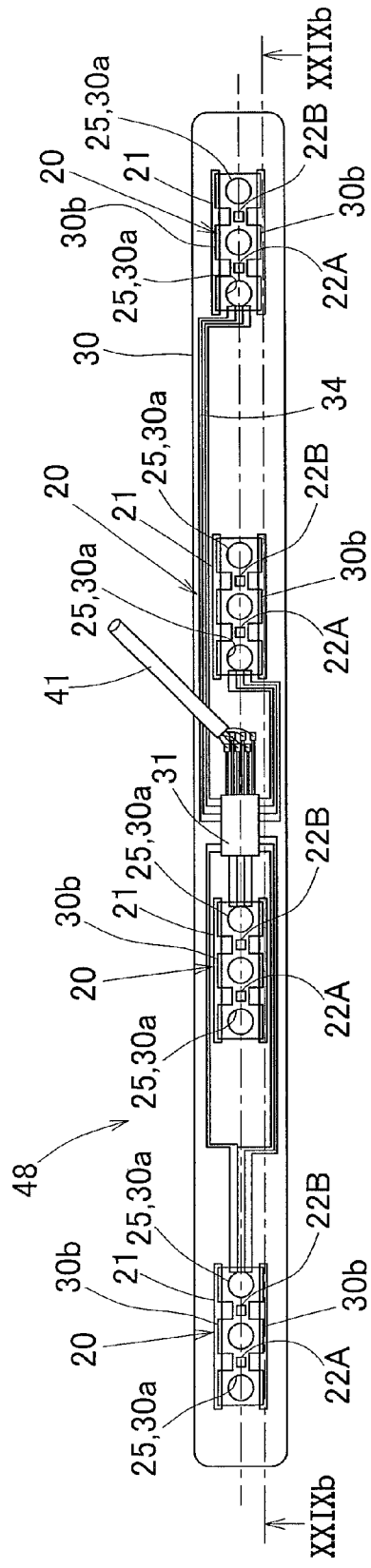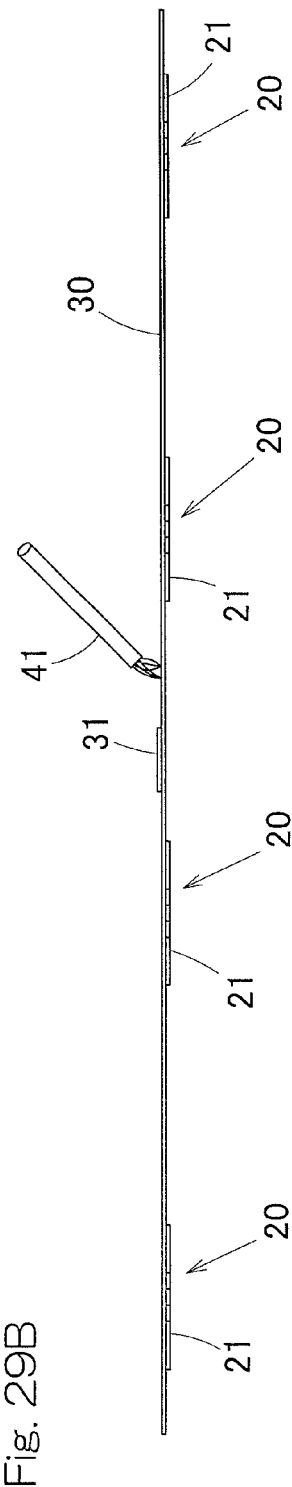

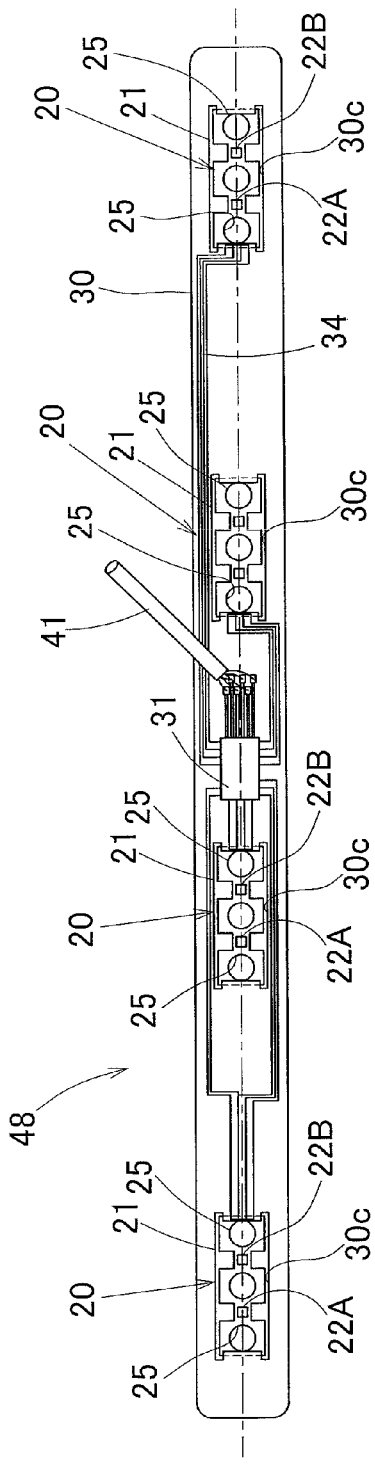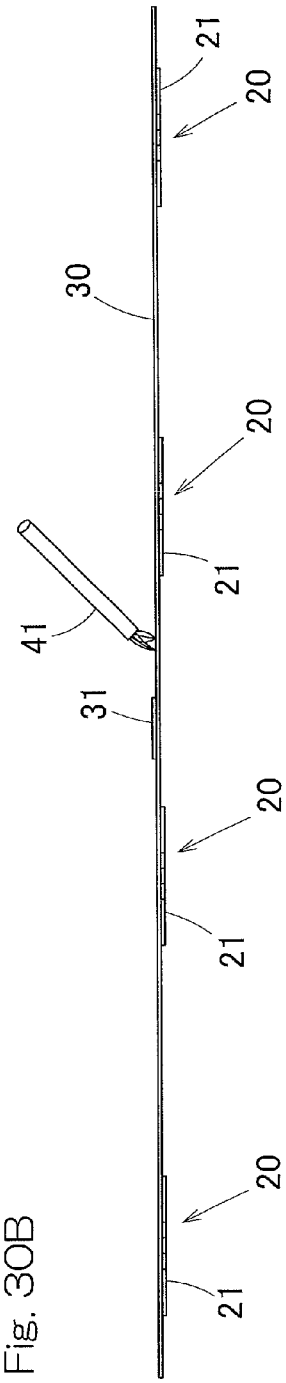
Fig. 30A
Fig. 30B

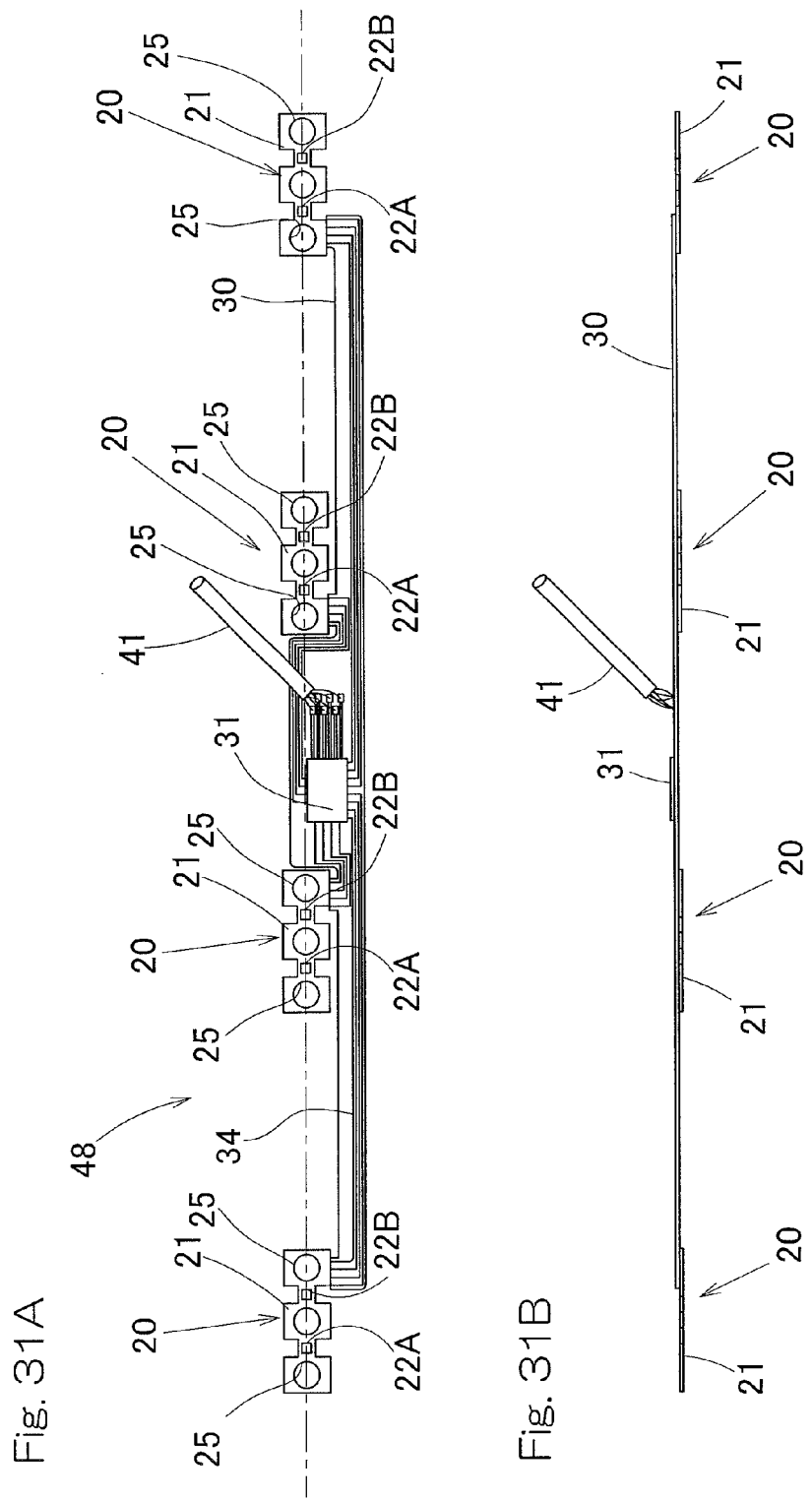

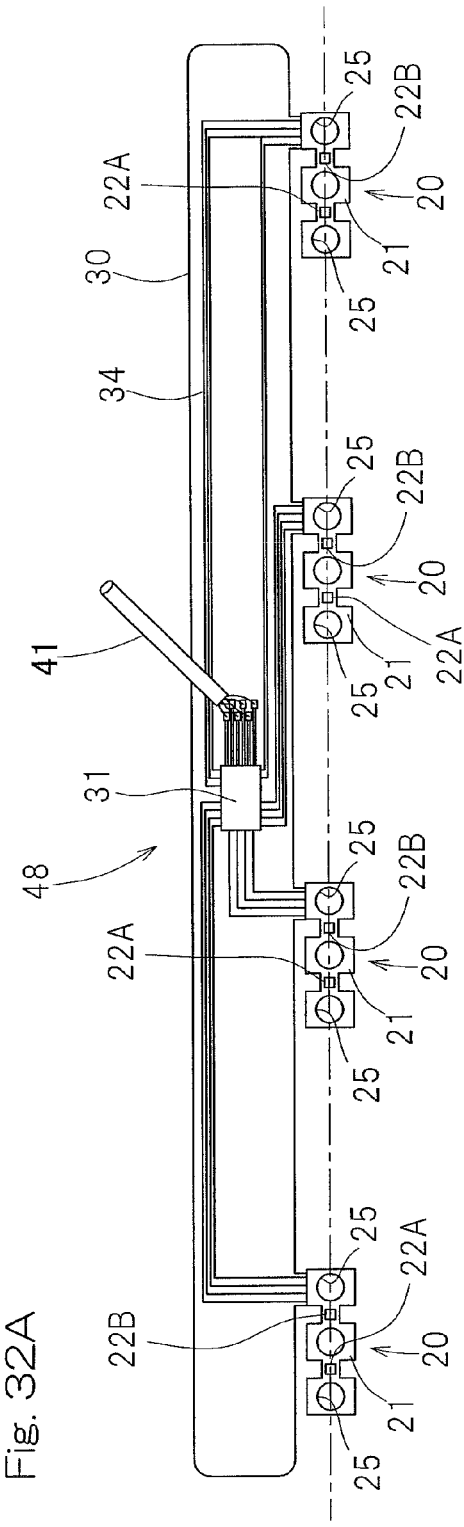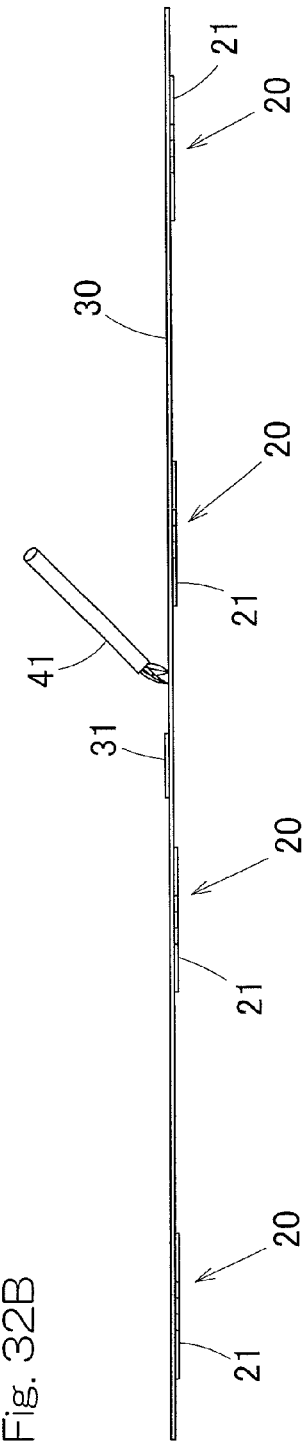

WHEEL BEARING WITH SENSOR

CROSS REFERENCE TO RELATED APPLICATIONS

This application is a U.S. national stage application of PCT/JP2011/061493 filed May 19, 2011 and claims the foreign priority benefit of Japanese Applications No. 2010-118248, filed May 24, 2010, No. 2010-126668, filed Jun. 2, 2010, No. 2010-128657, filed Jun. 4, 2010, and No. 2010-128658, filed Jun. 4, 2010, in the Japanese Intellectual Property Office, the contents of all of which are incorporated herein by reference.

BACKGROUND OF THE INVENTION

1. Field of the Invention

The present invention relates to a sensor equipped wheel support bearing assembly having a load sensor built therein for detecting a load acting on a bearing portion of a vehicle wheel.

2. Description of Related Art

As a technique to detect the load acting on each of vehicle wheels of an automotive vehicle, a sensor equipped wheel bearing assembly has been suggested in, for example, the patent document 1 listed below. This suggested sensor equipped wheel support bearing assembly includes, as shown in FIG. 42 of the accompanying drawings, a strain gauge 91 affixed to an outer ring 90, which is a stationary ring, of a wheel support bearing assembly so that a strain can be detected to detect the load.

Also, the patent document 2 listed below suggests a calculating method of estimating the load acting on the vehicle wheel from an output signal of a plurality of strain sensors affixed to the vehicle wheel.

PRIOR ART DOCUMENT

[Patent Document 1] JP Laid-open Patent Publication No. 2003-530565
[Patent Document 2] JP Laid-open Patent Publication No. 2008-542735
[Patent Document 3] JP Laid-open Patent Publication No. 2008-185496
[Patent Document 4] JP Laid-open Patent Publication No. 2008-185497

SUMMARY OF THE INVENTION

Where the load acting on the vehicle wheel is measured with the use of the strain sensor or sensors such as disclosed in the patent documents 1 and 2, a problem arises in connection with the drift occurring in the sensor as a result of the environmental temperature or the initial drift brought about by a strain induced upon fitting of a sensor unit.

The drift resulting from the strain upon fitting of the sensor unit can be eliminated if an offset adjustment is carried out in a condition with the strain sensor installed and the amount of change from such position is converted as a signal output to allow a strain signal to be accurately detected.

As a load estimating means afforded to have an offset function of the sensor output signal referred to above, the load estimating means such as shown in FIGS. 43 to 45 of the accompanying drawings in respective block diagrams may be contemplated. The sensor unit 110 in this example is made up of a strain generating member, affixed to an outer ring, which is a stationary ring, of the wheel support bearing assembly, and a strain sensor fixed to this strain generating member.

The load estimating means shown in FIG. 43 includes an amplifier circuit 101, an offset adjusting circuit 102, a storage unit 103, a various correcting circuit 104, a signal output circuit 106, and a control circuit 107. The control circuit 107 controls the offset adjusting circuit 102, the storage unit 103, the correcting circuit 104 and the signal output circuit 106 and, also, digitalize a sensor output signal, which has been subjected to a pre-processing such as, for example, offset adjustment, by means of an analog-to-digital converter 108 (shown in FIG. 45) having a resolving power of about 12 to 16 bits and, then, estimates the load, acting on the wheel support bearing assembly, through its load calculating function on the basis of the digitalized sensor output signal. The offset adjusting circuit 102 is for adjusting to a regular value the initial offset of the sensor unit 110 and/or the offset resulting from the fixing of the wheel support bearing assembly, and the adjustment by the control circuit 107 or the adjustment in response to a command from an external source is enabled.

An example of the detailed circuit connection of the sensor unit 110, the amplifying circuit 101 and the offset adjusting circuit 102 is shown in FIG. 44. The offset adjusting circuit 102 is configured as an adder including an operational amplifier OP, resistors R3 and R4 and variable resistors VR1 and VR2. In this case, so that the sensor output may exhibit a rated value (zero point voltage) after the completion of assemblage of the sensor equipped wheel support bearing assembly, respective resistances of the variable resistors VR1 and VR2 are adjusted and then fixed.

However, in order for the circuit configuration of the load estimating means, shown in and described with reference to FIG. 43, to cover for the extend of the strain resulting from the fitting of the sensor unit 110 and characteristic fluctuation of the sensor element Rg (shown in FIG. 44), it is necessary for the circuit to have a large latitude of adjustment of a significant offset along with the requirement of an adjusting step and this leads to an increase of the manufacturing cost. Also, in the event of a significant offset fluctuation occurring during a long term operation, the amplifier circuit 101 in the subsequent stage may be saturated depending on the magnitude thereof, making it difficult to detect the load.

Also, as shown in FIG. 45, if the number of strain sensors 111 mounted on the outer ring 120 of the bearing assembly is increased, the number of the pre-processing circuit including the amplifier circuit 101 and the offset adjusting circuit 102 increase as is the case with the number of the elements, and, therefore, the size of a circuit substrate is increased, thus making it difficult to mount the circuit substrate on the bearing outer ring 120. For this reason, the pre-processing circuit must be installed at a site distant from the bearing assembly and a technique of transmitting the sensor output signal is taken, but in such case the number of cables tends to increase and a thick wiring must extend from underbody components to a body side is correspondingly required, resulting in a reduction in workability and reliability. In addition, since a feeble sensor output signal is routed through a long wiring, there has been recognized a problem in the increase of influences brought about noises.

In view of the above, it may be contemplated to install an analog-to-digital converter 108, as shown in FIG. 45, on the outer ring 120 of the bearing assembly, as shown in FIG. 46 or 47, to thereby reduce the number of wirings. In such case, however, it is necessary for the analog-to-digital converter 108 to be installed for each of the sensor units 110, resulting in the increase of costs. Although in FIG. 46 or FIG. 47 illustrate the case, in which one analog-to-digital converter 108 is commonly shared with the two sensor units 110, or the case in which one analog-to-digital converter 108 is commonly shared with the four sensor units 110, respectively, a new problem arises about how the analog-to-digital converter 108 is specifically fixed. By way of example, where the analog-to-digital converter 108 is provided on a cylindrical portion outer peripheral surface of the outer ring 120, although a pedestal similar to that used for fitting the sensor unit on an outer diametric surface of the outer ring 120 need be provided, this result in left and right portions and upper and lower portions of a cylindrical portion of the outer ring 120, which are asymmetric to each other and, therefore, sensor output signals of a plurality of strain sensors, which will become component parts of the sensor units 110 become complicated. In the case of a configuration in which a protective covering is provided on the outer periphery of the outer ring 120, it may be contemplated that the analog-to-digital converter 108 is fixed to the protective covering. In this case, however, wiring of the circuit must be carried out at the time the protective covering is fitted and, therefore, the assemblability of the bearing assembly tends to be worsen.

As discussed above, when the above described analog-to-digital converter and other are to be added to a calculation processing circuit for processing the sensor output signals, a new problem arises as to how the calculation processing circuit should be installed. In other words, as a first problem, where the above described calculation processing circuit is to be fitted directly to the bearing outer ring, the pedestal for calculation processing circuit fitting purpose need be provided, but this may results in that the sensor output signals relative to the load does not become line symmetric relative to the bearing assembly and, hence, the load cannot be accurately detected. Also, as a second problem, the calculation processing circuit is susceptible to thermal influences brought about by the outer ring as a result of the direct contact taking place between it and the bearing outer ring and, therefore, from this aspect the load cannot be accurately detected. In addition, as a third problem, if the circuit substrate of the calculation processing circuit is fitted to the bearing outer ring with no modification applied, there is a high risk that the circuit substrate may be damaged under the influence of vibrations and others.

An object of the present invention is therefore intended to provide a sensor equipped wheel support bearing assembly of a compact structure, which makes use of the calculation processing circuit and others that are good in assemblability and is capable of accurately detecting a load acting on a bearing section of a vehicle wheel.

In order to accomplish the foregoing object of the present invention, there is provided a A wheel support bearing assembly for rotatably supporting a vehicle wheel relative to an automotive vehicle body, which bearing assembly comprising: an outer member having an inner periphery formed with a plurality of rows of rolling surfaces; an inner member having an outer periphery formed with rolling surfaces that are held in face to face relation with the rolling surfaces of the outer member; a plurality of rows of rolling elements interposed between the rolling surfaces in the outer and inner members that are held in face to face relation with each other; a vehicle body fitting flange to be fitted to a knuckle provided in an outer periphery of one of the outer and inner members that serves as a stationary member; one or more sensor units for detecting a load provided on an outer diametric surface of the stationary member, each of the load detecting sensor units including a strain generating member, having two or more contact fixing segments that are to be fixed to the stationary member in contact therewith, and also including one or more sensors fitted to the strain generating member for detecting a strain occurring in the strain generating member; a calculation processing circuit for calculating and processing an output signal of the sensor, the calculation processing circuit being fitted to a side face of the vehicle body fitting flange through a circuit fixing stay or fitted directly to the side face of the vehicle body fitting flange with being mounted on an arcuate circuit substrate. In this case, the stationary member referred to above is, for example, the outer member of the bearing section.

When a load acts on the wheel support bearing assembly or between a tire of the automotive vehicle and the road surface, such load is applied also to the stationary member of the wheel support bearing assembly (for example, the outer member), resulting in a deformation. Since the strain generating member in the sensor unit is fixed to the stationary member in contact therewith, a strain occurring in the stationary member is, after having been amplified, transmitted and such strain is detected by the sensor with high sensitivity and, therefore, the load can be estimated with a high accuracy. In particular, since the circuit fixing stay is provided on the side face of the vehicle mounting flange in the stationary member and the calculation processing circuit for calculating and processing the sensor output signal of the sensor unit is fitted to the circuit fixing stay, the calculation processing circuit including, for example, an analog-to-digital converter can be fitted with a compact structure with no need to cause the shape of a peripheral surface of the cylindrical portion of the stationary member to change, the assemblability is good and the load acting on the bearing section of the vehicle wheel can be accurately detected.

In the present invention, the circuit fixing stay referred to above may be a press molded article of a steel plate having a corrosion resistance or a press molded article of a steel plate which is plated with metal or painted. When so constructed, it is possible to avoid an undesirable raise of fitting sites of the calculation processing circuit, which would be caused in the presence of rusting in the circuit fixing stay, and also to prevent the calculation processing circuit from being adversely affected by adopted rusting and, therefore, an undesirable erroneous operation in the calculation processing as a result of the presence of rusting can be eliminated.

In the present invention, the circuit fixing stay and the calculation processing circuit may be integrally molded with resin. Even in this case, it is possible to avoid an undesirable raise of fitting sites of the calculation processing circuit, which would be caused in the presence of rusting in the circuit fixing stay, and also to prevent the calculation processing circuit from being adversely affected by adopted rusting and, therefore, an undesirable erroneous operation in the calculation processing as a result of the presence of rusting can be eliminated.

In the present invention, the circuit fixing stay may be the one molded with resin. In this case, the calculation processing circuit may be insert molded in the circuit fixing stay. Even in this case, it is possible to avoid an undesirable raise of fitting sites of the calculation processing circuit, which would be caused in the presence of rusting in the circuit fixing stay, and also to prevent the calculation processing circuit from being adversely affected by adopted rusting and, therefore, an undesirable erroneous operation in the calculation processing as a result of the presence of rusting can be eliminated. If the calculation processing circuit is insert molded in the circuit fixing stay, a work of fitting the calculation processing circuit to the circuit fixing stay can be dispensed with.

In the present invention, the calculation processing circuit referred to above may include an analog-to-digital converter for effecting an analog-to-digital conversion of the output of the sensor.

In the present invention, the calculation processing circuit referred to above may include an offset adjusting circuit for adjusting an offset of the sensor to a regular value and an amplifying circuit for amplifying the output signal of the sensor.

In the present invention, the calculation processing circuit referred to above may include a load estimating unit for estimating a load acting on the vehicle wheel from the output signal of the sensor.

In the present invention, the calculation processing circuit referred to above may include a first load estimating unit for estimating a load acting on a wheel support bearing assembly with the use of an average value of the output signal of the sensor, a second load estimating unit for estimating a load acting on the wheel support bearing assembly with the use of an amplitude value of the output signal of the sensor or the amplitude value and the average value, and a selector output unit for switching, selecting and outputting an estimated load value of one of the first and second load estimating units. In the case of this construction, the detecting time required to complete the detection can be reduced if the estimated load value of the first load estimating unit, which is obtained from the average value that is determined without being subjected to a time averaging process at the time of the halt or a low speed condition of the automotive vehicle. Also, since when the vehicle wheel is in a condition rotating normally, the average value and the amplitude value of the sensor output signal can be calculated accurately, outputting of the estimated load value of the second load estimating unit, which is obtained from the amplitude or from the average value and the amplitude value, is effective to minimize an error in the estimated load value and the detection delay time can also be reduced sufficiently.

As a result, the load acting on the vehicle wheel can be accurately estimated and the detected load signal can be outputted with no delay. For this reason, the response in control of the automotive vehicle and the controllability of the automotive vehicle, which utilize the load signal thereof, increase and a further safe traveling stability can be increased.

In this case, the sensor unit may include three or more contact fixing segments and two sensors, the two sensors being fitted between the neighboring first and second contact fixing segments and the neighboring second and third contact fixing segments, respectively, the spacing between the neighboring contact fixing segments or between the neighboring sensors in a circumferential direction of the stationary member being chosen to be {½+n (in which n represents an integer)} of an arrangement pitch of the rolling elements, the first and second load estimating units utilizing the sum of the respective output signals of the two sensors as the average value.

In the present invention, a toric protective covering may be fitted to a peripheral surface of the stationary member in a fashion coaxial with the stationary member, in which case the sensor unit and the calculation processing circuit are enclosed by the protective covering. In the case of this construction, the sensor unit and the calculation processing circuit can be enclosed by the protective covering and the load acting on the wheel support bearing assembly or the tire tread can be accurately detected for a prolonged period of time while any trouble in the sensor unit and/or the calculation processing circuit, which would be otherwise brought about because of the outside environment, is prevented. By way of example, the sensor unit and the calculation processing circuit can be assuredly protected from gravel stones scattered from the outside, muddy water and/or saline water.

In the present invention, the calculation processing circuit may have fitted thereto a signal cable for drawing a signal, which has been processed by the calculation processing circuit, to an outside of a bearing section, in which case a cylindrical portion of the protective covering on an outboard side of the vehicle body fitting flange is provided with a perforated portion through which a draw-out portion of the signal cable is drawn outwardly and in which a portion through which the signal cable draw-out portion is drawn outwardly from the perforated portion is applied with a sealing material. In the case of this construction, the sealability of the protective covering can be further increased and a displacement of the signal cable in the circumferential direction can also be regulated.

In the present invention, the calculation processing circuit may have fitted thereto a signal cable for drawing a signal, which has been processed by the calculation processing circuit, to an outside of a bearing section, in which case a cylindrical portion of the protective covering on an outboard side of the vehicle body fitting flange is provided with a perforated portion through which a draw-out portion of the signal cable is drawn outwardly from the protective covering and in which a portion through which the signal cable draw-out portion is drawn outwardly from the perforated portion is provided with a bushing made of an elastic material. Even in this case, the sealability of the protective covering can be further increased and a displacement of the signal cable in the circumferential direction can also be regulated.

In the present invention, the calculation processing circuit may have fitted thereto a signal cable for drawing a signal, which has been processed by the calculation processing circuit, to an outside of a bearing section, in which case a cylindrical portion of the protective covering on an outboard side of the vehicle body fitting flange is provided with a perforated portion through which a draw-out portion of the signal cable is drawn outwardly and in which a portion, through which the signal cable draw-out portion is drawn outwardly from the perforated portion, is applied with a sealing material, which has been subjected to a rust proofing treatment and is also provided with a bushing made of an elastic material. In the case of this construction, since the sealing material and the bushings are redundantly employed, the sealability of the protective covering can be further increased.

In the present invention, a flexible substrate may be fitted to a peripheral surface of the stationary member in a fashion coaxial with the stationary member, in which case the calculation processing circuit is formed integrally with this flexible substrate. In this case, a work of connecting the flexible substrate with the calculation processing circuit can be dispensed with.

In the present invention, the flexible substrate fitted to a peripheral surface of the stationary member in a fashion coaxial with the stationary member may have the sensor unit fitted to this flexible substrate. If the sensor unit is fitted to the flexible substrate, fitting of the sensor unit becomes easy to accomplish.

In the present invention, the four sensor units may be equidistantly disposed on an upper surface area, a bottom surface area, a right surface area and a left surface area, which will be an upper position, a lower position, a left position, and a right position relative to a tire tread, respectively, of the outer diametric surface of the outer member with a phase difference of 90° from each other in a circumferential direction of such outer diametric surface. If the four sensor units are so arranged as described above, the vertically acting load Fz acting on the wheel support bearing assembly, the load Fx due to become the driving force or the braking force and the axially acting load Fy can be estimated.

In the present invention, a surface treatment having a corrosion resistance or a corrosion preventive capability may be applied to a peripheral surface of the stationary member, where the flange is provided. The surface treatment in this case is, for example, a metal plating or painting or coating treatment. Where in this way the surface treatment having the corrosion resistance or the corrosion preventive capability is applied to the peripheral surface on which the flange of the stationary member is provided, it is possible to avoid an undesirable raise of fitting sites of the sensor unit, which would be caused in the presence of rusting in the peripheral surface of the stationary member, and also to prevent the sensor unit from being adversely affected by adopted rusting and, therefore, an undesirable erroneous operation in the sensor as a result of the presence of rusting can be eliminated and the load detection can be performed accurately for a further prolonged period of time.

The method of assembling the sensor equipped wheel support bearing assembly in accordance with the present invention is method of assembling a sensor equipped wheel support bearing assembly, in which in a condition the stationary member stands alone or in a condition in which the rolling elements have been assembled into the stationary member, the sensor units are fitted to a peripheral surface of the stationary member and, after the protective covering has been fitted to the peripheral surface of the stationary member, the bearing section is assembled. According to this assembling method, the sensor equipped wheel support bearing assembly having the sensor unit and the protective covering fitted to the stationary member can be easily assembled.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 11A is a developed plan view showing, with a portion broken away, one example of a flexible substrate;

FIG. 11B is a cross sectional view taken along the line XIb-XIb in FIG. 11A;

FIG. 12A is a developed plan view showing, with a portion broken away, another example of a flexible substrate;

FIG. 12B is a cross sectional view thereof;

FIG. 13A is a developed plan view showing, with a portion broken away, a further example of a flexible substrate;

FIG. 13B is a cross sectional view thereof;

FIG. 14 shows explanatory diagrams (A) to (C) showing how positions of rolling elements affect an sensor output signals;

FIG. 29A is a developed plan view showing one example of the flexible substrate;

FIG. 29B is a cross sectional view taken along the line XXIXb-XXIXb in FIG. 29A;

FIG. 30A is a developed plan view showing another example of the flexible substrate;

FIG. 30B is a sectional view thereof;

FIG. 31A is a developed plan view showing a further example of the flexible substrate;

FIG. 31B is a sectional view thereof;

FIG. 32A is a developed plan view showing a still further example of the flexible substrate;

FIG. 32B is a sectional view thereof;

DESCRIPTION OF THE EMBODIMENTS

A first embodiment of the present invention will be described in detail with particular reference to FIGS. 1 to 18. This first embodiment is applied to a wheel support bearing assembly of a third generation, inner ring rotating type that is used to support a vehicle drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
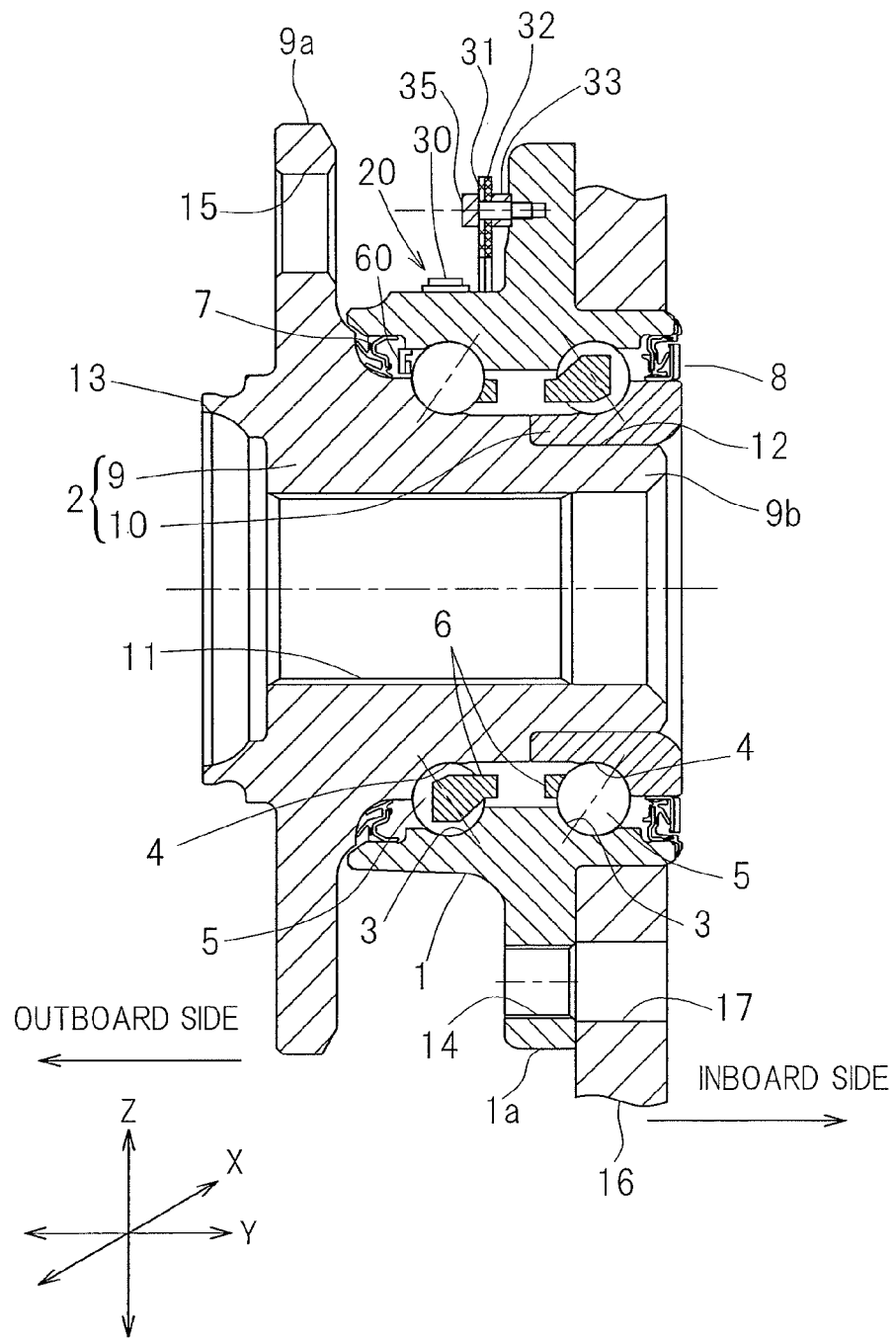
FIG. 1 is a longitudinal sectional view of a sensor equipped wheel support bearing assembly designed in accordance with a first embodiment of the present invention.

A bearing section in this sensor equipped wheel support bearing assembly includes, as best shown in FIG. 1, an outer member 1 having a inner periphery formed with a plurality of rolling surfaces 3 defined therein, an inner member 2 having an outer periphery formed with rolling surfaces 3 in face to face relation with the rolling surfaces 4, and a plurality of rolling elements 5 interposed between the rolling surfaces 3 in the outer member 1 and the rolling surfaces 4 in the inner member 2. This wheel support bearing assembly is rendered to be a double row angular contact ball bearing type, in which the rolling elements 5 are in the form of balls that are retained by a retainer 6 employed for each row of the balls. The rolling surfaces 3 and 4 represent an arcuately sectioned shape with respective ball contact angles held in back-to-back relation to each other. An annular bearing space delimited between the outer member 1 and the inner member 2 has its opposite open ends sealed by respective sealing members 7 and 8.

The outer member 1 serves as a stationary member and is of one piece construction including a vehicle body fitting flange 1a, adapted to be fitted to a knuckle 16 forming a part of a suspension system (not shown) of an automotive vehicle body structure. The flange 1a is formed with an internally threaded hole 14 defined at a plurality of circumferential locations thereof for securement to the knuckle and, hence, the vehicle body fitting flange 1a can be fitted to the knuckle 16 by inserting a corresponding knuckle bolt (not shown) in a bolt insertion hole 17, defined in the knuckle 16, from an inboard side and then firmly threading such bolt into the internally threaded hole 14 in the flange 1a.

The inner member 2 serves as a rotatable member and includes a hub axle 9 having a wheel mounting hub flange 9a, formed integrally therewith, and an inner ring 10 mounted on an outer periphery of an axle portion 9b of the hub axle 9 on the inboard side thereof. The above described rows of the rolling surfaces 4 described as defined in the inner member 2 are formed in the hub axle 9 and the inner ring 10, respectively. The outer periphery of an inboard end of the hub axle 9 is formed with an inner ring mounting surface area 12 that is radially inwardly stepped down to define a reduced diameter portion, and the inner ring 10 referred to above is mounted on this inner ring mounting surface area 12. The hub axle 9 has a center portion formed with a throughhole 11. The hub flange 9a referred to above is formed with a press fitting hole 15 defined at a plurality of circumferential locations thereof for receiving a corresponding hub bolt (not shown). At a portion of the hub axle 9 in the vicinity of a root portion of the hub flange 9a, a cylindrical pilot portion 13 for guiding a vehicle wheel and a brake component (not shown) protrudes towards the outboard side.

Figure 2:
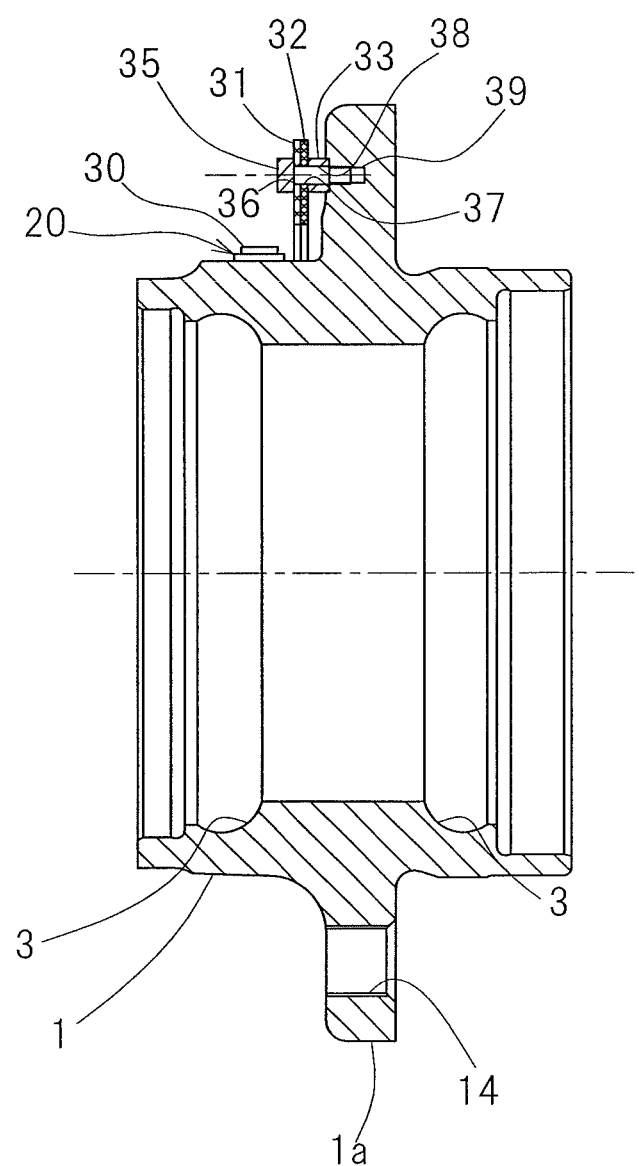
FIG. 2 is a fragmentary longitudinal sectional view of the sensor equipped wheel support bearing assembly, showing one example of an outer member employed therein.
Figure 3:
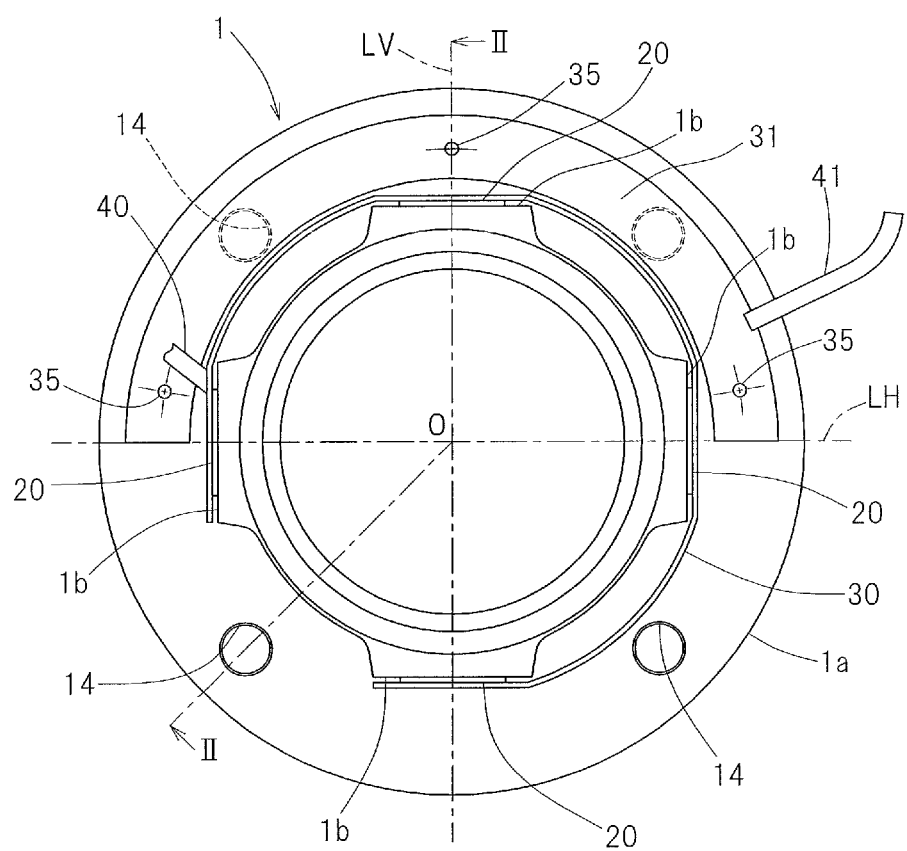
FIG. 3 is a front elevational view of the outer member as viewed from an outboard side.

FIG. 2 illustrates a sectional view of one example of the outer member 1 employed in this wheel support bearing assembly and FIG. 3 illustrates the outer member 1 as viewed from the outboard side. It is to be noted that FIG. 2 illustrates a cross sectional view taken along the line II-II in FIG. 3. The vehicle body fitting flange 1a referred to previously has a shape, when viewed from front, which is line symmetrical with respect to a line segment perpendicular to the bearing axis (longitudinal axis) O of the bearing assembly (such as, for example, a vertical line segment LV or transverse line segment LH in FIG. 3), or is point symmetrical with respect to the longitudinal axis O of the bearing assembly. More specifically, in the illustrated example, the front elevational shape of the vehicle body fitting flange 1a is so round as to form the point symmetry with respect to the vertical line segment LV.

The outer member 1, which is the stationary member, has an outer diametric surface on which four sensor units 20 are mounted. In the illustrates instance, those sensor units 20 occupy an upper surface area, a bottom surface area, a right surface area and left surface area, which are a upper position, a lower position, a forward position, and a rearward position relative to a road surface (tire tread), respectively, of the outer diametric surface of the outer member 1 and are spaced a phase difference of 90° from each other in a direction circumferentially of such outer diametric surface.

Figure 9:
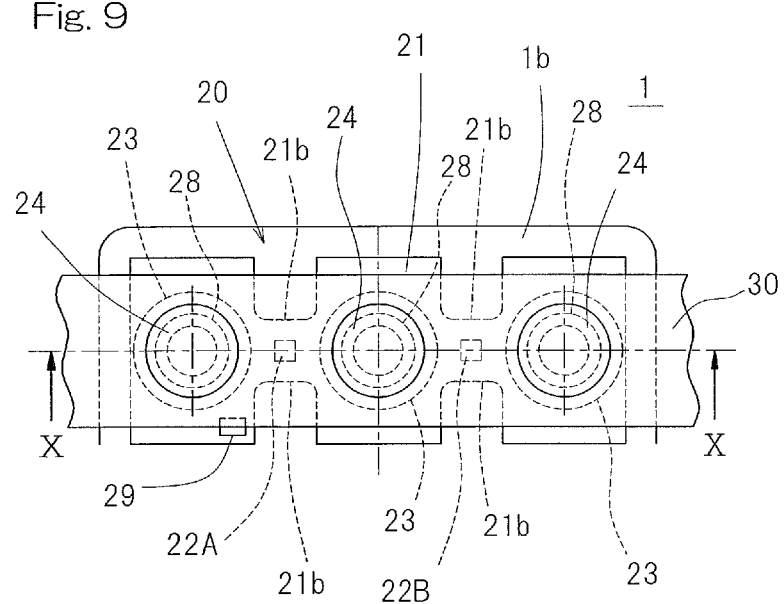
FIG. 9 is an enlarged top plan view showing a sensor unit employed in the sensor equipped wheel support bearing assembly.
Figure 10:
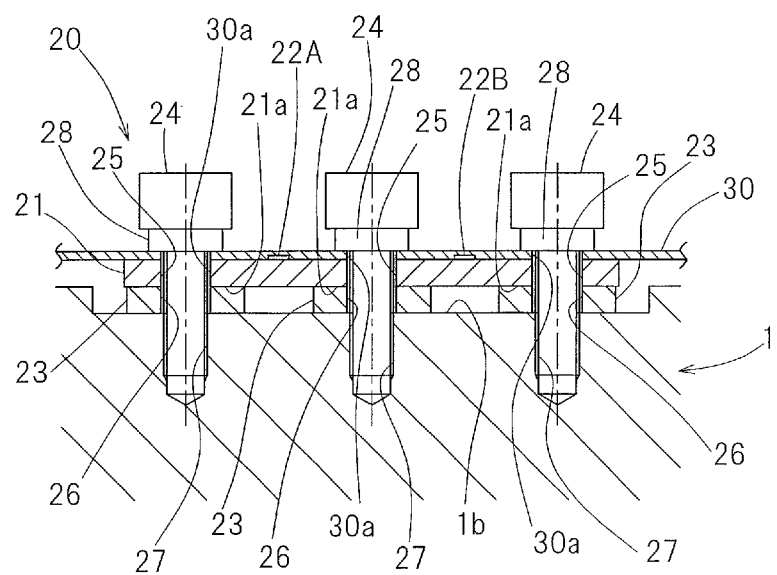
FIG. 10 is a cross sectional view taken along the line X-X in FIG. 9.

As best shown in FIGS. 9 and 10 in an enlarged top plan view and an enlarged sectional view, respectively, each of those four sensor units 20 includes a strain generating member 21 and two strain sensors 22A and 22B mounted fixedly on the strain generating member 21 for detecting a strain induced in the strain generating member 21. The strain generating member 21 is in the form of a thin plate member of not greater than 2 mm in thickness and made of a elastically deformable metallic material such as, for example, a steel material and is shaped to represent, when viewed from top, a roughly strip shape of a uniform width over the entire length thereof, and this strain generating member 21 has its opposite side edges formed respectively with two pairs of two cutout portions defined therein so as to extend inwardly thereof in a widthwise direction thereof. Each of the cutout portions 21b in each of the opposite side edges of the strain generating member 21 has two corners that are rounded in section. The strain generating member 21 also has three contact fixing segments 21a which are fixed to the outer diametric surface of the outer member 1 in contact therewith through respective spacers 23. Those three contact fixing segments 21a arranged in a row and disposed in line with a direction lengthwise of the strain generating member 21. In other words, referring to FIG. 10, one of the two strain sensors, for example, the first strain sensor 22A is disposed between the leftmost contact fixing segment 21a and the intermediate contact fixing segment 21a and the other strain sensor, that is, the second strain sensor 22B is disposed between the intermediate contact fixing segment 21a and the rightmost contact fixing segment 21a.

As shown in FIG. 9, the cutout portions 21b of each pair are defined in respective portions of the opposite side edges of the strain generating member 21 where the corresponding strain sensor 22A or 22B is mounted. Accordingly, the first and second strain sensors 22A and 22B detect strains taking place in a direction lengthwise of the strain generating member 21 at respective sites of the strain generating member 21 in the vicinity of the first and second pairs of the cutout portions 21b. It to be noted that the strain inducing member 21 is preferably of a type which does not undergo any plastic deformation even under a condition in which the maximum expected force is applied as an external force, acting on the outer member 1 that is the stationary member, or a working force acting between a wheel tire and a road surface. If the plastic deformation otherwise takes place, a deformation taking place in the outer member 1 will not be transmitted to the sensor unit 20 and the measurement of the strain will be therefore affected adversely. The maximum expected force referred to above is, for example, the maximum force that does not result in any damage to the wheel support bearing assembly even when such force acts, but is encompassed within the range with which, when such force is removed, allows the wheel support bearing assembly to assume the normal functioning.

The sensor unit 20 is so installed that the three contact fixing segments 21a of the strain generating member 21, while they are spaced from each other in the direction circumferentially of the outer member 1, are placed at respective portions of the outer member 1, which lies on the same position with respect to the direction axially of the outer member 1, and are then fixed to the outer diametric surface of the outer member 1 through the corresponding spacers 23 by means of bolts 24. At this time, a flexible substrate 30, which is placed on an upper surface of the sensor unit 20, is too fixed to the outer diametric surface of the outer member 1 together with the sensor unit 20. The flexible substrate 30 is in the form of a single annular substrate placed around the outer diametric surface of the outer member 1 in coaxial relation with the latter. In other words, the four sensor units 20 are fixed to a rear side of the single flexible substrate 30 and are fixed to the outer diametric surface of the outer member 1 together with the flexible substrate 30. Since the flexible substrate is placed in a ring form along the outer diametric surface of the outer member 1, polyimide is preferred as a base material therefor. Selection of polyimide as the base material for the flexible substrate 30 is effective to let the flexible substrate 30 have a sufficient flexibility and a sufficient heat resistance and follow in the circumferential direction of the outer member 1 easily.

Each of the bolts 24 is inserted first through a corresponding bolt insertion hole 30a, defined in the flexible substrate 30, then through a bolt insertion hole 25, defined in the associated contact fixing segment 21a in the strain generating member 21 and aligned with the bolt insertion hole 30a, and finally through a bolt insertion hole 26 defined in the corresponding spacer 23, and is threaded into an internally threaded hole 27 defined in an outer peripheral portion of the outer member 1. At this time, a washer 28 is interposed between a head portion of the respective bolt 24 and the strain generating member 21. With the contact fixing segments 21a fixed to the outer diametric surface of the outer member 1 through the respective spacers 23 in the manner described above, the constricted areas of the strain generating member 21 in the form of a thin plate, which areas are left by the pairs of the cutout portions 21b in the strain generating member 21, are held in a condition kept apart from the outer diametric surface of the outer member 1 to thereby facilitate the strain induced deformation occurring in surroundings of the cutout portions 21b. For the axial positions where the contact fixing segments 21a are disposed, an axial position, which lies in the surroundings of an outboard row of the rolling surfaces 3 in the outer member 1 is selected. The term "surrounding of the outboard row of the rolling surfaces 3" is intended to mean a region ranging from a position intermediate between the inboard and outboard rows of the rolling surfaces 3 to a site where the outboard row of the rolling surfaces 3 is formed. In order to facilitate a stable fixing of the sensor unit 20 onto the outer diametric surface of the outer member 1, a flat area 1b is formed in a portion of the outer diametric surface of the outer member 1, where each of the spacers 23 is fixed in contact therewith.

For each of the strain sensors 22A and 22B, various sensors can be used. For example, each of those strain sensors 22A and 22B may be structured with a metallic foil strain gauge. In such case, fixing to the strain generating member 21 is generally carried out by means of bonding. Also, each of the strain sensors 22A and 22B may be formed on the strain generating member 21 with a thick film resistance element.

FIGS. 11A and 11B illustrate a developed plan view and a sectional view, showing one example of arrangement of the sensor units 20 on the flexible substrate 30. In this example of arrangement, the four sensor units 20 are fitted directly to the flexible substrate 30. The sensor units 20 are fitted to a rear surface side (a surface facing the outer diametric surface of the outer member 1) of the flexible substrate 30, and a wiring circuit 34 is printed as a circuit pattern on a rear surface or front and rear surfaces of the flexible substrate 30. Each of the sensor units 20 is connected with the wiring circuit 34 by means of a soldering technique. Each of the sensor units 20 has a surface opposite to a surface of the strain generating member 21 held in contact with the outer member 1, which surface is rendered to be a circuit printing surface, and is fitted to the flexible substrate 30 with the circuit printing surface held in face to face relation with printed surface of the flexible substrate where the wiring circuit 34 has been printed. In this instance, respective portions of opposite side edges of each of the sensor units 20 at the site of installation of the respective sensor unit in the flexible substrate 30 are formed with band-shaped openings 30b each extending in a direction lengthwise of the flexible substrate 30. Accordingly, a contact surface of the sensor unit 20, which is held in tight contact with the outer member 1, is a mere flat surface having no circuit printing surface nor a soldered portion and, therefore, the respective sensor unit 20 can be fitted in tight contact with the outer member 1.

FIGS. 12A and 12B illustrate a developed plan view and a sectional view, showing a second example of arrangement of the sensor units 20 on the flexible substrate 30. In this example of arrangement, at the site of installation of each of the sensor units on the flexible substrate 30, a rectangular opening 30c through which the respective sensor unit 20 is exposed substantially in its entirety is formed. Formation of the rectangular openings 30c, through which the respective sensor units 20 are exposed substantially in their entirety, at the corresponding sites of installation of the sensor units on the flexible substrate 30 is effective to assuredly prevent the deformation of the strain generating member 21 in each of the sensor units 20 from being regulated by the flexible substrate 30 and, therefore, the detecting accuracy of the load can be correspondingly increased. Other structural features than that described above are similar to those in the example of arrangement shown in and described with particular reference to FIGS. 11A and 11B.

FIGS. 13A and 13B illustrate a developed plan view and a sectional view, showing a third example of arrangement of the sensor units 20 on the flexible substrate 30. In this example of arrangement, the sensor units 20 are separated from the flexible substrate 30 except for their points of connection with the wiring circuit 34 in the flexible substrate 30. It is, however, to be noted that in this example of arrangement, the flexible substrate 30 is in the form of a band-shaped configuration of the same width and the sensor units 20 are disposed in one of the opposite side edges of the flexible substrate 30 so as to line up along the flexible substrate 30. Other structural features than that described above are similar to those in the example of arrangement shown in and described with particular reference to FIGS. 11A and 11B.

The strain sensors 22A and 22B in each of the sensor units 20 are connected with a calculation processing circuit 31, best shown in FIGS. 1 to 3, through the wiring circuit 34 on the flexible substrate 30. The calculation processing circuit 31 is a circuit operable to perform a calculating process on respective output signals of the strain sensors 22A and 22B to estimate the force (a vertically acting load Fz, a load Fx due to become a driving force or a braking force, an axially acting force Fy) acting between the wheel support bearing assembly or the vehicle wheel and the road surface (tire tread), examples of which are shown in block diagrams of FIGS. 15 and 16.

A circuit substrate of the calculation processing circuit 31 is fitted to one of opposite side faces of the vehicle body fitting flange 1a of the outer member 1, which faces towards the outboard side, through a circuit fixing stay 32 as best shown in FIG. 1. In the example of structure shown in and described with particular reference to FIGS. 1 to 3, the circuit fixing stay 32 is in the form of an arcuate, but semicircular plate member and is arranged on the outboard oriented side face of the flange 1a through a spacer 33 in coaxial relation to the outer member 1. Also, the circuit substrate of the calculation processing circuit, too, is rendered to be an arcuate shape in the substantially same way as the circuit fixing stay 32 of the calculation processing circuit 31, is arranged on a front surface of the circuit fixing stay 32 in a fashion overlapped with such circuit fixing stay 32 and is finally fixed to the side face of the flange 1a together with the circuit fixing stay 32 by means of a plurality of bolts 35. The circuit substrate of the calculation processing circuit 31 and the circuit fixing stay 32 are provided with respective pluralities of bolt insertion holes 36 and 37 defined therein so as to align with each other when the circuit substrate and the circuit fixing stay 32 are overlapped one above the other, and the spacer 33 referred to above is disposed at positions where the bolt insertion holes 36 and 37 are aligned with each other. Each of the bolts 35 referred to previously is inserted first through the corresponding bolt insertion hole 36 in the circuit substrate of the calculation processing circuit 31, then through the bolt insertion hole 37 in the circuit fixing stay 32 and finally through the bolt insertion hole 38 in the respective spacer 33 before it is firmly threaded into an associated internally threaded hole 39 defined in the vehicle body fitting flange 1a.

It is, however, to be noted that instead of the use of the bolts 35 to fix the circuit substrate of the calculation processing circuit 31 and the circuit fixing stay 32 to the side face of the flange 1a, the circuit fixing stay 32 may be fixed to the side face of the flange 1a by means of bonding and the circuit substrate of the calculation processing circuit 31 may then be fixed to the front surface of the circuit fixing stay 32 by means of bonding. The wiring circuit 34, best shown in FIG. 11A, of the flexible substrate 30 and the calculation processing circuit 31 are connected with each other through a connecting cable 40 best shown in FIG. 3. The calculation processing circuit 31 has a signal cable 41 connected thereto, through which an output signal having been processed by this circuit is drawn outwardly.

Figure 4:
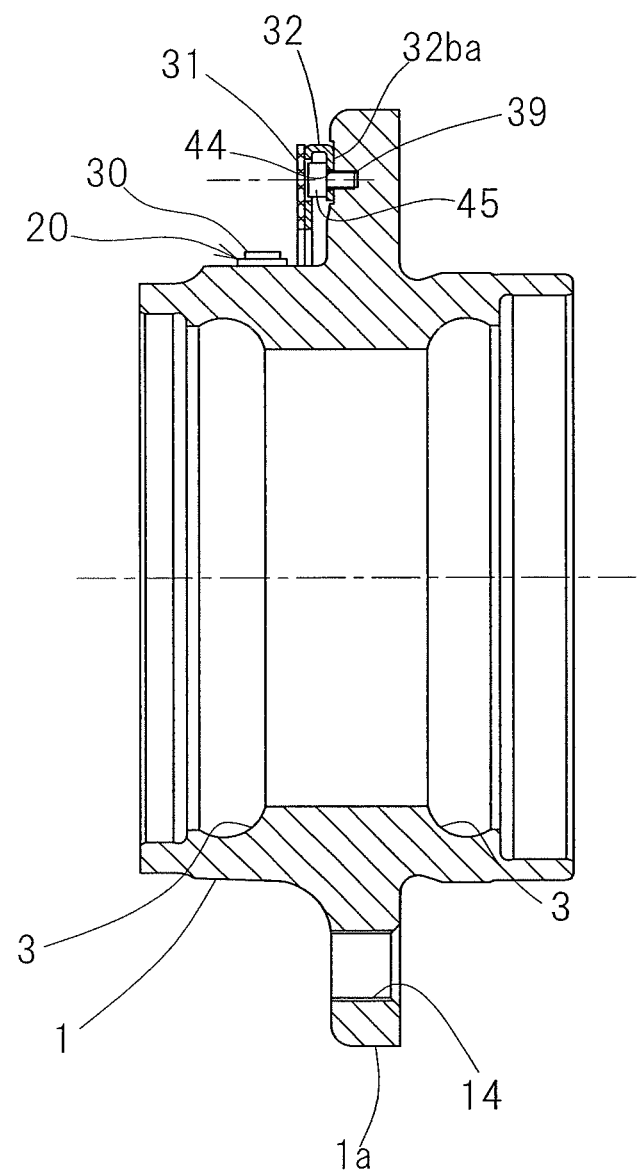
FIG. 4 is a fragmentary longitudinal sectional view showing another example of the outer member.
Figure 5:
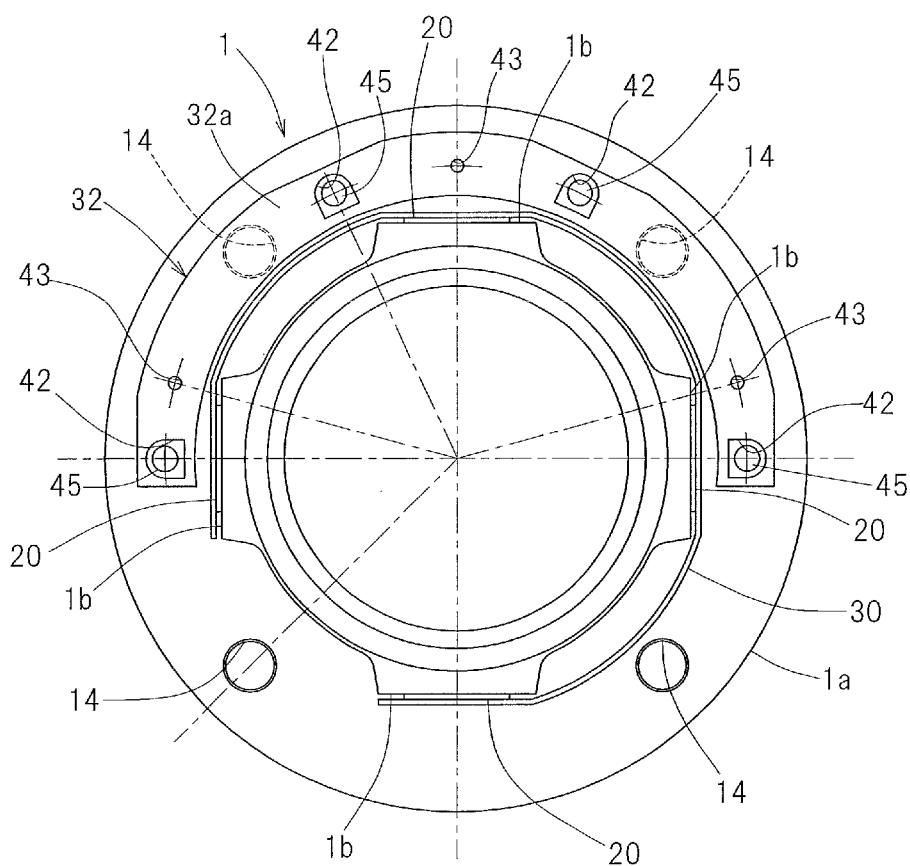
FIG. 5 is a front elevational view of the outer member as viewed from the outboard side.
Figure 6:
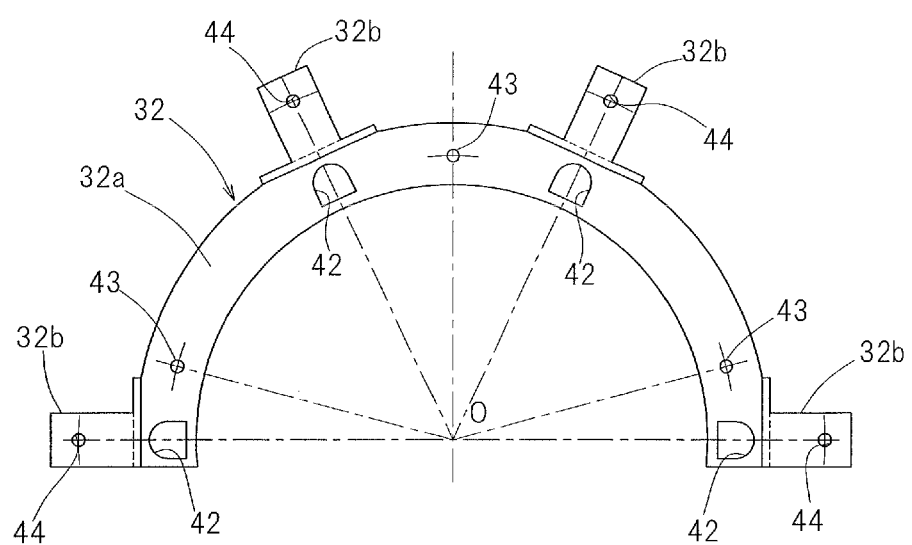
FIG. 6 is an development diagram showing circuit fixing stays employed in the outer member.

A different example of fitting of the calculation processing circuit 31 is shown in FIGS. 4 to 6. Even in this fitting example, the circuit substrate of the calculation processing circuit 31 is also rendered to be arcuate in shape and is disposed on the front surface of the circuit fixing stay 32 in a fashion overlapped therewith. The circuit fixing stay 32 is, as best shown in FIG. 6 in the developed plan view, made up of a main body plate portion 32a of an arcuate shape and a fitting piece 32b provided at a plurality of locations of an outer peripheral edge of the main body plate portion 32a so as to protrude outwardly towards an outer diametric side; a semicircular viewport 42, best shown in FIGS. 5 and 6, is defined at circumferential portions of the main body plate portion 32a, from which the fitting pieces 32b protrudes; the main body plate portion 32a is provided with threaded holes 43 at different circumferential locations that are alignable with the bolt insertion holes 36 in the calculation processing circuit 31; and a bolt insertion hole 44 is defined in each of the fitting pieces 32b.

The circuit fixing stay 32 in this case is disposed coaxially with the outer member 1 through no spacers 33 used in the case shown in and described with reference to FIGS. 1 to 3, when each of the fitting pieces 32b is bent in a direction towards a rear surface side of the main body plate portion 32a to represent an inverted L-sectioned configuration and a bent portion 32ba of the respective fitting piece 32, which has been made parallel to the main body plate portion 32a, is then pressed to contact the outboard oriented side face of the vehicle body fitting flange 1a, and is fixed in position by means of a plurality of bolts 45 as shown in FIG. 5. The bolt insertion hole 44 in each of the fitting pieces 32b is provided in the bent portion 32ba referred to above and aligns with the adjacent viewport 42 defined n the main body plate portion 32a. Each of the bolts 45 is inserted into the bolt insertion hole 44 in the respective fitting piece 32b through the adjacent viewport 42 in the stay main body plate portion 32a and is then threaded into the associated internally threaded hole 39 defined in the vehicle body fitting flange 1a.

It is to be noted that FIG. 5 illustrates the condition before the calculation processing circuit 31 is fitted to the circuit fixing stay 32. Fixing of the calculation processing circuit 31 to the front surface of the circuit fixing stay 32 is carried out by inserting a bolt (not shown) into the associated bolt insertion hole 36 in the circuit substrate of the calculation processing circuit 31 and threading such bolt into the corresponding threaded hole 43 in the stay main body plate portion 32a, but may be carried out by means of bonding. Although not shown, that the wiring circuit 34 of the flexible substrate 30 and the calculation processing circuit 31 are connected together through the connecting cable 40 and that the signal cable 41 is connected with the calculation processing circuit 31 are similar to those shown in and described with particular reference to FIG. 3.

Figure 7:
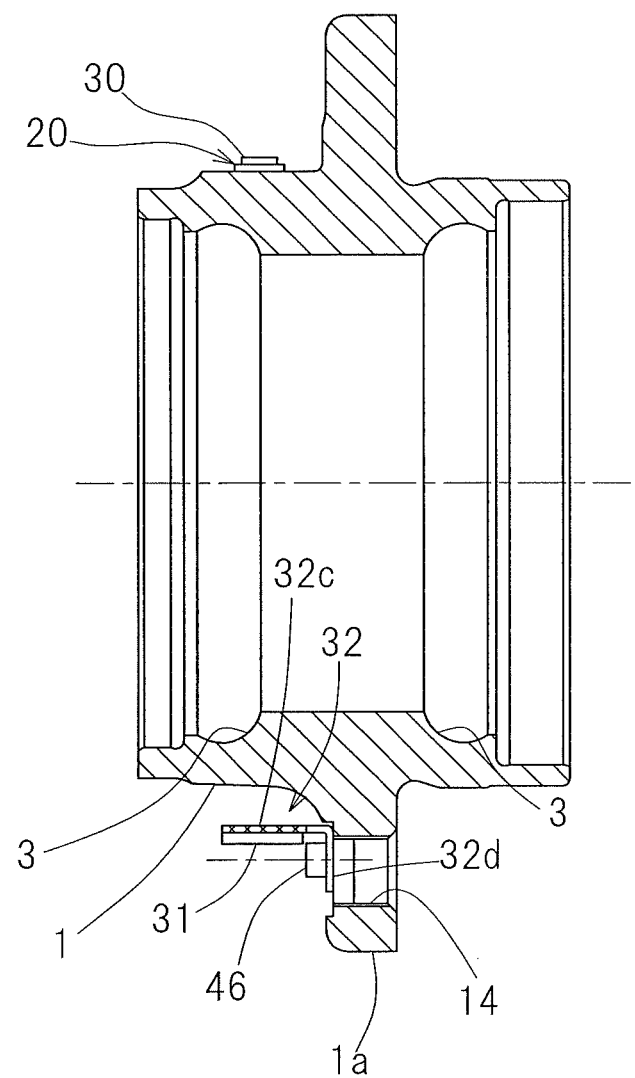
FIG. 7 is a fragmentary longitudinal sectional showing a further example of the outer member.
Figure 8:
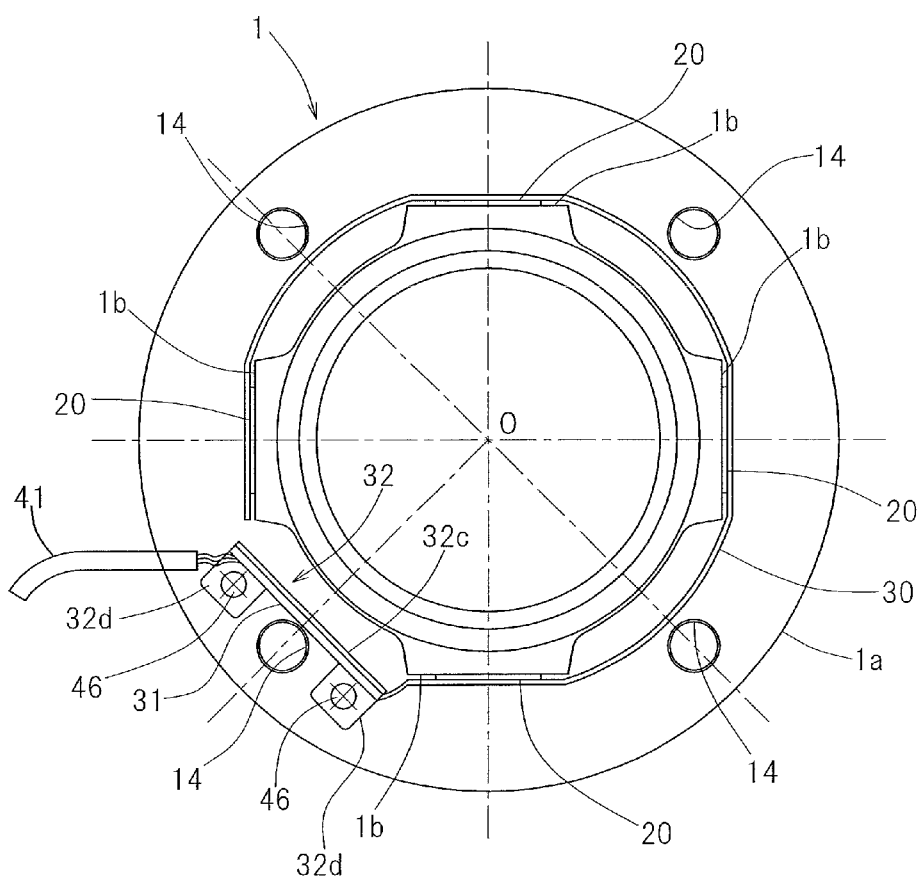
FIG. 8 is a front elevational view of the outer member as viewed from the outboard side.

FIGS. 7 and 8 illustrate a second different example of fitting of the calculation processing circuit 31. In this fitting example, the circuit fixing stay 32 is made up of a flat plate-like main body plate portion 32c and a pair of fitting pieces 32d bent to represent an L-sectioned configuration so as to protrude towards one side edge of the main body plate portion 32c. When the pair of the fitting pieces 32d are pressed to contact the outboard oriented side face of the vehicle body fitting flange 1a and are then fixed to the flange 1a by means of bolts 46, the circuit fixing stay 32 is fixed to a cylindrical outer diametric surface of the outer member 1, with the main body plate portion 32c lying perpendicular to the side face of the flange 1a, in a posture extending in a direction tangential to the cylindrical outer diametric surface of the outer member 1. A circuit substrate (not shown) of the calculation processing circuit 31, which is rendered to represent a flat plate shape that is substantially the same shape as that of the main body plate portion 32c, is fitted to an upper surface of the main body plate portion 32c of this circuit fixing stay 32 by means of bolts (not shown) or bonding. In this way, the calculation processing circuit 31 is fitted in the posture extending in the direction tangential to the outer diametric surface of the outer member 1. That the wiring circuit 34 of the flexible substrate 30 and the calculation processing circuit 31 are connected together through the connecting cable 40 and that the signal cable 41 is connected with the calculation processing circuit 31 are similar to those shown in and described with particular reference to FIG. 3.

In each of the above described examples of structure of the calculation processing circuit 31, the circuit fixing stay 32 is in the form of, for example, a corrosion resistant steel plate which has been shaped by means of a press work. Other than it, a steel plate, which has been shaped by means of a press work and is painted or coated with a metallic plating, may be used. Also, the circuit fixing stay 32 and the circuit substrate of the calculation processing circuit 31 may be integrally molded with resin.

In addition, for the circuit fixing stay 32, a resin molding may be employed. By so doing, it is possible to avoid the possibility that fitting areas of the calculation processing circuit 31 may be raised because of rusting of the circuit fixing stay 32 and also to eliminate an erroneous operation of the calculation processing resulting from the rusting. Where the circuit fixing stay 32 is employed in the form of a resin molded product, the calculation processing circuit 31 may be formed in the circuit fixing stay 32 by means of an insert molding method. In such case, a work of fitting the calculation processing circuit 31 onto the circuit fixing stay 32 can be dispensed with.

Moreover, although in each of the above described examples of structure of the calculation processing circuit 31, the flexible substrate 30 has been shown and described as connected with the calculation processing circuit 31 through the connecting cable 40, the calculation processing circuit 31 may be integrally molded together with the flexible substrate 30. In such case, a work of connecting the flexible substrate 30 with the calculation processing circuit 31 can be dispensed with. Also, a waterproof connector may be used in connecting the flexible substrate 30 with the calculation processing circuit 31.

Figure 15:
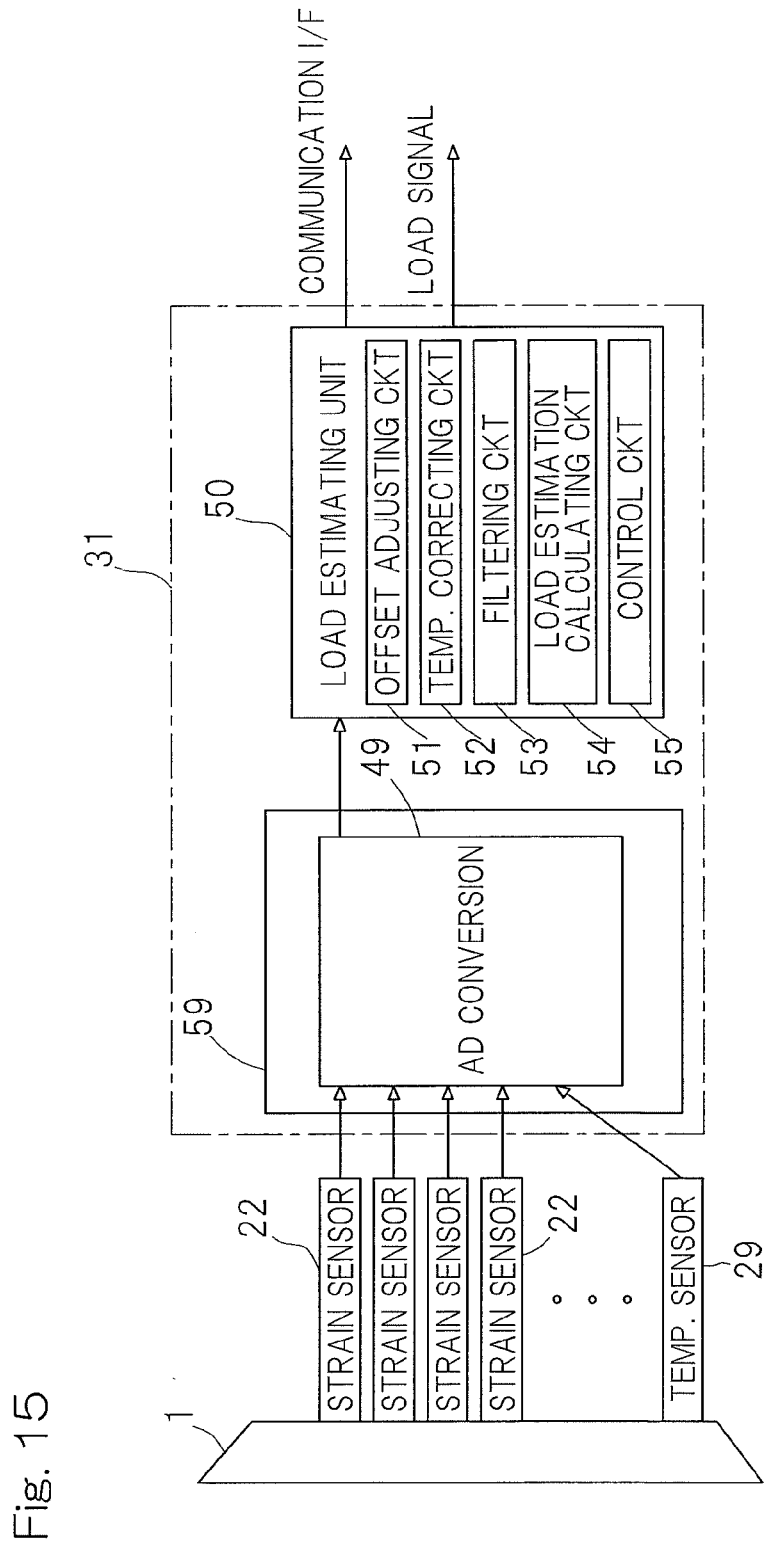
FIG. 15 is a block diagram showing one example of the entire construction of a detecting system used in the sensor equipped wheel support bearing assembly.

In an example of structure of the calculation processing circuit 31 shown in FIG. 15, the strain sensor 22 of each of the sensor units 20 is connected with a load estimating unit 50 through an analog-to-digital converter 49. In other words, an output signal of the strain sensor 22 is analog-to-digital converted directly by the analog-to-digital converter 49 and the output signal of the strain sensor 22, which has been analog-to-digital converted, is inputted to the load estimating unit 50. For the analog-to-digital converter 49 in this case, a converter having a resolution of at least 20 or more bits is employed. Also, the analog-to-digital converter 49 is rendered to be a small sized element having a multi-channel input and forms a converter unit 59 capable of compiling respective sensor output signals from a plurality of sensor units 20 into one which is in turn converted into a digital data. The system of the analog-to-digital converter 49 is preferably in the form of a digital sigma type converter because the latter has a highly precious, relatively high speed feature.

The load estimating unit 50 is a unit operable to estimate the force (a vertically acting load Fz, a load Fx due to become a driving force or a braking force, an axially acting force Fy) acting between the wheel support bearing assembly or the vehicle wheel and the road surface (tire tread) from the analog-to-digital converted output signal of the strain sensor 22 in the sensor unit 20 and is constructed of, for example, a microcomputer. The load estimating unit 50 in the form of the microcomputer may have various electronic component parts mounted on a single substrate or of one chip. This load estimating unit 50 includes an offset adjusting circuit 51, a temperature correction circuit 52, a filtering circuit 53 such as, for example, a low pass filter, a load estimation calculating circuit 54, and a control circuit 55. The offset adjusting circuit 51 is operable to adjust the initial offset of the strain sensor 22, an offset resulting from the fixture to the wheel support bearing assembly and other offsets to regular values and is so configured as to perform the adjustment by the control circuit 55 or the offset adjustment in response to a command from an external source. Considering that causes of the offset includes fluctuation of the strain sensors 22 and strain occurring during the fixture of the sensors, the offset adjustment is preferably carried out at the state the sensor unit 20 has been fitted to the wheel support bearing assembly and completed its assemblage.

As described above, when after the assemblage of the sensor equipped wheel support bearing assembly, the offset is adjusted by the offset adjusting circuit 51 so that the output signal of the strain sensor 22 assumes the stipulated value, it is possible to render the sensor output to be a zero point at the time the sensor equipped wheel support bearing assembly is turned into a completed product and, therefore, the quality of the sensor output signal can be secured.

Also, the output signal of the strain sensor 22 contains a temperature characteristic of the strain sensor itself and/or a drift amount brought about by a temperature strain of the outer member 1 serving as the stationary member. The temperature correction circuit 52 referred to above is a circuit operable to correct the drift caused by the temperature of the output signal of the strain sensor 22, which has been adjusted as to its offset. In order to correct the temperature dependent drift, the strain generating member 21 of at least one of the sensor units 20 is provided with a temperature sensor 29 as shown in FIG. 9, and the output signal of this temperature sensor 29 is, after having been digitalized by the analog-to-digital converter 49, inputted to the temperature correction circuit 52.

In the load estimation calculating circuit 54, on the basis of the digitalized output signal of the strain sensor 22 which has been subjected to the offset adjustment process, the temperature correcting process and the filtering process respectively by means of the offset adjusting circuit 51, the temperature correction circuit 52 and the filtering circuit 53, the load estimating calculation is carried out. This load estimation calculating circuit 54 includes a relation setting unit (not shown), in which relations of the force (a vertically acting load Fz, the load Fx due to become a driving force or a braking force and the axially acting force Fy are set by calculating equations or tables, and is operable to estimate from the output signal of the strain sensor 22, the working force (the vertically acting load Fz, the load Fx due to become a driving force or a braking force, the axially acting force Fy) with the utilization of the above described relation setting unit. The contents set in the relation setting unit are set by determining through a series of experiments and/or simulations.

Load data obtained from the load estimation calculating circuit 54 of the load estimating unit 50 are outputted to a host electric control unit (ECU), installed on the side of the vehicle body structure, through an intra-vehicle communication bus (for example, CAN bus) or the like. This communication path may be wireless or may be defined by installing two-way communication appliances respectively on the bearing side and the vehicle side so that the load data or the like can be outputted. In this case, if a required cable for, for example, an electric power supply has to be wired and connected to activate the sensor so that data obtained can be transmitted wireless, the number of the required cables can be reduced and fitting onto the vehicle body structure can be simplified. The electric control unit referred to above is a unit for controlling, for example, the automotive vehicle in its entirety and may be in the form of a microcomputer or the like. If required, it may be of a type capable of outputting an analog voltage.

Figure 16:
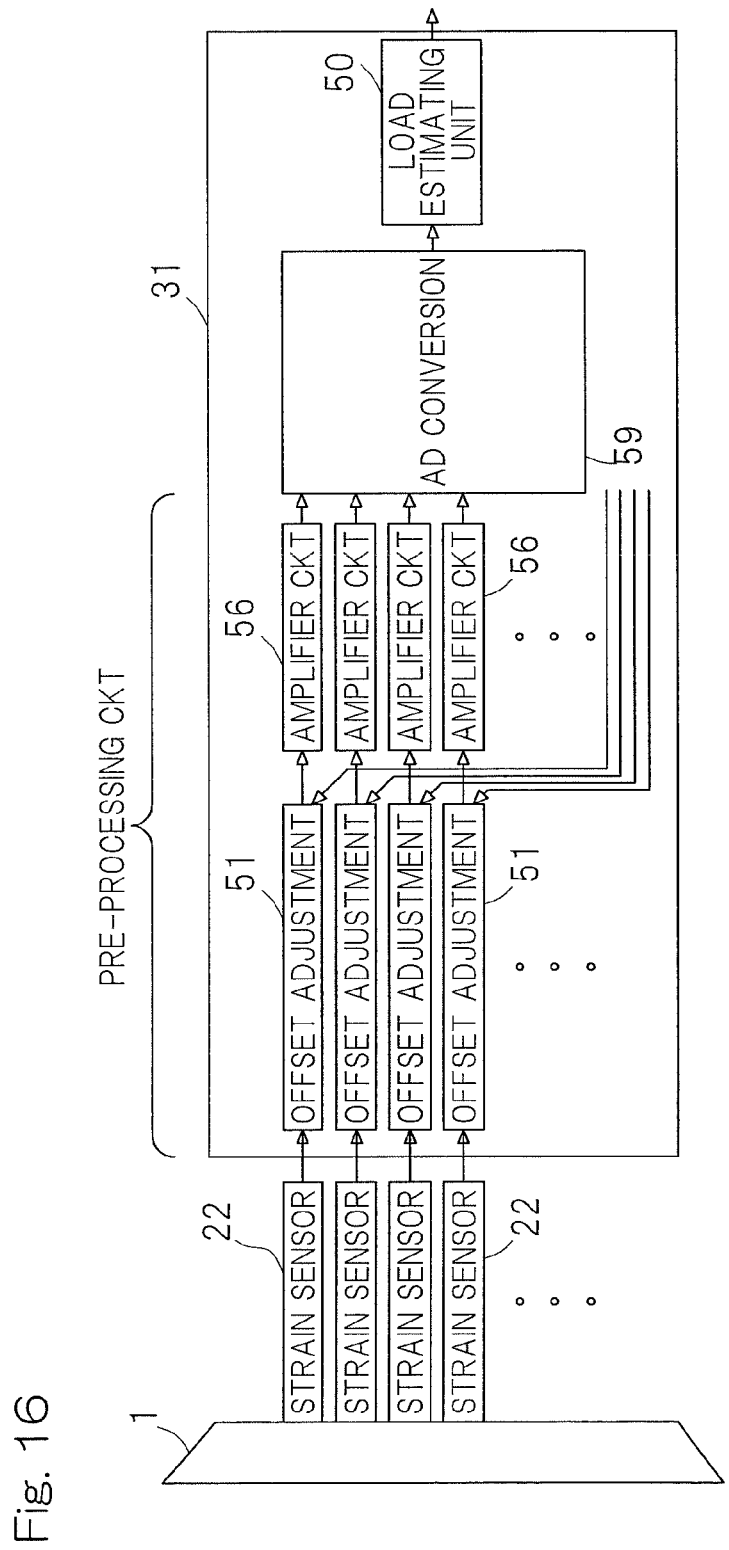
FIG. 16 is a block diagram showing another example of the entire construction of a detecting system used in the sensor equipped wheel support bearing assembly.

In another example of structure of the calculation processing circuit 31 shown in FIG. 16, an amplifying circuit 56 for amplifying the output signal of each of the strain sensors 22 and the above described offset adjusting circuit 51 are provided in a front stage preceding to the load estimating unit 50 as a pre-processing circuit. Respective structures of the converter unit 59 for compiling the respective sensor output signals from the plurality of the sensor units 20 into one and converting it into digital data and the load estimating unit 50 in the stage subsequent thereto are similar to those employed in the example shown in and described with particular reference to FIG. 15.

Figure 17:
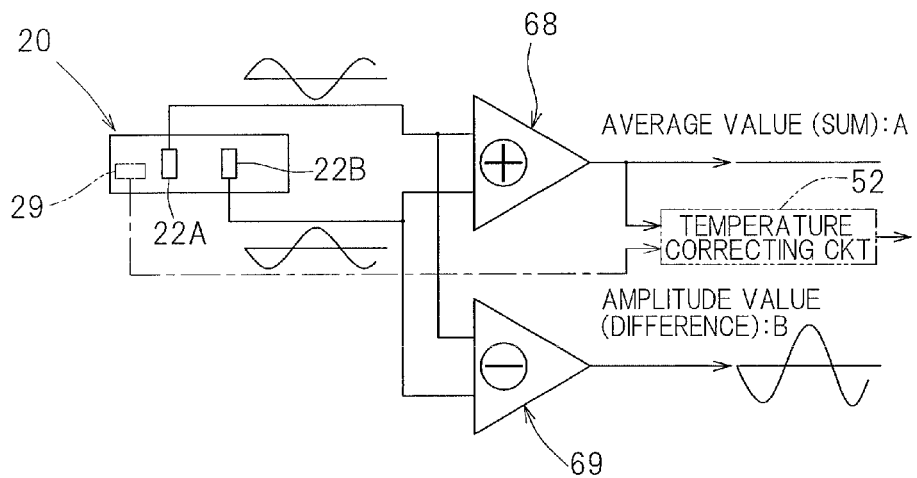
FIG. 17 is a block diagram showing a circuit of a calculating unit for calculating an average value and an amplitude value of the sensor output signal.

The load estimation calculating circuit 54 of the load estimating unit 50 includes an average calculating subunit 68 and an amplitude calculating subunit 69 both shown in FIG. 17. The average calculating subunit 68 is comprised of an adder operable to calculate the sum of the respective output signals of the first and second strain sensors 22A and 22B in the sensor unit 20, which sum is taken out as an average value A. On the other hand, the amplitude value calculating subunit 69 is comprised of a subtractor operable to calculate the difference between the respective output signals of the first and second strain sensors 22A and 22B, which difference is taken out as an amplitude value B.

In the load estimation calculating circuit 54, from the average value A and the amplitude value B calculated respectively by the average calculating subunit 68 and the amplitude calculating subunit 69, the force F (for example, the vertically acting load Fz) acting between the wheel support bearing assembly or the vehicle wheel and the road surface (tire contact ground surface) is calculated and estimated. For this calculation and estimation, the load estimation calculating circuit 54 includes two load estimating units 71 and 72 shown in FIG. 18. The first load estimating unit 71 is operable to calculate and estimate the load F, acting on the wheel support bearing assembly, with the use of the average value A. On the other hand, the second load estimating unit 72 is operable to calculate and estimate the load F, acting on the wheel support bearing assembly, with the use of the average value A and the amplitude value B.

The relation between the load F, acting on the wheel support bearing assembly, and the respective output signal S of the strain sensors 22A and 22B can be expressed by the following equation (1), provided that an offset component is excluded within a linear range:

$$F = M1 \times S \tag{1}$$

wherein M1 represents a predetermined correction coefficient. Thus, from this equation (1), the load F can be estimated.

In the first load estimating unit 71 referred to above, using the average value A as a variable, from which the offset component is excluded from the output signals of the strain sensors 22A and 22B, and the load F is calculated and estimated from the following linear equation (2), in which the variable referred to above is multiplied by the predetermined correction coefficient M1:

$$F = M1 \times A \tag{2}$$

Thus, with the utilization of the variable, from which the offset component has been excluded, the load estimating accuracy can be increased.

In the second load estimating unit 72, using the above discussed average value A and the similarly above discussed amplitude value B as variables, the load F is calculated and estimated from the following linear equation, in which those variables are multiplied by predetermined correction coefficients M2 and M3, respectively:

$$F = M2 \times A + M3 \times B \tag{3}$$

With the use of the two types of variables as discussed above, the load estimating accuracy can be further increased.

The specific value of each of the correction coefficients employed in each of the above equations can be determined by means of a series of experiments and/or simulations. Respective calculations performed by the first and second load estimating units 71 and 72 take place in parallel relation to each other. It is, however, to be noted that in the equation (3) above, the average value B, which is a variable, may be dispensed with. In other words, in the second load estimating unit 72, the load F can be calculated and estimated with the use of only the amplitude value B as a variable.

Since the sensor unit 20 is disposed at the axial position which will be the neighborhood of the outboard rolling surface 3 in the outer member 1 as best shown in FIG. 1, the respective output signal a and b of the strain sensors 22A and 22B are affected by the rolling element moving past the neighborhood of the site of installation of the sensor unit 20 as shown in diagram (C) of FIG. 14. Specifically, the influence brought about by the rolling elements 5 functions as the offset component. Also, even during the halt of the bearing section, the output signals a and b of the strain sensors 22A and 22B are affected by the influence of the position of the rolling elements 5. In other words, when the rolling elements 5 successively move past the position closest to the strain sensors 22A and 22B in the sensor unit 20 (or when any of the rolling elements 5 are held at that position), the output signal a and b of the strain sensors 22A and 22B exhibit the maximum amplitude, but as shown in diagrams (A) and (B) of FIG. 14, when the rolling elements 5 move away from that position (or when any of the rolling elements 5 is held at a position away from that position), the output signals a and b of the strain sensors 22A and 22B decrease. During the rotation of the bearing section, since the rolling elements 5 move successively past the neighborhood of the site of installation of the sensor unit 20 at a predetermined arrangement pitch P, the respective analog output signals a and b of the strain sensors 22A and 22B represent a waveform approximating to the sinusoidal wave, in which the amplitude of any of such rolling elements 5 fluctuates periodically at a cycle equal to the arrangement pitch P of the rolling elements as shown in diagram (C) of FIG. 14.

In view of the above, in the load estimation calculating circuit 54 in the calculation processing circuit 31, a load to be determined is taken as data, the sum of the respective amplitudes of the corresponding output signals a and b of the two strain sensors 22A and 22B are rendered to be an average value A, and the difference (absolute value) of the amplitudes |a−b| of the amplitudes is rendered as an amplitude value B. By so doing, the average value A will assume a value from which a fluctuating component brought about by the successive passage of the rolling elements 5 has been cancelled. Also, the amplitude value B will assume a value in which temperature influences appearing in the respective output signals a and b of the two strain sensors 22A and 22B and/or influences brought about by a slide between the knuckle and the flange have been counterbalanced. Accordingly, with the average value A and the amplitude value B being used, the load acting on the wheel support bearing assembly or the tire contacting road surface can be accurately detected.

In the instance now under discussion, the sensor unit 20 makes use of the strain generating member 21 of a design, in which of the three contact fixing segments 21a lined in an array on the outer diametric surface of the outer member 1, which is the stationary member, in the direction circumferentially thereof, the spacing between the two contact fixing segments 21a on opposite extremities of the array is set to a value equal to the arrangement pitch P of the rolling elements 5. In this case, the circumferential spacing between the two neighboring sensors 22A and 22B, each positioned at a position intermediate between the neighboring contact fixing segments 21a, is about ½ of the arrangement pitch P of the rolling elements 5. As a result, the respective output signals a and b of the two strain sensors 22A and 22B have a phase difference of about 180° and, hence, the average value A that is determined as the sum thereof becomes that from which the component brought about by the passage of the rolling elements 5 has been cancelled. Also, the amplitude value B that is determined as the difference thereof becomes a value from which the influences brought about by temperature and/or the influences brought about by the slip taking place between the knuckle and the flange.

It is to be noted that in diagrams (A) to (C) of FIG. 14, the spacing between the contact fixing segments 21a is chosen to be equal to the arrangement pitch P of the rolling elements 5 and each of the strain sensors 22A and 22B is disposed at the position intermediate between the neighboring contact fixing segments 21a, so that the circumferential spacing between the two strain sensors 22A and 22B can become approximately equal to half the arrangement pitch P of the rolling elements 5. However, different from that described above, the circumferential spacing between the two strain sensors 22A and 22B may be chosen to be equal to half the arrangement pitch P of the rolling elements 5. In this case, the circumferential spacing between the two strain sensors 22A and 22B may be equal to the arrangement pitch P of the rolling elements 5 multiplied by {½+n (wherein n represents an integer)} or a value approximating to it. Even in this case, the average value A determined as the sum of the output signals a and b of the two strain sensors 22A and 22B is that from which the fluctuating component resulting from the passage of the rolling elements 5 has been cancelled, and, similarly, the amplitude value B determined as the difference thereof is that in which the temperature influence and/or the influences resulting from the slip taking place between the knuckle and the flange has been counterbalanced.

Figure 18:
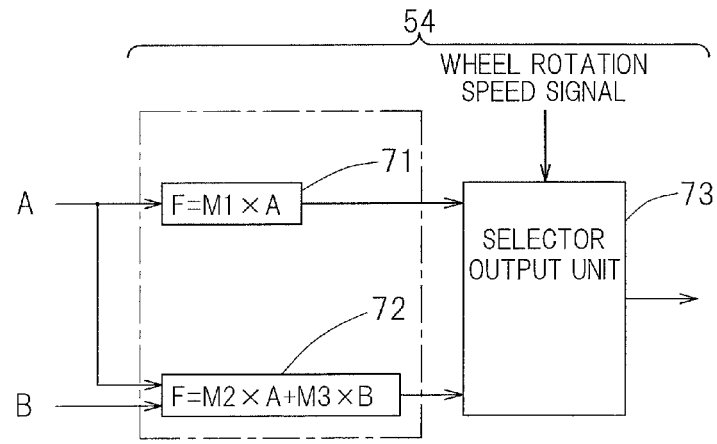
FIG. 18 is a block diagram showing a circuit unit for estimating and outputting a load from the average value and the amplitude value.

As shown in FIG. 18, the load estimating units 71 and 72 of the load estimation calculating circuit 54 are connected with a selection output unit 73. This selection output unit 73 is of a type capable of selecting and outputting one of respective estimated load values of the first and second load estimating units 72. More specifically, in the event that the wheel rotating speed is lower than a predetermined lowermost speed, the selection output unit 73 selects and outputs the estimated load value of the first load estimating unit 71. At the time of a low speed rotation of the vehicle wheel, the processing time required to detect the amplitude of the sensor output signal is prolonged, but at the time of halt the detection of the amplitude itself becomes impossible to achieve. In view of this, as discussed above, the detected load signal can be outputted with no delay when the estimated load value from the first load estimating unit 71, which utilizes only the average value A, is selected and outputted in the event that the wheel rotating speed is lower than the predetermined lowermost value.

In this embodiment, in order to provide the selection output unit 73 with a rotational speed information of the vehicle wheel, a rolling element detecting sensor 60 for detecting the position of the rolling elements 5 is provided on an inner periphery of the outer member 1 as shown in FIG. 1 and from an output signal of the rolling element detecting sensor 60 the rotational speed of the vehicle wheel is determined accordingly. It is, however, to be noted that the selection output unit 73 may be inputted with information on a vehicle wheel rotational speed from the outside. In such case, as the information on the vehicle wheel rotational speed, the use may be made of a rotation sensor signal such as, for example, an ABS sensor from a vehicle body side so that the vehicle wheel rotational speed can be estimated thereby. Also, from the host control device connected with the intra-vehicle pass on the vehicle body side, instead of the information on the vehicle wheel rotational speed, an arrangement may be made that a switched selection command may be received by the selection output unit 73. In addition, as the information on the vehicle wheel rotational speed, a passing frequency of the rolling elements 5 may be detected from the respective output signals a and b of the strain sensors 22A and 22B referred to previously so that the vehicle wheel rotational speed can be estimated.

Since in this embodiment the four sensor units 20 are equidistantly mounted on the upper surface area, the bottom surface area, the left surface area and the right surface area, which are the upper position, the lower position, the left position, and the right position relative to the road surface (tire tread), respectively, of the outer diametric surface of the outer member 1 with a phase difference of 90° from each other in the circumferential direction of such outer diametric surface, the vertically acting load Fz acting on the wheel support bearing assembly, the load Fx due to become the driving force or the braking force and the axially acting load Fy can be estimated.

When the load acts between the tire of the vehicle wheel and the road surface, such load is applied to the outer member 1, which is the stationary member of the wheel support bearing assembly, resulting in a corresponding deformation. Since in this case, the two or more contact fixing segments 21a of the strain generating member 21 in the sensor unit 20 are fixed to the outer member 1 in contact therewith, the strain occurring in the outer member 1 is amplified and is therefore easy to be transmitted and such strain is detected by the strain sensor 22 with high sensitivity.

Particularly since the circuit fixing stay 32 is provided on the side face of the vehicle body fitting flange 1a of the outer member 1, which is the stationary member, and the calculation processing circuit 31 for performing the calculation processing subject to the output signals of the strain sensors 22A and 22B of the sensor unit 20 is fitted to the circuit fixing stay 32, without rendering the peripheral surface shape of the cylindrical portion of the outer member to be changed, not only can the calculation processing circuit 31 including the analog-to-digital converter 49 and other be fitted with a compact structure, but the assemblage is easy to achieve and the load acting on the bearing section of the vehicle wheel can be accurately detected.

Also, since in this embodiment, the vehicle body fitting flange 1a of the outer member, which is the stationary member, has a front elevational shape, which is line symmetrical shape relative to the line segments LV and LH both perpendicular to the bearing axis O as shown in FIG. 3, the shape of the outer member 1 is simplified and a change in amount of expansion and contraction and a temperature distribution resulting from the complication in shape of the outer member 1 can therefore be reduced. Accordingly, with influences of the change in amount of expansion and contraction and the temperature distribution resulting from the complication of the shape of the outer member having been sufficiently reduced, it is possible to cause the sensor unit to detect the amount of the strain brought about by the load.

Figure 19:
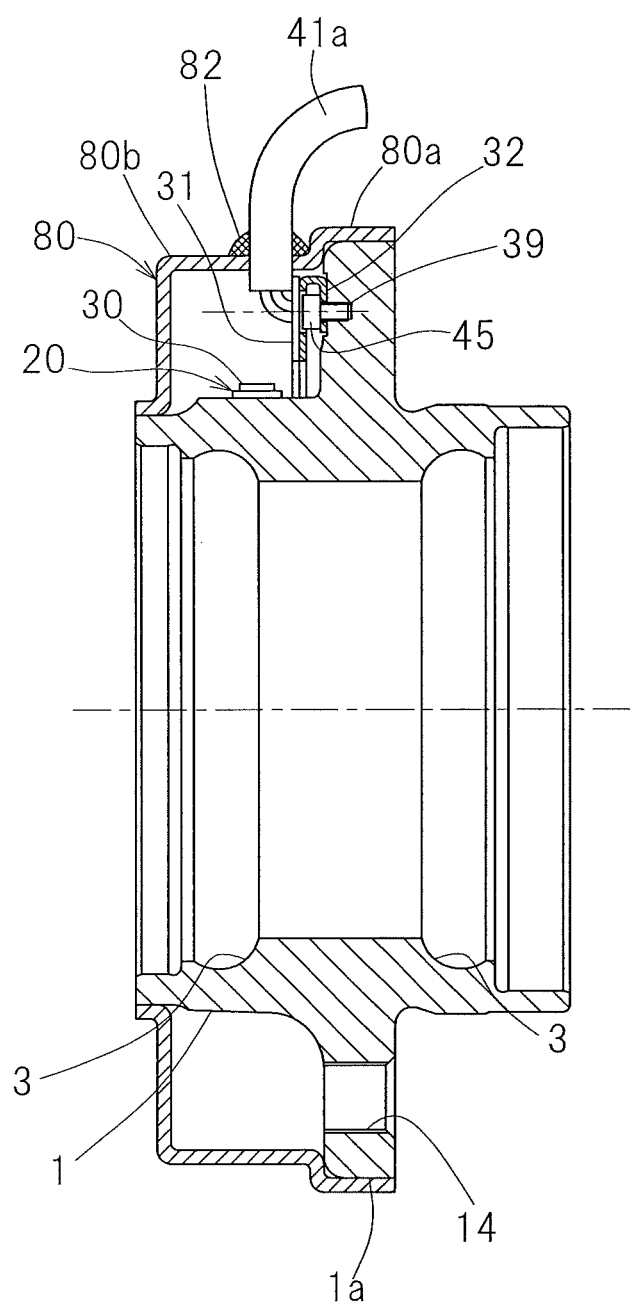
FIG. 19 is a longitudinal sectional view of one example of the outer member used in the sensor equipped wheel support bearing assembly designed in accordance with a second embodiment of the present invention.
Figure 20:
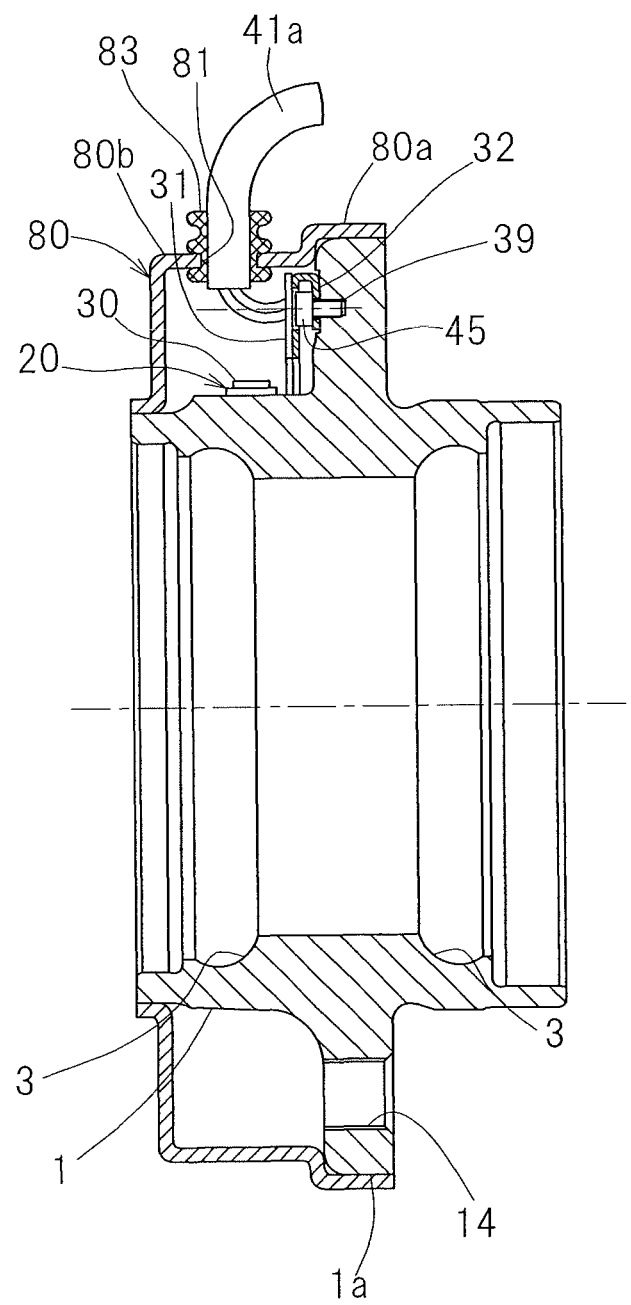
FIG. 20 is a longitudinal sectional view showing another example of the outer member.

FIGS. 19 and 20 illustrate a second embodiment of the present invention. This sensor equipped wheel support bearing assembly is similar to that shown in and described with particular reference to FIGS. 1 to 18, but differs therefrom in that a toric protective covering 80 is fitted to the outer peripheral surface of the outer member 1, which is the stationary member, in a fashion coaxial with the outer member 1 and each of the sensor units 20 and the calculation processing circuit 31 are enclosed by this protective covering 80. In particular, FIG. 19 illustrates one example of fixing the protective covering 80 onto the outer member 1 whereas FIG. 20 illustrates another example thereof. It is to be noted that the fitting of the calculation processing circuit 31 in this instance is similar to that shown and described in connection with the structural example of the previously described first embodiment of the present invention shown in FIGS. 4 to 6.

In the structural example shown in FIG. 19, the protective covering 80 is of a tubular shape having an inner diameter flaring outwardly towards the inboard side and is more specifically of a stepped cylindrical shape comprised of a large diameter portion 80a at an inboard side half thereof and a reduced diameter portion 80b at the remaining outboard side half. This protective covering 80 has an inboard end, mounted on the outer diametric surface of the vehicle body fitting flange 1a, and an outboard end mounted on the outer diametric surface of the outboard end of the outer member 1. As a material for the protective covering 80, a corrosive resistant steel plate such as, for example, stainless steel, which is press worked and molded, or a steel plate, which is press worked and molded and subsequently metal plated or painted, can be employed.

A draw-out portion 41a, through which the signal cable 41 connected with the calculation processing circuit 31 is drawn outwardly towards the vehicle body structure, is drawn outwardly from one site of the protective covering 80. Specifically, the reduced diameter portion 80b of the protective covering 80, which is the outboard side half thereof, that is, a cylindrical portion of the outer member 1 on the outboard side of the vehicle body fitting flange 1a is provided with a perforated portion 81 through which the signal cable draw-out portion 41a is drawn outwardly and a portion of the cable draw-out portion 41a from the perforated portion 81 is painted with a sealing material 82 to thereby seal a draw-out side of the cable draw-out portion 41a. Accordingly, the sealability of the protective covering 80 is enhanced and the sensor unit 20 and/or the calculation processing circuit 31, which are enclosed by the protective covering 80, can be assuredly protected from gravel stones, muddy water and/or saline water from the outside. It is also possible to regulate the displacement of the signal cable 41 in a circumferential direction.

In the structural example shown in FIG. 20, a rubber bushing 83 is engaged in the perforated portion 81 of the protective covering 80 and the signal cable draw-out portion 41a is drawn outwardly from a hollow in the rubber bushing 83. Even in this case, the sealability of the protective covering 80 is enhanced and the sensor unit 20 and/or the calculation processing circuit 31, which are enclosed by the protective covering 80, can be assuredly protected from gravel stones, muddy water and/or saline water from the outside.

Assemblage of the sensor equipped wheel support bearing assembly designed in accordance with this embodiment is carried out by the following procedures. At the outset, in a condition in which the outer member 1 stands alone, or the rolling elements 5 have been incorporated in the outer member 1, the sensor unit 20, the flexible substrate 30 and the calculation processing circuit 31 are fitted to the outer member 1. Subsequently, the protective covering 80 is mounted from the outboard side of the outer member 1, the inboard end thereof is mounted on the outer diametric surface of the flange 1a of the outer member 1 and the outboard end thereof is mounted on the outer diametric surface of the outboard cylindrical portion of the outer member 1, thereby allowing the protective covering 80 to cover the sensor unit 20, the flexible substrate 30 and the calculation processing circuit 31. There-after, the bearing in its entirety is assembled. By assembling in the manner according to the above described procedures, the sensor equipped wheel support bearing assembly, in which the sensor unit 20, the flexible substrate 30 and the calculation processing circuit 31 are enclosed by the protective covering 80, can be easily assembled.

Figure 21:
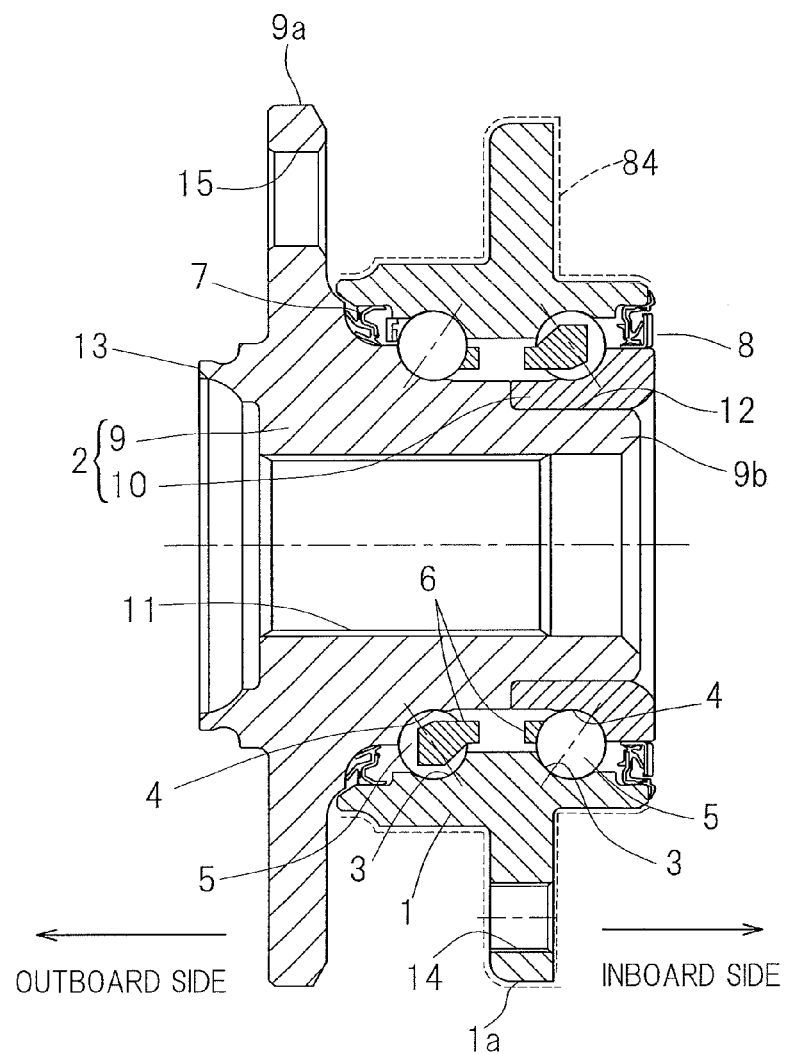
FIG. 21 is a longitudinal sectional view of the sensor equipped wheel support bearing assembly designed in accordance with a third embodiment of the present invention.

A third embodiment of the present invention is shown in FIG. 21. This sensor equipped wheel support bearing assembly is similar to that shown in and described with reference to FIGS. 1 to 18 in connection with the first embodiment or that shown in and described with reference to FIGS. 19 and 20 in connection with the second embodiment, but differ therefrom in that the outer diametric surface of the outer member 1, which is the stationary member and where the flange 1a is provided, is formed with a surface treated layer 84 having a resistance to corrosion or having a corrosion preventive capability. Onto the outer diametric surface of the outer member 1 so formed with the surface treated layer 84 as described above, the sensor unit 20, the flexible substrate 30, the calculation processing circuit 31 and the protective covering 80 are fitted as shown in FIGS. 1 to 20. Other structural features than that described above are similar to those used in the first and second embodiments of the present invention as shown in FIGS. 1 to 20.

As the surface treated layer 84 having the corrosion resistant or corrosion preventing capability referred to above, a surface layer treated with a metal plating process, a surface layer treated with a painting process and a surface layer treated with a coating process, for example, can be enumerated. For the metal plating process, a treatment with zinc plating, unichrome plating, chromating, nickel plating, chromium plating, electroless nickel plating, Kanigen plating, magnetite coating (black oxide finishing), raydent process and so on can be applied. For the painting and coating processes, cation electrodeposition coating, anion electrodeposition coating, fluorine electrodeposition coating or any of ceramic coatings such as, for example, silicon nitride coating can be applied.

As hereinabove described, since in the practice of the third embodiment of the present invention the surface treated layer 84 having the corrosion resistant or corrosion preventive capability is formed on the outer diametric surface of the outer member 1, it is possible to avoid an undesirable raise of fitting sites of the sensor unit 20, the flexible substrate 30, the calculation processing circuit 31 and the protective covering 80 and others, which would be caused in the presence of rusting and to prevent the sensor unit 20, the flexible substrate 30 and the calculation processing circuit 31 from being adversely affected by adopted rusting and, therefore, an undesirable erroneous operation of the strain sensors 22A and 22B and others as a result of the presence of rusting can be eliminated, making it possible for the load detection to be accurately performed for a prolonged period of time.

A fourth embodiment of the present invention will now be described in detail with particular reference to FIGS. 22 and 23. This fourth embodiment is similar to the first embodiment shown in and described with reference to FIGS. 1 and 2, but differs therefrom in that whereas the calculation processing circuit 31 for performing the calculation processing of the output signals of the sensors has been shown and described in the first embodiment as fitted to the outboard oriented side face of the vehicle body fitting flange 1a of the outer member 1 through the circuit fixing stay 32, such calculation processing circuit 31 is fitted directly to the outboard oriented side face of the vehicle body fitting flange 1a in the form as mounted on the arcuate circuit substrate without the circuit fixing stay 32 intervening. Other structural features of this fourth embodiment are similar to those of the first embodiment and, also, what has been shown in and described with reference to FIGS. 3 to 18 can be equally applied to the fourth embodiment and, therefore, the details thereof are not reiterated for the sake of brevity.

Figure 22:
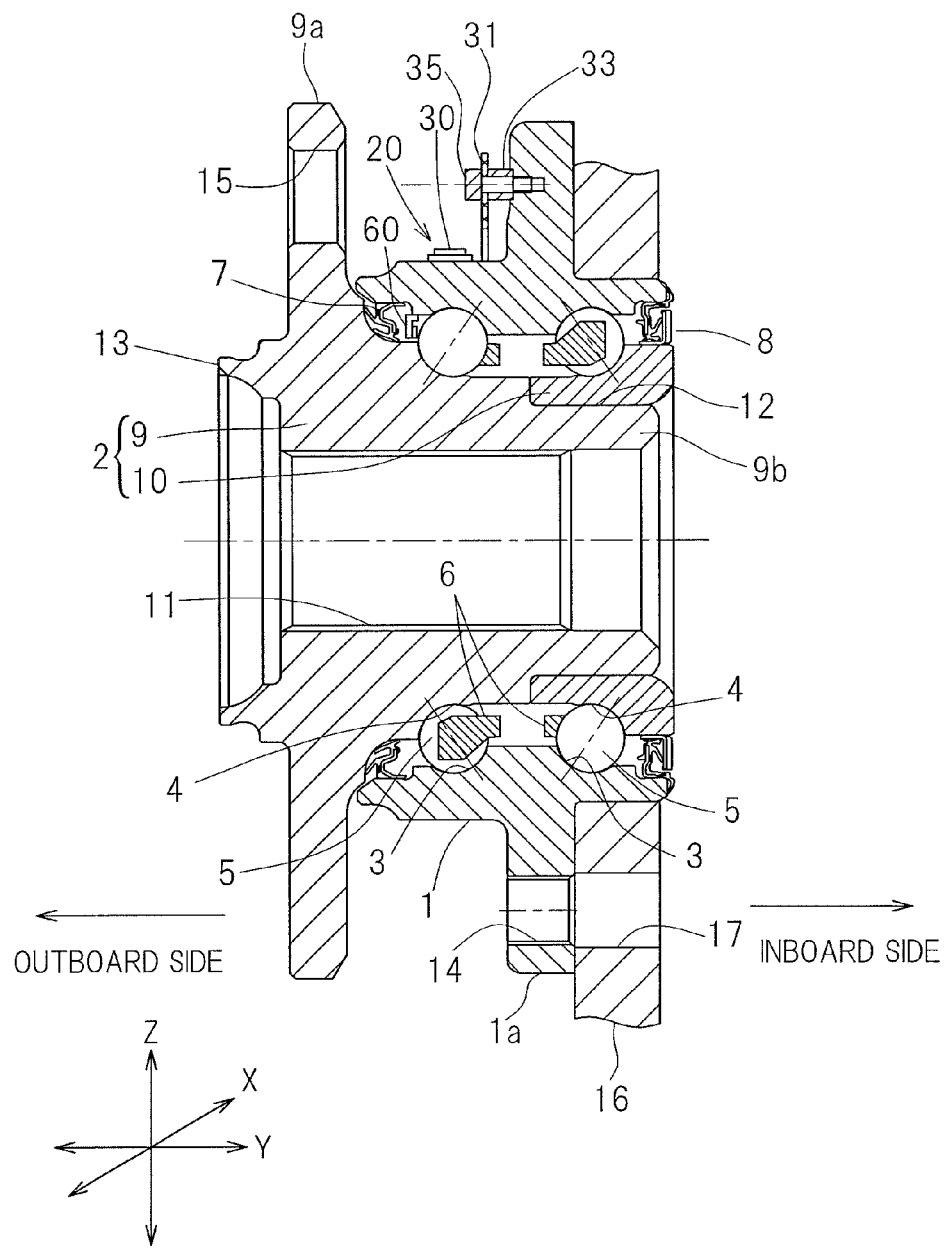
FIG. 22 is a longitudinal sectional view of the sensor equipped wheel support bearing assembly designed in accordance with a fourth embodiment of the present invention.
Figure 23:
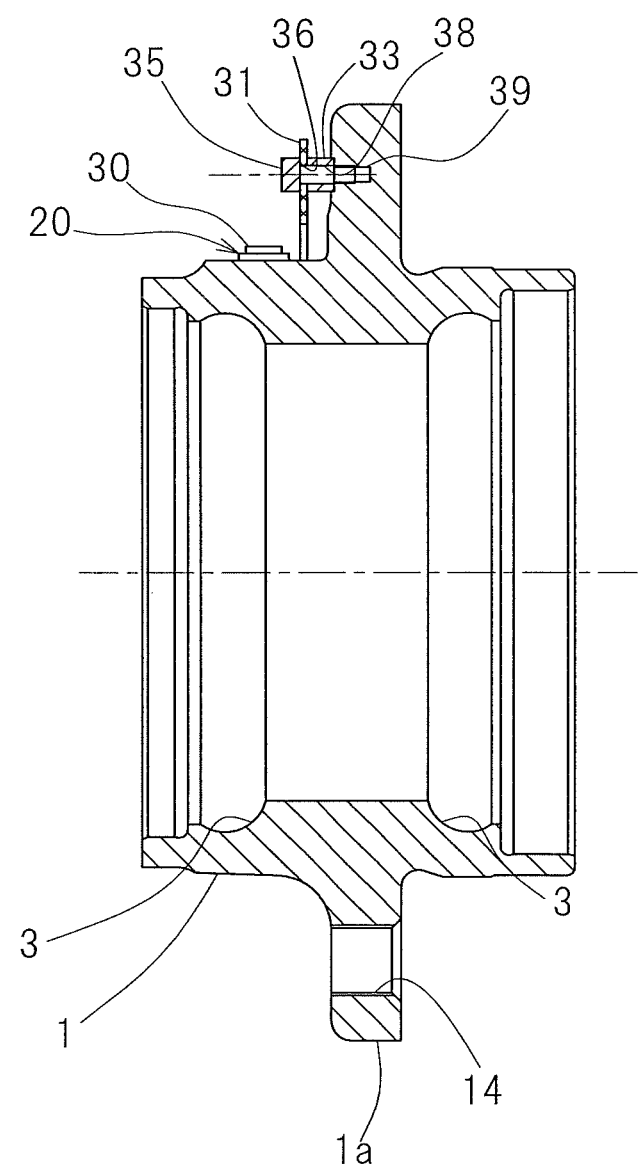
FIG. 23 is a longitudinal sectional view showing one example of the outer member used in the sensor equipped wheel support bearing assembly.

The arcuate circuit substrate used in the calculation processing circuit 31 is fitted to the outboard oriented side face of the vehicle body fitting flange 1a of the outer member 1 as shown in FIG. 22. In the structural example shown in FIGS. 22 and 23, the calculation processing circuit 31 is disposed in the outboard oriented side face of the flange 1a through the spacer coaxial with the outer member 1 and is fixed directly to the side face of the flange 1a by means of the plurality of the bolts 35. The circuit substrate of the calculation processing circuit 31 has the plurality of the bolt insertion holes 36 (best shown in FIG. 22) defined therein and the spacer 33 referred to above is disposed at each position aligned with those bolt insertion holes 36. Each of those bolts 35 is inserted from the associated bolt insertion hole 36 in the circuit substrate of the calculation processing circuit 33 into the corresponding bolt insertion hole 38 in the spacer 33 and is then threaded into the internally threaded holes 39 defined in the vehicle body fitting flange 1a. Other structural features than that described above are similar to those shown in and described with particular reference to FIGS. 1 and 2 which corresponds to FIG. 22.

Figure 24:
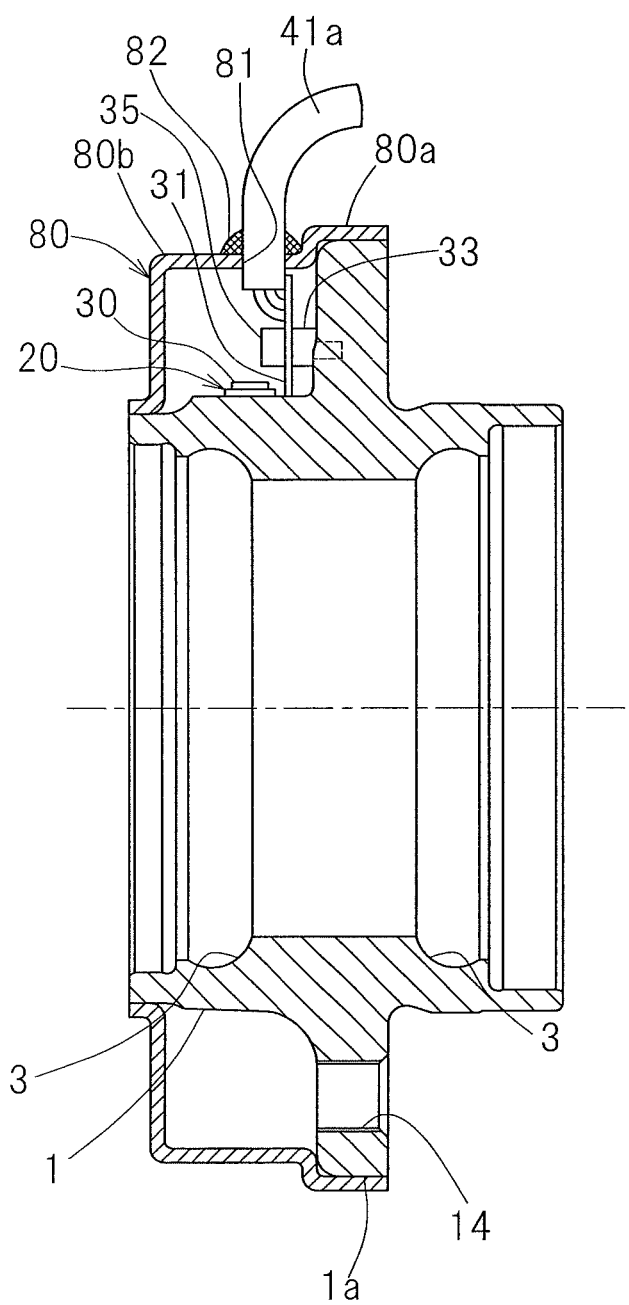
FIG. 24 is a longitudinal sectional view of one example of the outer member used in the sensor equipped wheel support bearing assembly designed in accordance with a fifth embodiment of the present invention.
Figure 25:
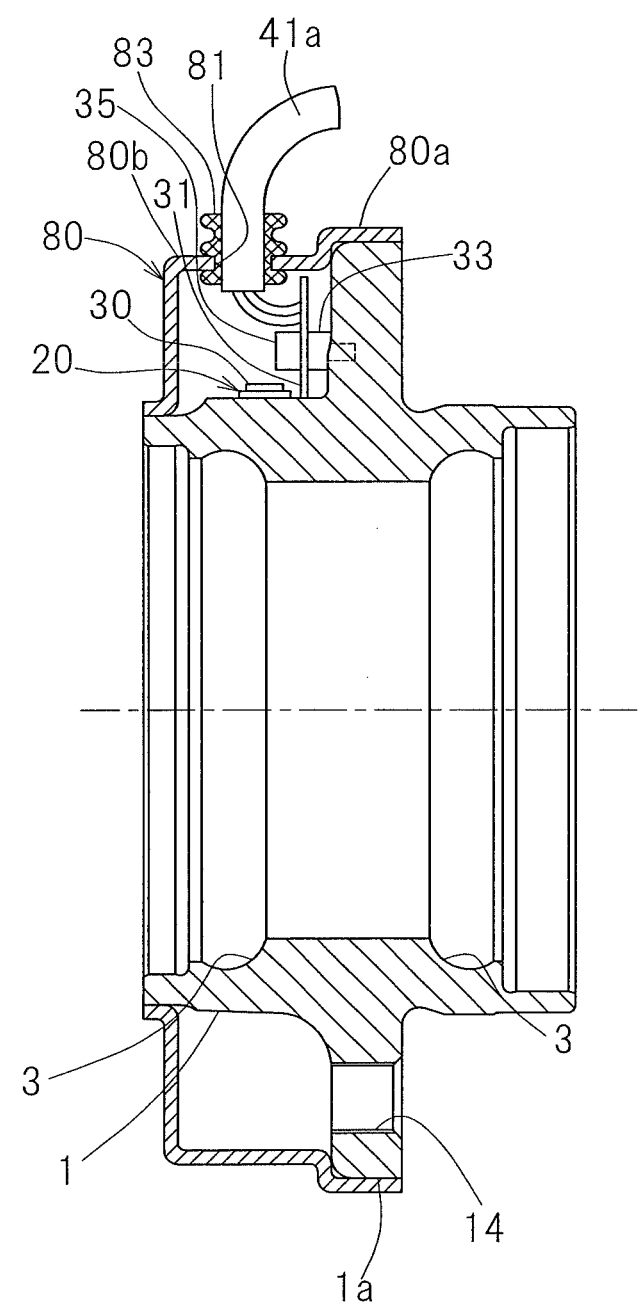
FIG. 25 is a longitudinal sectional view showing another example of the outer member.

FIGS. 24 and 25 illustrate a fifth embodiment of the present invention. The sensor equipped wheel support bearing assembly shown therein is similar to that shown in and described with particular reference to FIGS. 22 and 23 in connection with the fourth embodiment, but differs therefrom in that the toric protective covering 80 is fitted to the outer peripheral surface of the outer member 1, which is the stationary member, in a fashion coaxial with the outer member 1 and each of the sensor units 20 and the calculation processing circuit 31 are enclosed by this protective covering 80. FIG. 24 illustrates one example of fitting of the protective covering 80 to the outer member 1, showing the cable draw-out perforated portion 81 sealed by a sealing material 82 (in the same way as that shown in FIG. 19). FIG. 25 illustrates a different example of fitting of the protective covering 80 to the outer member 1, showing the cable draw-out perforated portion 81 sealed by the rubber bushing 83 (in the same way as that shown in FIG. 20). The protective covering 80 is similar to that shown in and described with reference to FIGS. 19 and 20.

Hereinafter, various applied modes, which do not require such a feature that "the calculation processing circuit 31 for performing the calculation processing on the output signal of the sensor is fitted to the side face of the vehicle body fitting flange 1a through the circuit fixing stay 32 or is fitted directly to the side face of the vehicle body fitting flange in the form as mounted on the toric circuit substrate", will be described.

The inventors of the present invention have suggested, in addition to such a sensor equipped wheel support bearing assembly having a load sensor built therein for detecting the load imposed on the bearing section of the vehicle wheel as disclosed in the previously discussed patent documents 1 and 2, a sensor equipped wheel support bearing assembly having an outer ring, on which what includes an amplifying circuit, an offset adjusting circuit, a linear correcting circuit, a controller, an external I/F and others as the load estimating unit having an offset function of the sensor output signal is mounted (See, for example, in the patent documents 3 and 4 listed previously.).

It has, however, been found that with the above described conventional design, there is the possibility that the sensor may be damaged upon collision with, for example, gravel stones scattered during the travel of the automotive vehicle and/or upon corrosion caused in contact with muddy saline water since the sensor is not protected in any way from the external environment.

Figure 48:
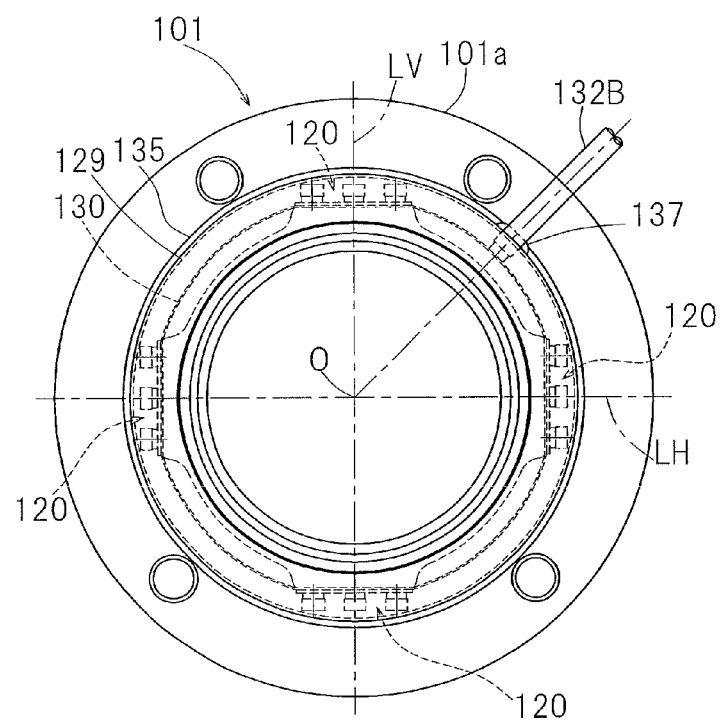
FIG. 48 is a front elevational view of the suggested example.
Figure 49:
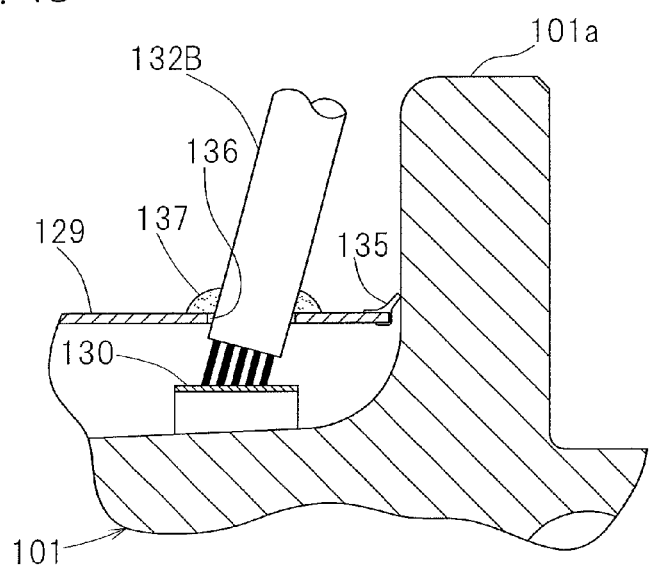
FIG. 49 is a sectional view of the suggested example.

As a means effective to resolve the problems and inconveniences discussed above, the inventors of the present invention has suggested such a bearing assembly as shown in, for example, FIGS. 48 and 49 (in the JP Laid-open Patent Publication No. 2011-089604). According to this suggested example, as shown in FIG. 48, a plurality of sensor units 120 for the detection of a load are provided on the outer peripheral surface of the outer member 101, which is the stationary ring of the wheel support bearing assembly, and those plurality of the sensor units 120 are enclosed by a cylindrical protective covering 129 encircling the outer member 101. The protective covering 129 has an outboard end mounted on the outer peripheral surface of the outer member 101 and, as shown in FIG. 49, a lip member 135 in the form of an annular elastic element provided along an open edge of an inboard open end of the protective covering 129 is held in contact with a side face of the vehicle body fitting flange 101a, provided on the outer periphery of the outer member 101, which side face is oriented towards the outboard side.

Also, together with the above described sensor units 120, a signal processing circuit for processing output signals of the sensor units 120 and a signal cable for drawing the processed output signals to the outside of the bearing section are fitted to a flexible substrate 130 to form a sensor assembly of a toric shape and this sensor assembly is fitted coaxially to the outer peripheral surface of the outer member 101. The protective covering 129 also has an inboard end portion provided with a perforated portion 136 from which a draw-out portion 132B for the signal cable is drawn outwardly from the protective covering 129 as shown in FIG. 49, and a sealing material 137 is applied to a portion from which the signal cable draw-out portion 132B is drawn outwardly from the perforated portion 136. In this way, the sensor units 120 and other electronic component parts are enclosed by the protective covering 129 and can therefore be protected from the outside environment.

It has, however, been found that according to the above described suggested example, when the signal cable is fitted to the protective covering 129, care must be taken to avoid an undesirable interference of the signal cable during the assemblage and, also, even when the protective covering 129 is to be removed, a work of removing the sealing material 137 intervening between the protective covering 129 and the signal cable is required. For this reason, a problem has been encountered that a fitting work to fit the protective covering 129 to the outer member 101 of the wheel support bearing assembly tends to become complicated.

In view of the above, as a first applied mode of the present invention, a sensor equipped wheel support bearing assembly of a compact structure, which has a good assemblability in drawing out the signal cable and is capable of accurately detecting the load acting on the bearing section of the vehicle wheel, will now be described with reference to FIG. 26 to FIGS. 32A and 32B. It is to be noted that FIG. 26, FIG. 27 and FIG. 28 correspond to FIG. 1, FIG. 2 and FIG. 3, respectively, and, therefore, like references are employed to denote like component parts throughout those figures and the details thereof are not reiterated for the sake of brevity.

Figure 26:
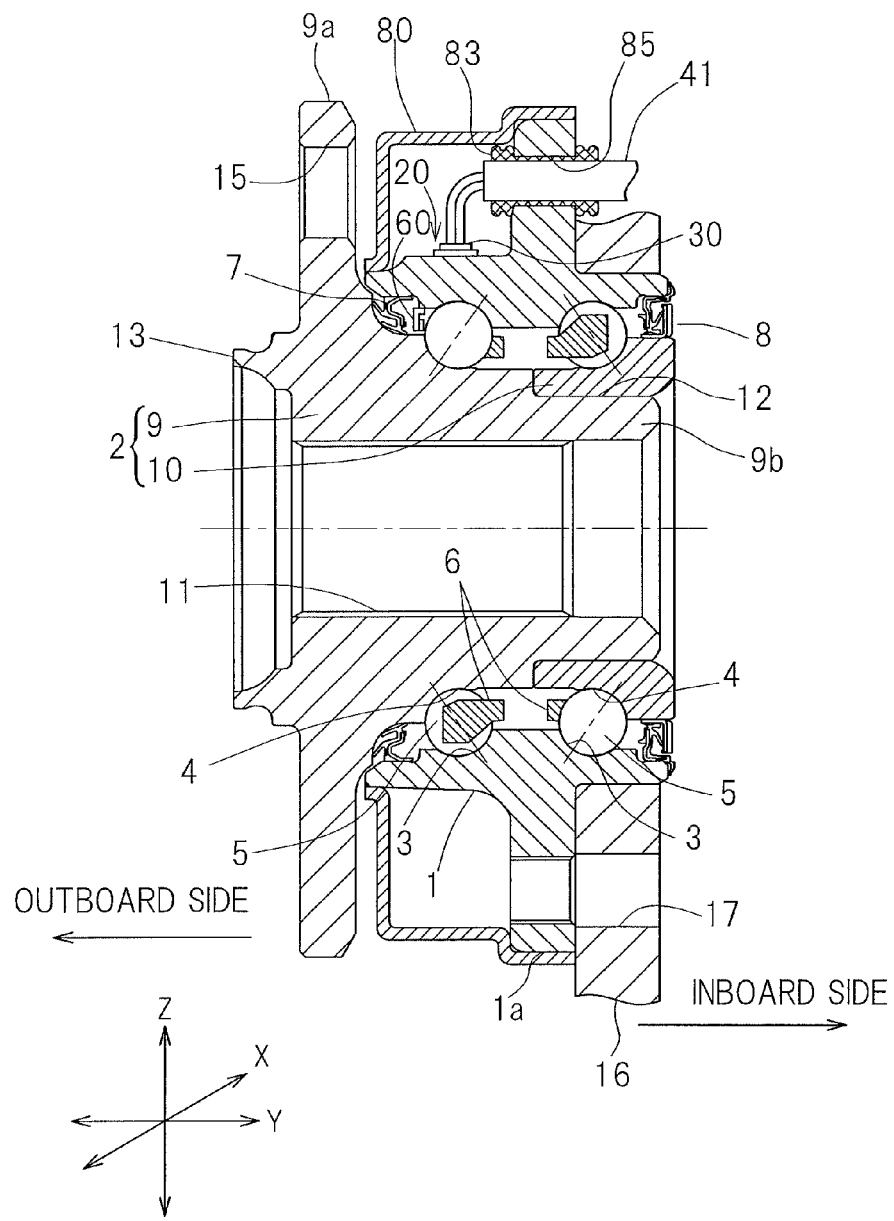
FIG. 26 is a longitudinal sectional view of the sensor equipped wheel support bearing assembly designed in accordance with a first applied mode of the present invention.
Figure 27:
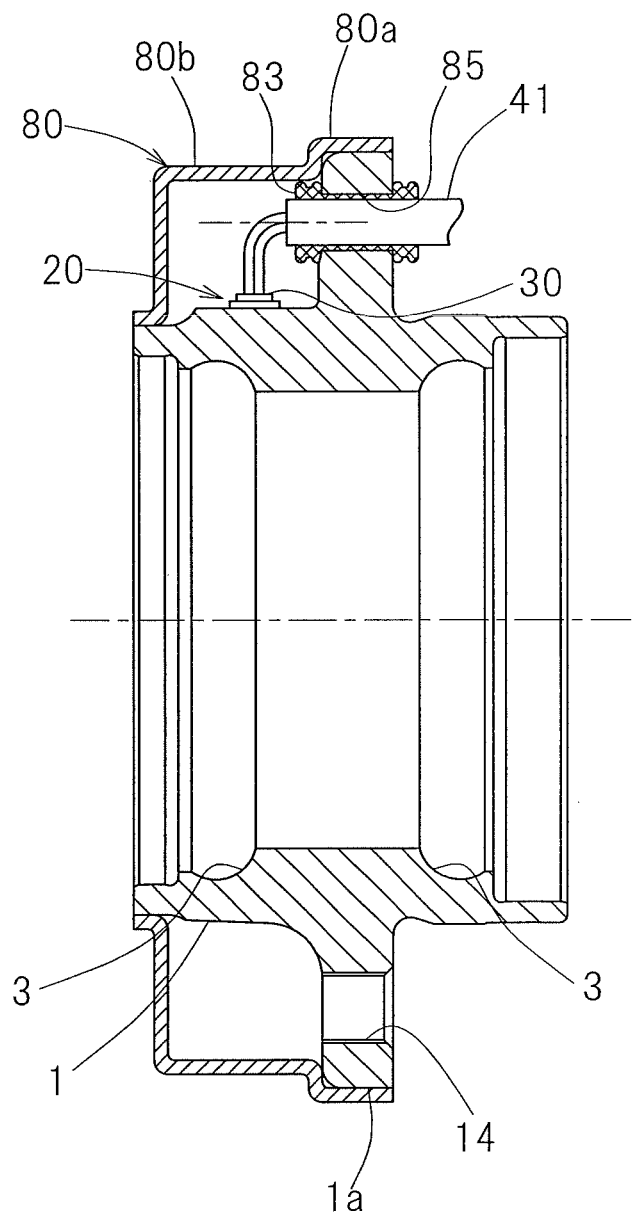
FIG. 27 is a longitudinal sectional view of the outer member used in the sensor equipped wheel support bearing assembly.
Figure 28:
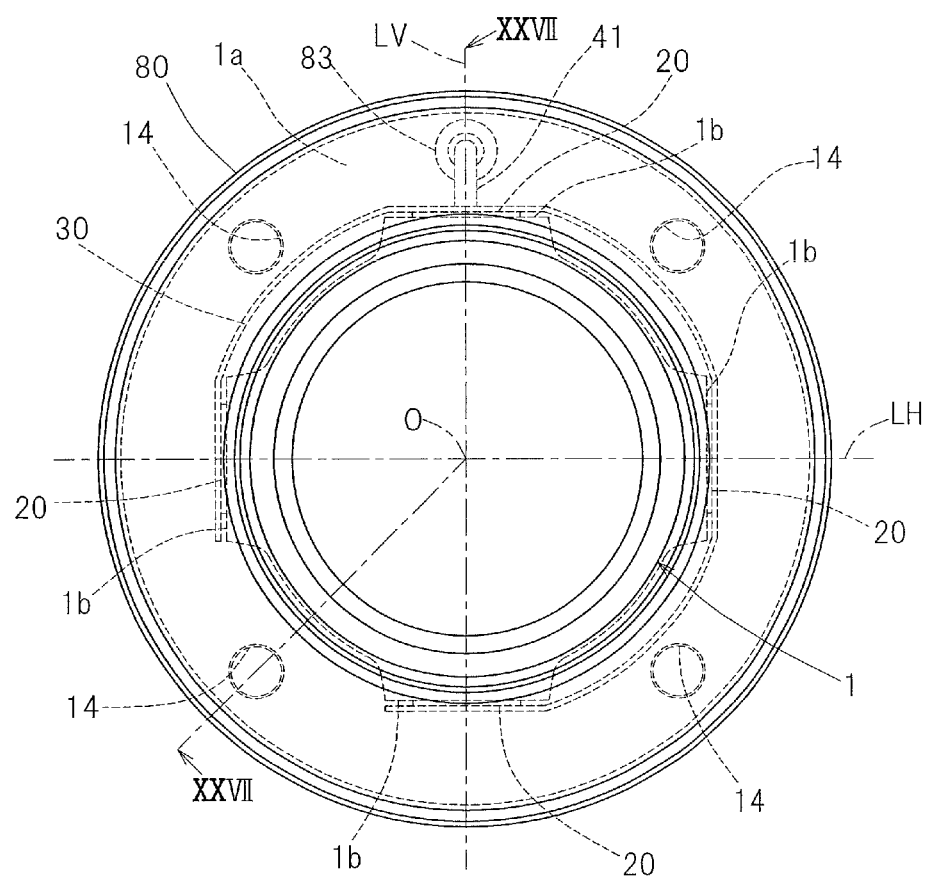
FIG. 28 is a front elevational view of the outer member as viewed from the outboard side.

As shown in FIGS. 26 and 27, in this applied mode, the calculation processing circuit 31 (shown in FIGS. 29A and 29B) for performing the calculation processing on the output signal of the sensor unit 20 and the signal cable 41 for drawing the output signal of the calculation processing circuit 31 to the outside of the bearing section are provided on the outboard side of the vehicle body fitting flange 1a of the outer periphery of the outer member 1; the throughhole 85 for the insertion of the signal cable is provided in the flange 1a; the signal cable 41 is drawn towards the inboard side by inserting it through the throughhole 85; and a bushing 83 made of an elastic material such as, for example, rubber is provided, as a preventive measure, in a portion of the signal cable 41 which pass through the throughhole 85. FIG. 28 is a front elevational view of the outer member 1 as viewed from the outboard side, and the signal cable 41 and the bushing 83 are positioned on the vertical line segment LV, which is a line segment extending perpendicular to the bearing axis O.

FIGS. 29A and 29B correspond to FIGS. 11A and 11B and illustrate a developed plan view and a sectional view, showing one example of arrangement of the sensor units 20 on the flexible substrate 30. In the case of this applied mode, together with the four sensor units 20, the calculation processing circuit 31 for processing the respective output signals of the strain sensors 22A and 22B thereof and electronic component parts including the signal cable 41 for drawing the output signal of the calculation processing circuit 31 to the outside of the bearing section are, together with the flexible substrate 30, connected with the flexible substrate 30 in a ring form to form the sensor assembly 48. The calculation processing circuit 31 is comprised of, for example, an integrated circuit chip. The ring shaped sensor assembly 48 so formed as described above is fitted to the outboard side of the flange 1a on the outer diametric surface of the outer member 1 in a fashion coaxial with the outer member 1. The calculation processing circuit 31 may, however, be formed integrally with the flexible substrate 30.

FIGS. 30A and 30B correspond to FIGS. 12A and 12B, respectively, showing a developed plan view and a sectional view of one example of arrangement of the sensor units 20 on the flexible substrate 30. As is the case with FIGS. 29A and 29B, even in this example of arrangement differs from that shown in FIGS. 12A and 12B, except for such a feature that the electronic component parts including the signal cable 41 for drawing the output signal of the calculation processing circuit 31 to the outside of the bearing section is connected in a ring form to form the sensor assembly 48, and other structural features are similar to those shown in and described with reference to FIGS. 12A and 12B.

FIGS. 31A and 31B illustrate a developed plan view and a sectional view, showing another example of arrangement of the sensor units 20 on the flexible substrate 30. In this example of arrangement, each of the sensor units 20 is separated from the flexible substrate 30 except for a connection with the wiring circuit 34 of the flexible substrate 30. Also, the flexible substrate 30 is of a design in which a fitting portion thereof, to which the calculation processing circuit 31 is fitted, is rendered to be a large width portion and the remaining portion thereof is rendered to be a narrow width portion with the sensor units 20 disposed at a side edge of the narrow width portion of the flexible substrate 30 so that the entire structure of arrangement will not increase in width. By so doing, the sensor assembly 48 can have a compact structure. Other structural features are identical with that shown in and described with reference to FIGS. 29A and 29B in connection with the example of arrangement.

FIGS. 32A and 32B correspond to FIGS. 13A and 13B, respectively, showing a developed plan view and a sectional view of a further example of arrangement of the sensor units 20 on the flexible substrate 30. In a manner similar to that shown in and described with reference to FIGS. 29A and 29B, the case of this example of arrangement differs from the arrangement shown in and described with reference to FIGS. 13A and 13B in that the electronic component parts including the signal cable 41 used to draw the output signal of the calculation processing circuit 31 to the outside of the bearing section are connected in a ring form to form the sensor assembly 48, but the remaining structural features are identical with those shown in and described with reference to FIGS. 13A and 13B.

The sensor assembly 48, including the previously described sensor units 20 fitted to the outboard side of the flange 1a in the outer diametric surface of the outer member 1, is enclosed by the protective covering 80 as shown in FIG. 26. The protective covering 80 is a tubular member enclosing the outer periphery of the outer member 1 and is more specifically of the stepped cylindrical shape comprised of the large diameter portion 80a at the inboard side half thereof and the reduced diameter portion 80b at the remaining outboard side half. This protective covering 80 has the inboard end, mounted on the outer diametric surface of the vehicle body fitting flange 1a, and the outboard end mounted on the outer diametric surface of the outboard end of the outer member 1. Since as hereinbefore described, the signal cable 41 in the sensor assembly 48 is passed through the throughhole 85, defined in the flange 1a of the outer member 1, and is then drawn outwardly towards the inboard side, the signal cable 41 will not interfere the protective covering 80 at the time the protective covering 80 is fitted onto the outer member 1 and, therefore, with the minimized number of procedures, the protective covering 80 can be fitted to the outer member 1.

Material for the protective covering 80 employed in the practice of this applied mode may be the same as or similar to that employed in the practice of the first embodiment of the present invention described hereinbefore.

The manner of assembling the sensor equipped wheel support bearing assembly according to this applied mode is similar to that according to the previously described embodiment and, therefore, the details there of are not reiterated for the sake of brevity, but differs therefrom in that particularly in this case the sensor assembly 40 including the sensor units 20, the flexible substrate 30 and the calculation processing circuit 31 inclusive of the signal cable 41 as the sensor assembly 48 and this sensor assembly 48 is enclosed by the protective covering 80.

The operation taking place when the load acts on between the tire of the vehicle wheel and the road surface is substantially similar to that described in connection with the previously described first embodiment and, therefore, the details thereof are not reiterated for the sake of brevity, but differs therefrom in that particularly since the throughhole 85 for the insertion of the signal cable therethrough is provided in the vehicle body fitting flange 1a of the outer member 1, which is the stationary ring and the signal cable 41 provided on the outboard side of the flange 1a of the outer diametric surface of the outer member 1 together with the calculation processing circuit 31 is drawn outwardly outwards the inboard side after it has been inserted through the throughhole 85, even where the tubular protective covering 80 enclosing the outer periphery of the outer member 1 is provided, the signal cable does not interfere with the protective covering 80, the fitting of the protective covering 80 can be accomplished easily and, therefore, not only is the structure compact and easy to assemble, but also the load imposed on the bearing of the vehicle wheel can be accurately detected.

Also, since the sensor assembly 48 including the sensor units 20 is enclosed by the protective covering 80, the plurality of the sensor units 20 and the other electronic component parts, forming respective parts of the sensor assembly 48, can be protected from the outside environment and the load acting on the wheel support bearing assembly or the tire tread can be accurately detected for a prolonged period of time while any undesirable trouble of the sensor units 20 and/or the other electronic component parts, which would otherwise be brought about by reason of the outside environment, is prevented. Since in this embodiment the bushing 83 made of an elastic material such as, for example, rubber as a preventive procedure is provided in that portion of the signal cable 41, where it extends through the throughhole 85 in the flange 1a of the outer member 1, the sealability of the protective covering 80 increases and an effect of protecting the plurality of the sensor units 20 and the other electronic component parts, forming the respective parts of the sensor assembly 48, increases further. In the case of this embodiment in which the outer member 1 is the stationary member, the fitting of the protective covering 80 onto the outer member 1 is easy to accomplish and the protection of the sensor units 20 and the other electronic component parts with the protective covering 80 is easily accomplished.

Figure 33:
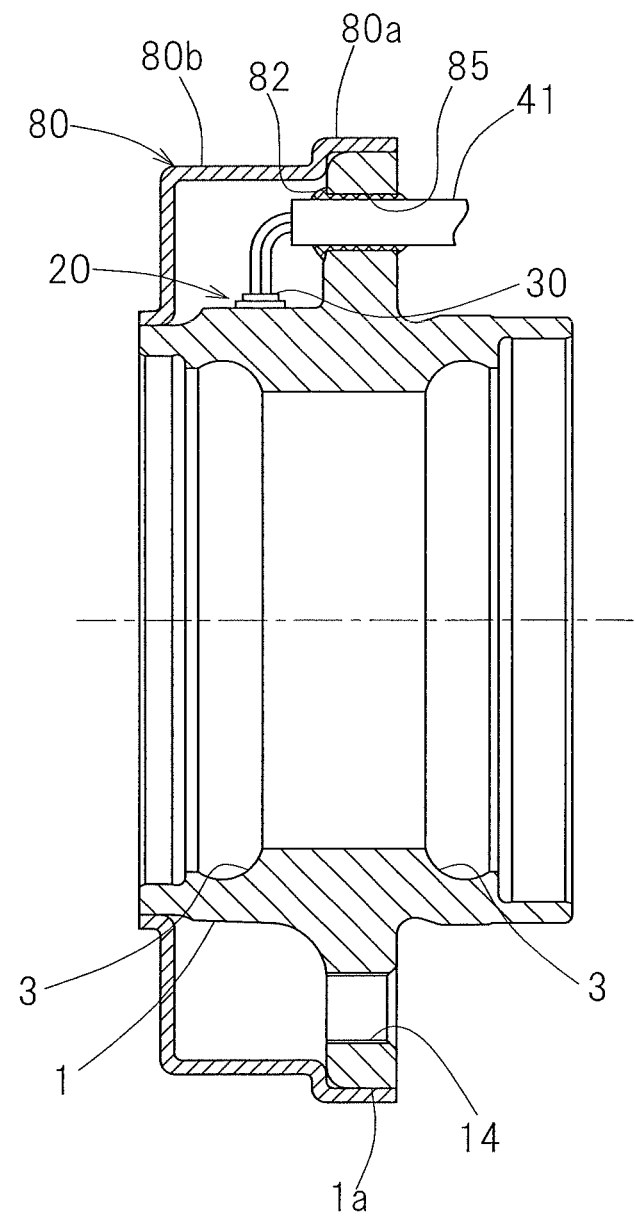
FIG. 33 is a longitudinal sectional view of the outer member used in the sensor equipped wheel support bearing assembly designed in accordance with a second applied mode of the present invention.
Figure 34:
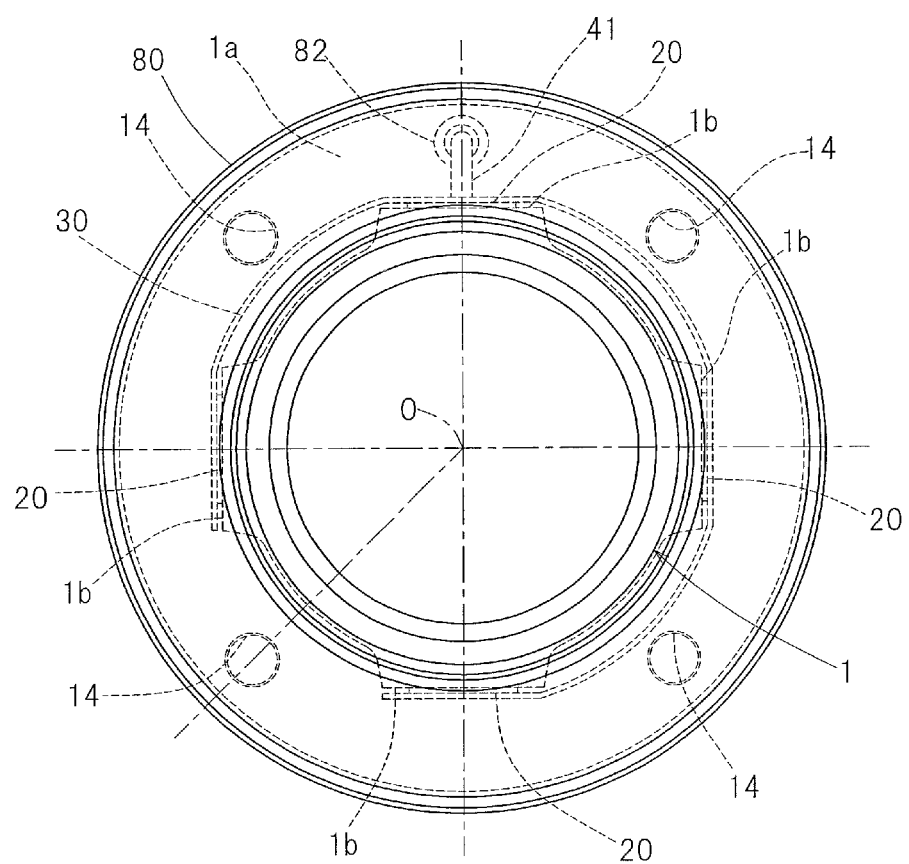
FIG. 34 is a front elevational view of the outer member as viewed from the outboard.

FIGS. 33 and 34 illustrate a second applied mode of the present invention. This sensor equipped wheel support bearing assembly is similar to that shown in and described with reference to FIG. 26 FIGS. 32A and 32B in connection with the previously described first applied mode, but differs therefrom in that a portion of the signal cable 41, which extends through the throughhole 85 in the flange 1a of the outer member 1, is coated with a sealing material 82. Other structural features thereof are identical with those of the embodiment shown in and described with reference to FIG. 26 to FIGS. 32A and 32B.

Even in the case of this applied mode, since the waterproofing treatment with the sealing material 82 is applied to the throughhole 85 in the flange 1a, the sealability of the protective covering 80 increases and the effect of protecting the plurality of the sensor units 20 and the other electronic component parts forming respective parts of the sensor assembly 48 from the outside environment increases.

Also, even in the case of the above described applied mode, as is the case with the previously described third embodiment of the present invention particularly shown in FIG. 21, the outer diametric surface of the outer member 1 may be formed with a surface treated layer 84 having a corrosion resistance or a corrosion preventive capability, in which case it is possible to avoid an undesirable raise of fitting sites of the sensor unit 20, the flexible substrate 30, the calculation processing circuit 31 and the protective covering 80 and others, which would be caused in the presence of rusting and to prevent the sensor unit 20, the flexible substrate 30 and the calculation processing circuit 31 from being adversely affected by adopted rusting and, therefore, an undesirable erroneous operation of the strain sensors 22A and 22B and others as a result of the presence of rusting can be eliminated, making it possible for the load detection to be accurately performed for a prolonged period of time.

A third applied mode of the present invention will now be described with particular reference to FIGS. 35 to 37. This applied mode pertains a sensor equipped wheel support bearing assembly of a type, in which the protection of the sensor units is assured and the reliability in detection is high, and component parts identical with or corresponding to those employed in the first embodiment shown in and described with particular reference to FIGS. 1 to 3 are designated by like reference numerals and the details thereof are not reiterated for the sake of brevity. According to this applied mode, the outer periphery of the outer member 1 is covered by the tubular protective covering 80 for enclosing the outer periphery of the outer member 1 and, together with this protective covering, a waterproof connector 86A for drawing output signals of the sensor units 20 or a signal which has been calculated and processed, to the outside of the bearing section is employed.

Figure 35:
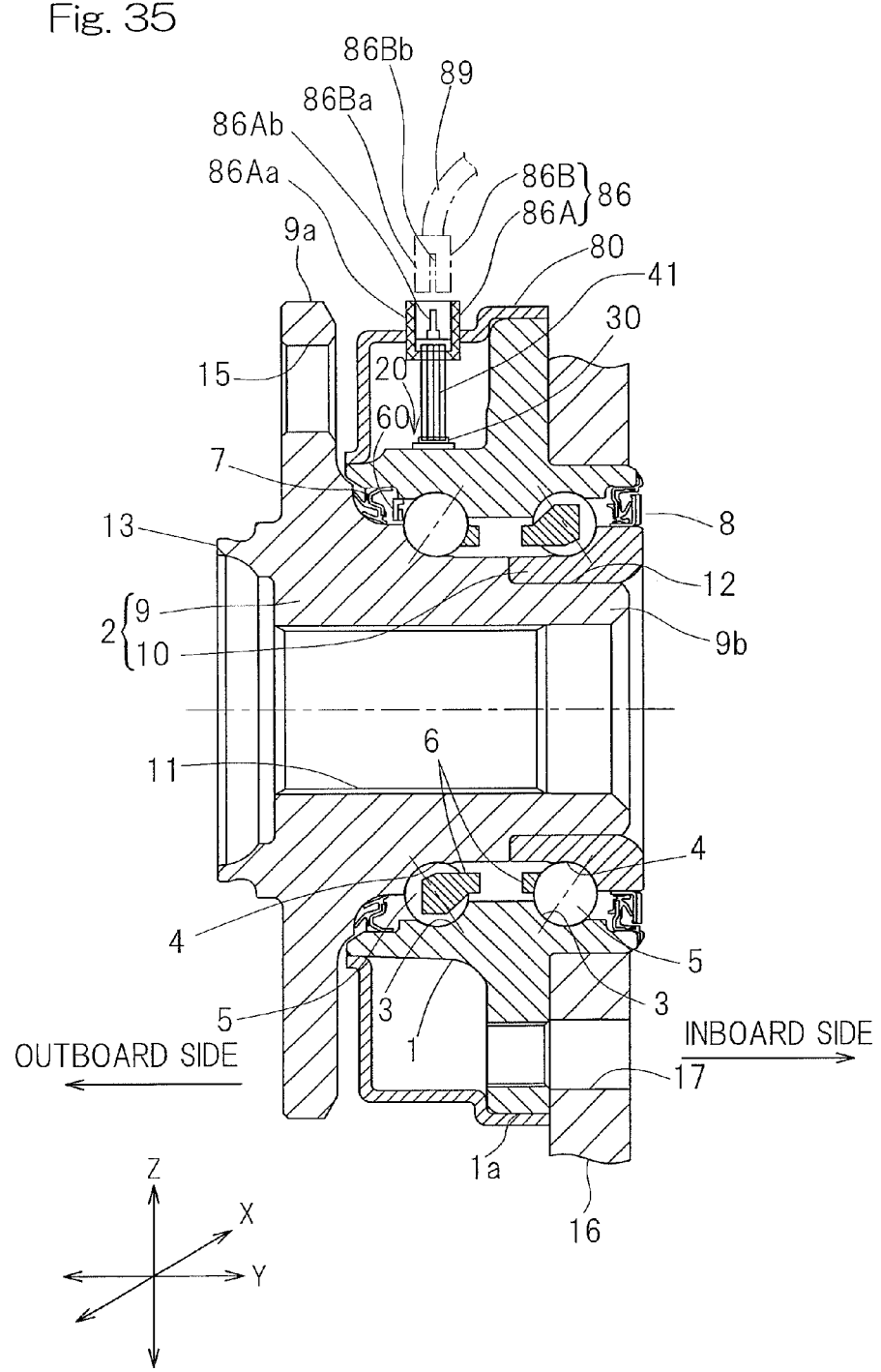
FIG. 35 is a longitudinal sectional view of the outer member used in the sensor equipped wheel support bearing assembly designed in accordance with a third applied mode of the present invention.
Figure 36:
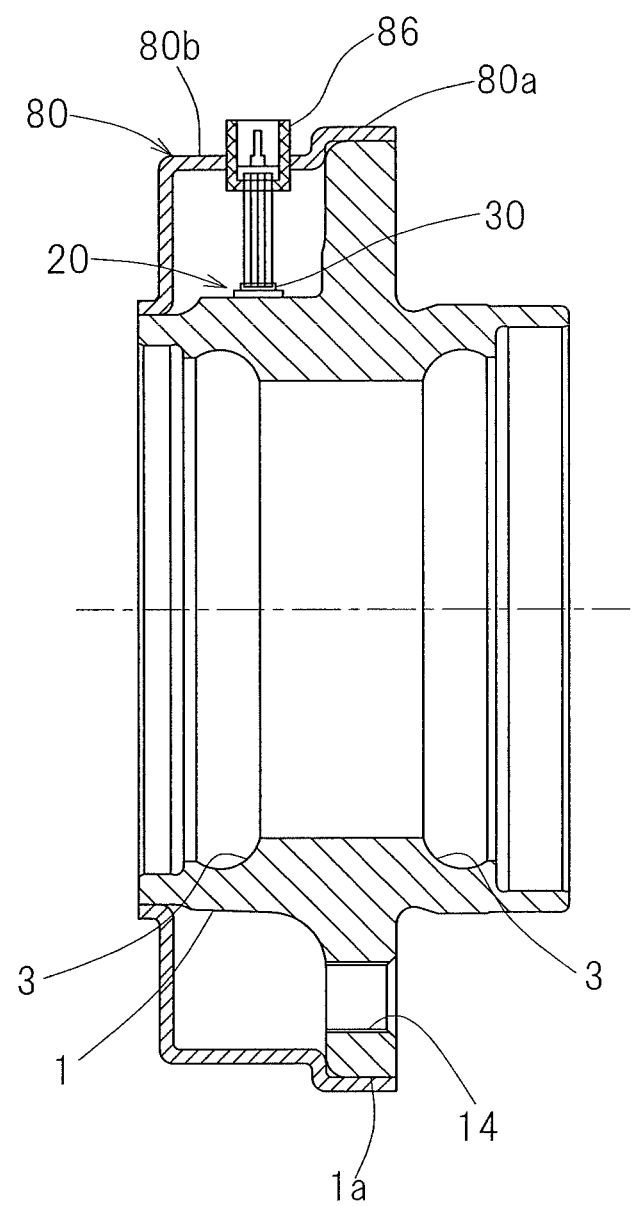
FIG. 36 is a longitudinal sectional view of the outer member used in the sensor equipped wheel support bearing assembly.
Figure 37:
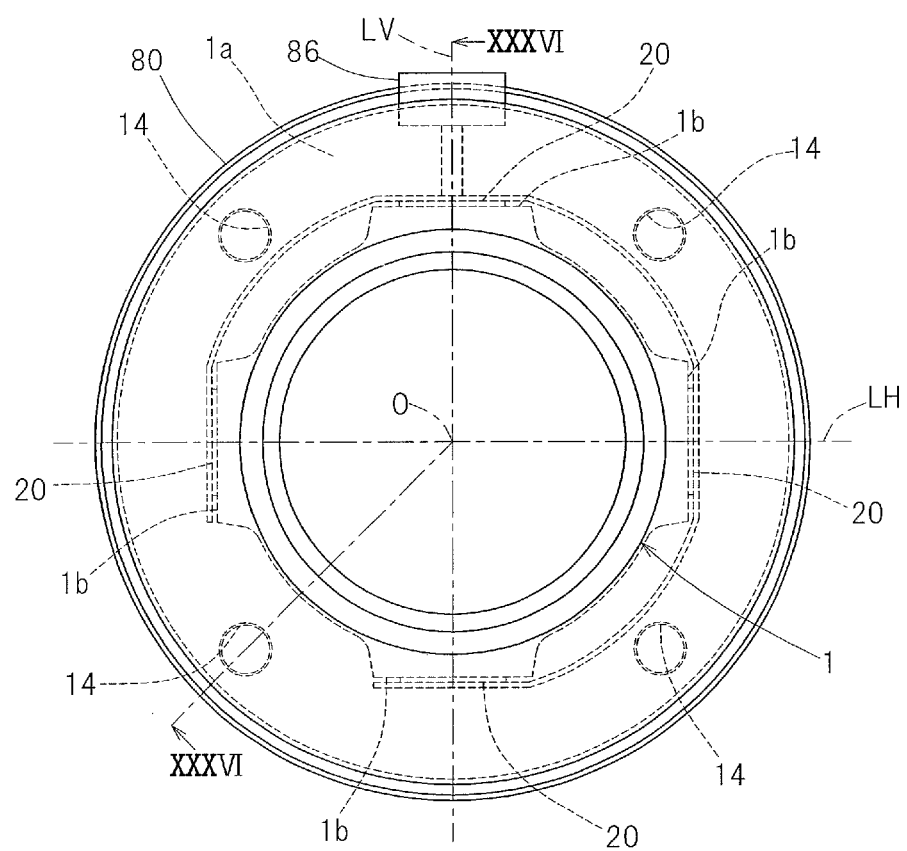
FIG. 37 is a front elevational view of the outer member as viewed from the outboard side.

The flexible substrate 30 employed in the sensor equipped wheel support bearing assembly shown in FIG. 35 is connected with, together with the four sensor units 20, the calculation processing circuit 31 for processing the respective output signals of the strain sensors 22A and 22B thereof and electronic component parts including, for example, the signal cable 41 for connecting output terminals of the calculation processing circuit 31 with the waterproof connector 86A (best shown in FIG. 35) in a ring form as shown in FIG. 37 to form the sensor assembly 48 as shown in FIGS. 29A and 29B. The calculation processing circuit 31 is comprised of, for example, an integrated circuit chip. The ring shaped sensor assembly 48 so formed as described above is fitted to the outboard side of the flange 1a on the outer diametric surface of the outer member 1 in a fashion coaxial with the outer member 1.

The waterproof connector 86A referred to above is a connector that forms a socket in a connector assembly 86 of a plug-in connection type comprised of a socket and a plug and is made up of a rectangular sectioned tubular connector main body 86A*a* having one end opening and a plurality of pin-type connecting terminals 86A*b* protruding outwardly from the bottom surface of the connector main body 86A*a*. The plurality of the connecting terminals 86A*b* may be either those fitted to a terminal plate and in turn to the connector main body 86A*a* through this terminal plate, or that fitted directly to the connector main body 86A*a*. The signal cable 41 referred to above is connected with the connecting terminals 86A*b*. In this connector 86A forming the socket, a connector 86B forming a plug is plugged in to finish the connection. The connector 86B forming the plug is provided at a tip of a cable 89 for signal drawing from the wheel support bearing assembly. The connector 86B forming the plug is made up of a connector main body 86B*a*, adapted to be inserted and engaged in the connector main body 86A*a* of the connector 86A forming the socket, and a plurality of connecting terminals 86B*b* provided within a recess, defined in a tip surface of the connector main body 86B*a* and adapted to be connected respectively with the connecting terminals 86A*b* of the connector 86A forming the socket. The connector 86A forming the socket referred to above is designed as a waterproof type in such a way that the connector main body 86A*a* may be so shaped as to be inserted with no gap in a peripheral surface of the connector main body 86B*a* of the connector 86B forming the plug and, therefore, no external water may ingress from a mating surface of both of the connectors 86A and 86B.

The sensor assembly 48 including the sensor units 20 fitted to the outer diametric surface of the outer member 1 is enclosed by the protective covering 80 as shown in FIG. 35. The shape and fitting of this protective covering 80 and the material therefor are substantially similar to those employed in the previously described first applied mode and, therefore, the details thereof are not reiterated for the sake of brevity.

Also, the protective covering 80 is provided integrally with the waterproof connector 86A for drawing the output signal of the calculation processing circuit 31 therethrough to the outside, and the calculation processing circuit 31 and the waterproof connector 86A are connected with each other through the signal cable 41. The waterproof connector 86A is integrated with the protective covering 80 by means of, for example, bonding or fusion bonding of the connector velum 86*a* to the protective covering 80. A work to connect the signal cable 41 with the waterproof connector 86A is carried out at the time the protective covering 80 is fitted to the outer member 1. In this applied mode, the calculation processing circuit for performing the calculation processing on the output signal of the sensor unit 20 is shown and described as provided on the outer periphery of the outer member 1 as well, but where the use of the calculation processing circuit 31 is dispensed with and the output signal of the sensor unit 20 is directly drawn to the outside of the bearing section so that the calculation processing of the output signal may be carried out on the side of the automotive vehicle body structure to achieve the load estimation, the output terminals of the sensor unit 20 are connected with the waterproof connector 86A through the signal cable 41.

It is to be noted that in this applied mode, the calculation processing circuit 31 may be molded integrally with the waterproof connector 86A and, alternatively, the waterproof connector 86A and the calculation processing circuit 31 may be integrally molded together by means of an injection molding technique. Where the calculation processing circuit 31 is molded with resin integrally together with the waterproof connector 86A, a work of connecting the calculation processing circuit 31 with the waterproof connector 86A at the time of fitting of the protective covering 80 can be dispensed with. Also, where the waterproof connector 86A and the calculation processing circuit 31 are formed integrally with each other by means of the injection molding technique, not only can the work of connecting the calculation processing circuit 31 with the waterproof connector 86A be dispensed with, but also those manufacturing steps can be simplified. In those cases, the connection between the sensor unit 20 and the calculation processing circuit 31 is to be carried out at the time the protective covering 80 is fitted onto the outer member 1, which is the stationary member.

Also, since the sensor assembly 48 including the plurality of the sensor unit 20 is enclosed by the tubular protective covering 80 enclosing the outer periphery of the outer member 1 that is the stationary member, the plurality of the sensor units 20 and the other electronic component parts, both forming respective part of the sensor assembly 48, can be protected from the outside environment and any undesirable trouble, which would occur in the sensor units 20 and/or the other electronic component parts because of the outside environment is avoided, allowing the load, acting on the bearing section and/or the tire tread, to be accurately detected for a prolonged period of time. In particular, since the use is made of the waterproof connector 86A for drawing to the outside of the bearing section the output signals of the sensor unit 20 or the signal thereof which has been calculated and processed, at the time of assemblage of the bearing assembly, with no need to perform a complicated work such as drawing the signal cable, connected with the calculation processing circuit 31 or the sensor unit 20, so that it will not interfere with the protective covering 80, the structure is compact and the assemblability is good and the load acting on the bearing section of the vehicle wheel can be accurately detected. In the case of this embodiment, in which the outer member 1 is the stationary member, fitting of the protective covering 80 onto the outer member 1 is easy to accomplish and the protection of the sensor unit 20 and/or the other electronic component parts with the protective covering 80 are easy to accomplish.

Figure 38:
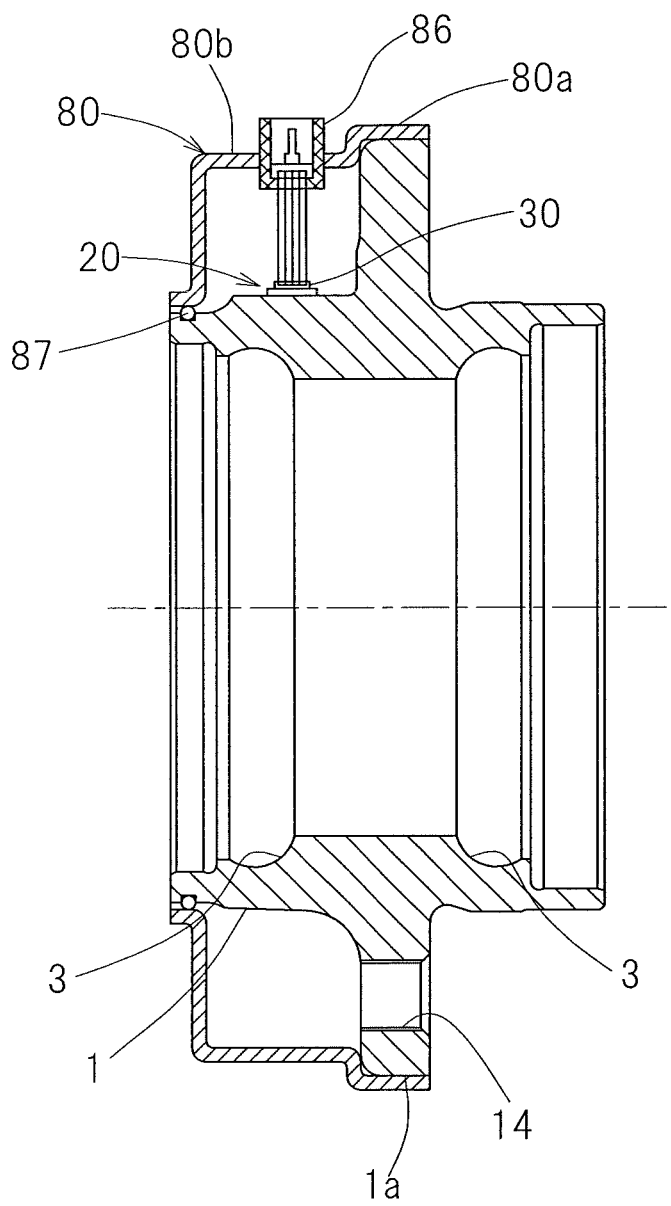
FIG. 38 is a longitudinal sectional view of the outer member used in the sensor equipped wheel support bearing assembly designed in accordance with a fourth applied mode of the present invention.
Figure 39:
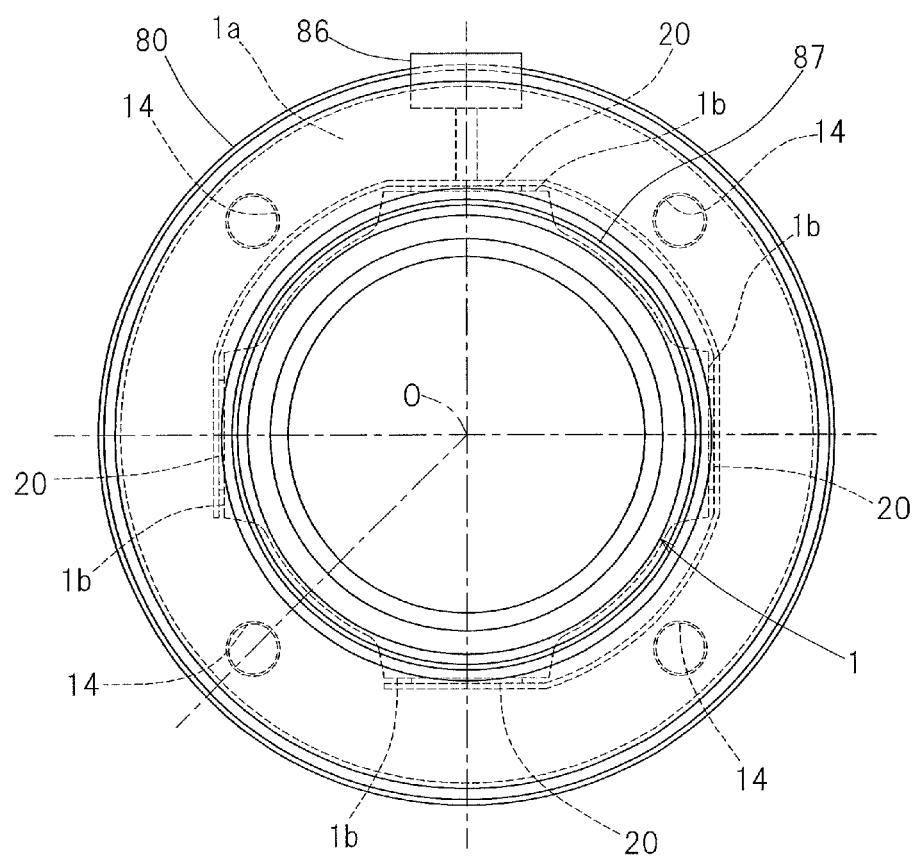
FIG. 39 is a front elevational view of the outer member as viewed from the outboard side.

FIGS. 38 and 39 illustrate a fourth applied mode of the present invention. The sensor equipped wheel support bearing assembly according to this fourth applied mode is similar to that shown in and described with reference to FIGS. 35 to 37 in connection with the previously described applied mode, but differs therefrom in that the outboard end of the protective covering 80 is fitted to the outer diametric surface of the outer member 1 through an O-ring 87. Other structural features thereof are similar to those shown in and described with reference to FIGS. 35 to 37 in connection with the previously described applied mode.

If the outboard end of the protective covering 80 is fitted to the outer diametric surface of the outer member 1 through the O-ring 87, the sealability of the outboard end of the protective covering 80 can be assured and the effect of protecting the sensor units 20 and the other electronic component parts with the protective covering 80 can be increased.

Figure 40:
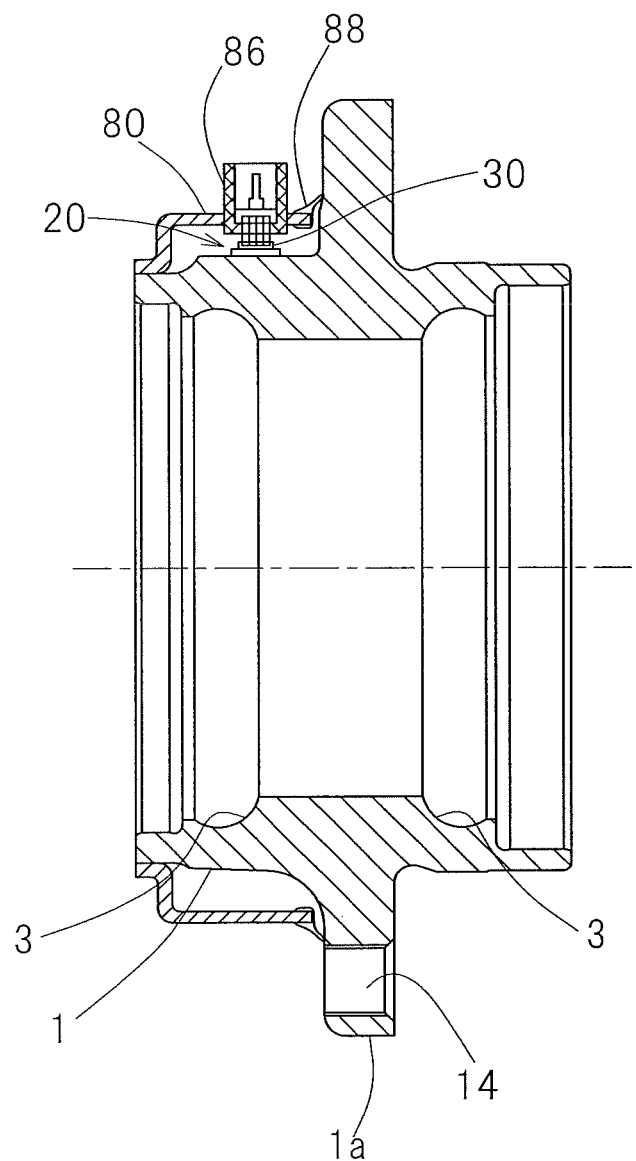
FIG. 40 is a longitudinal sectional view of the outer member used in the sensor equipped wheel support bearing assembly designed in accordance with a fifth applied mode of the present invention.
Figure 41:
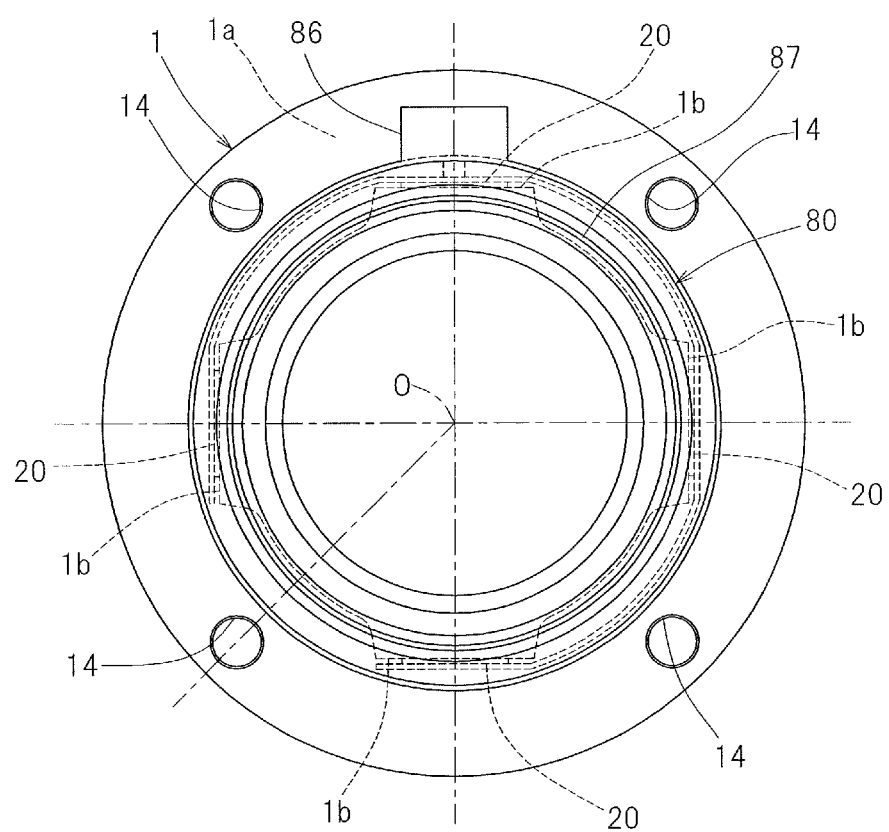
FIG. 41 is a front elevational view of the outer member as viewed from the outboard side.
Figure 42:
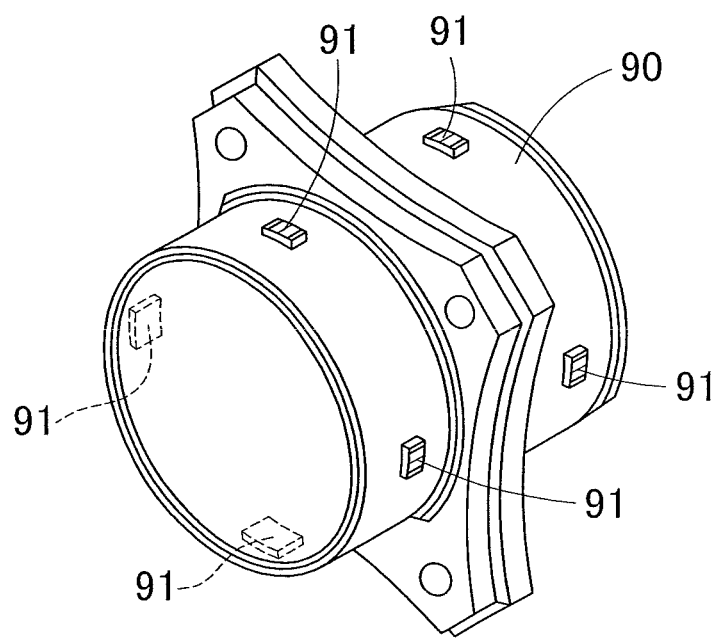
FIG. 42 is a perspective view showing the conventional example.
Figure 43:
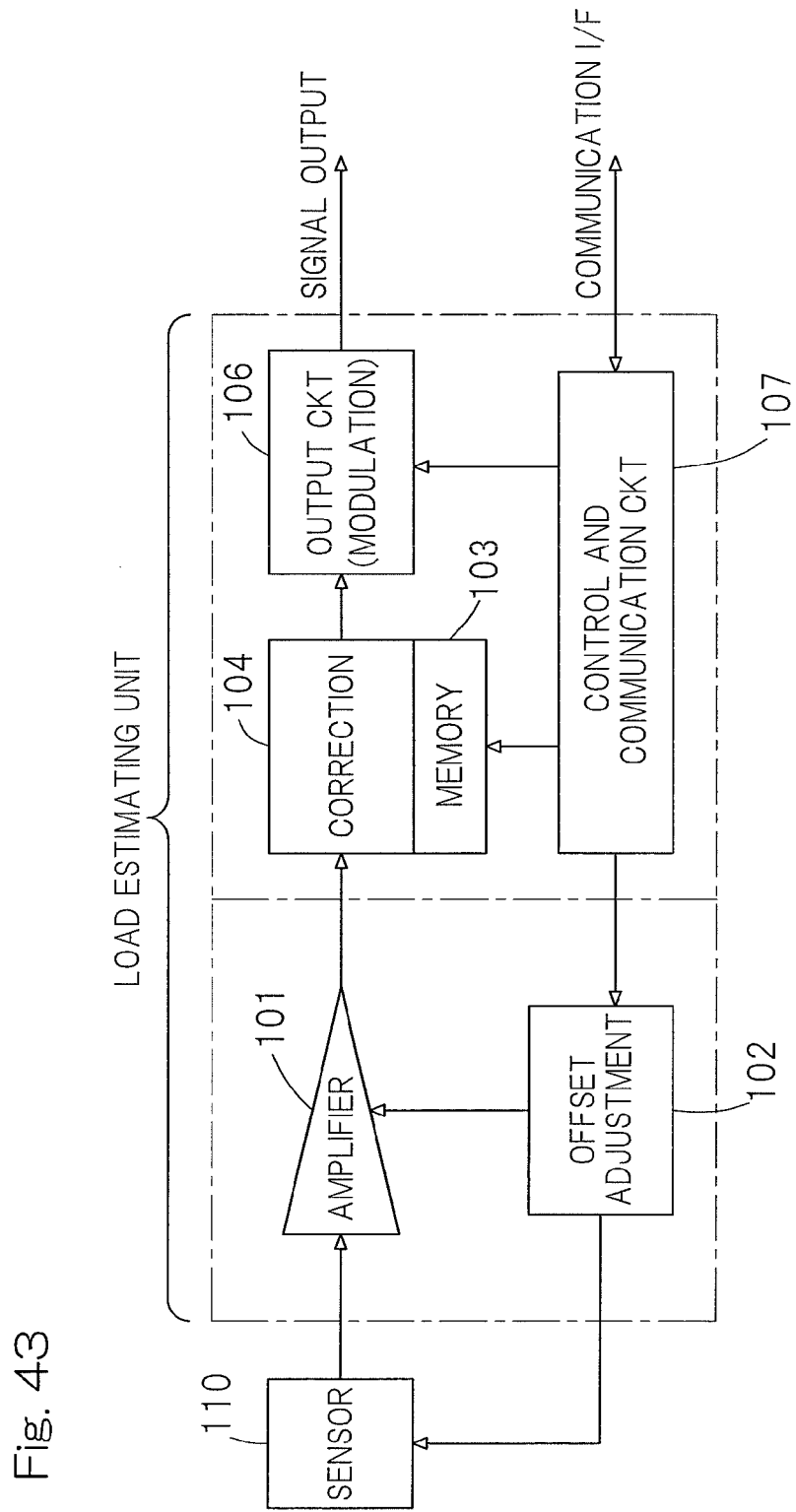
FIG. 43 is a block diagram showing a structural example of a detecting system used in the suggested example.
Figure 44:
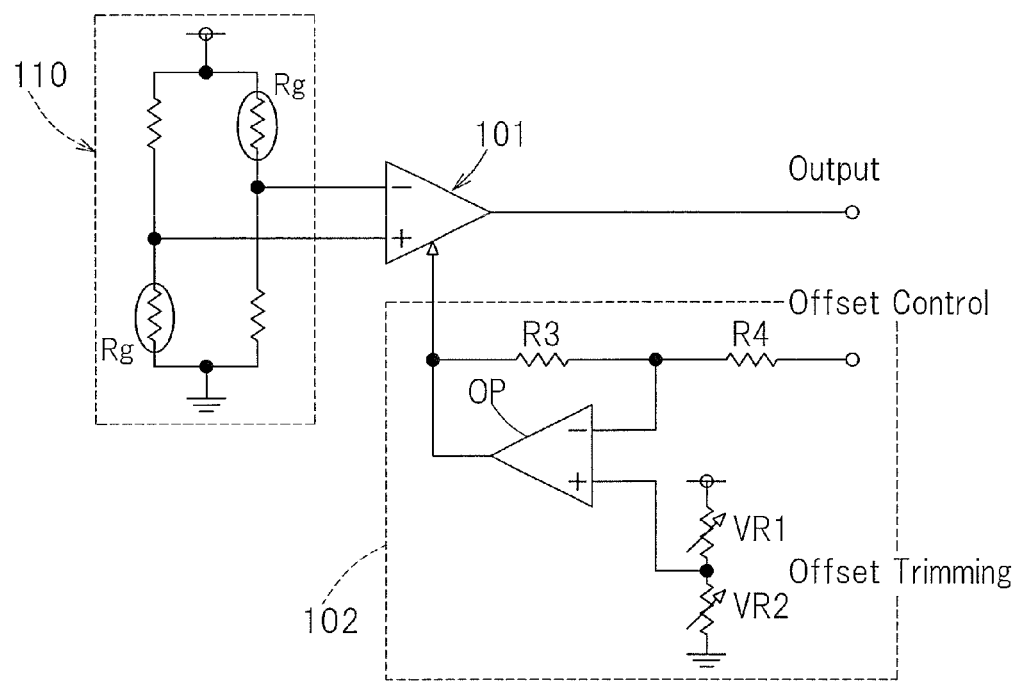
FIG. 44 is a diagram showing a specific circuit configuration of the amplifying circuit and the offset adjusting circuit both used in the detecting system.
Figure 45:
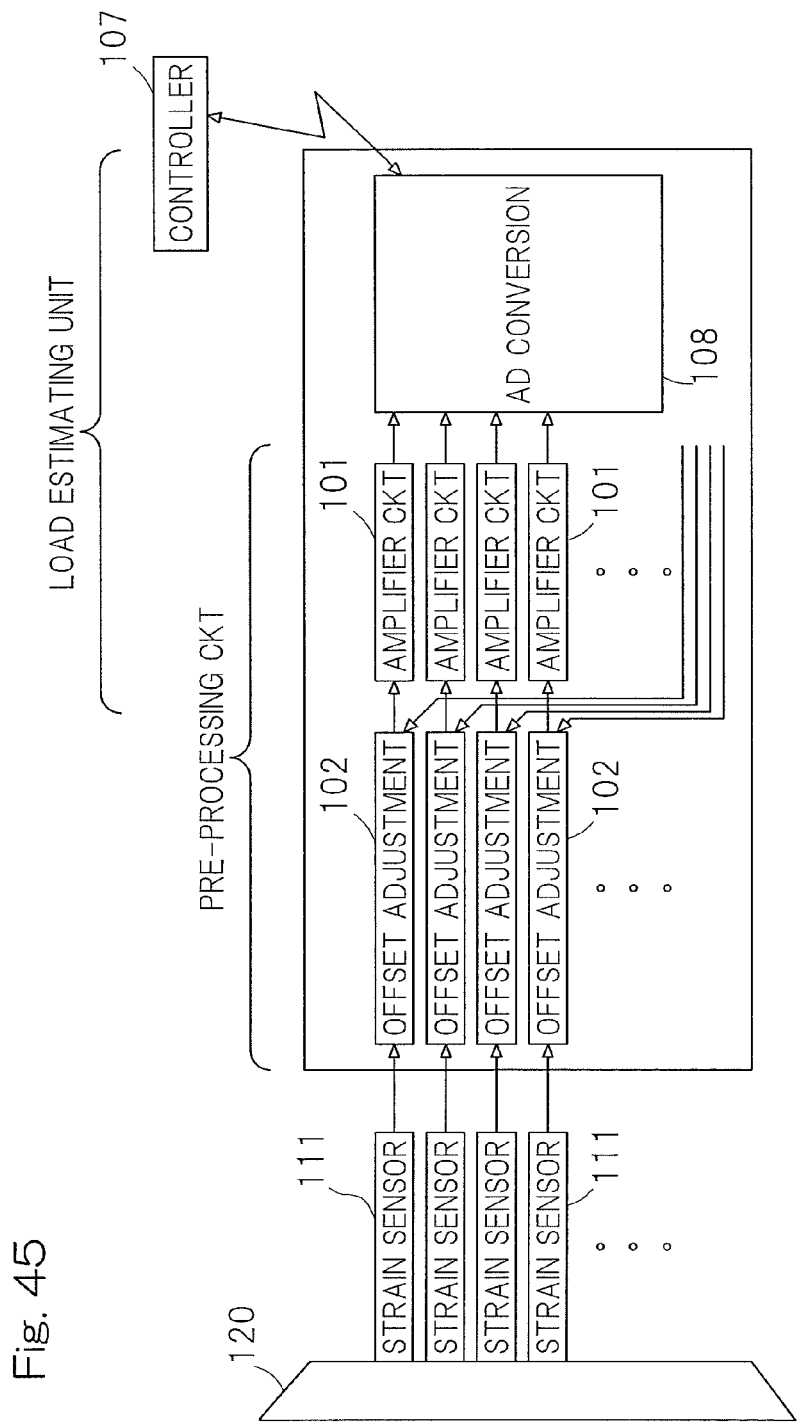
FIG. 45 is a block diagram showing a configuration of the detecting system when the number of sensors is increased in the suggested example.
Figure 46:
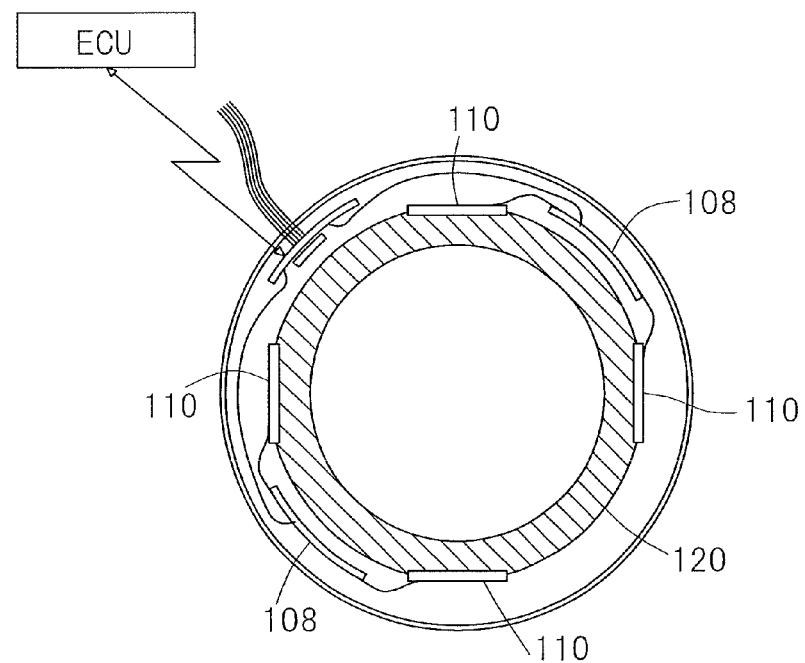
FIG. 46 is a sectional view showing one example of installation of the analog-to-digital converter in the suggested example.
Figure 47:
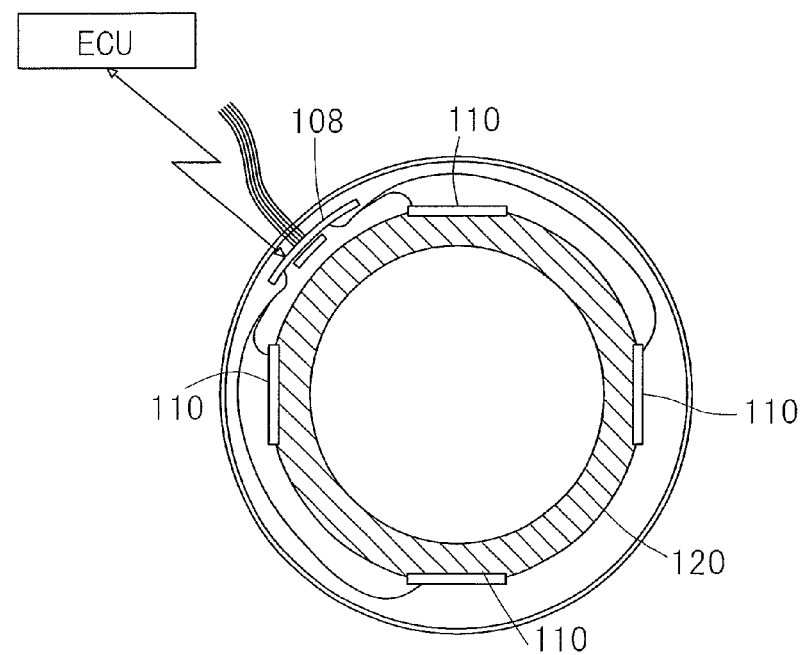
FIG. 47 is a sectional view showing another installing and structural example of the analog-to-digital converter in the suggested example.

FIGS. 40 and 41 illustrate a fifth applied mode. The sensor equipped wheel support bearing assembly according to this fourth applied mode is similar to that shown and described in connection with the applied mode of FIGS. 35 to 37, but differs therefrom in that the lip member 88 made of an annular elastic element along an open edge thereof is provided at the inboard end of the protective covering 80, which lip member 88 is held in abutment with the outboard oriented side face of the vehicle body fitting flange 1a of the outer member 1. In this case, the sealability of the inboard side of the protective covering 80 can be assured and the effect of protecting the sensor units 20 and the other electronic component parts with the protective covering 80 can be further increased.

The elastic element forming the lip member 88 is preferred to be a rubber material. Other than it, the lip member 88 may be formed integrally with the protective covering 80. In the instance as shown, the lip member 88 is so shaped as to be flared outwardly towards the inboard side. Accordingly, it is possible to assuredly avoid an ingress of muddy water or saline water from the inboard end into the protective covering 80. Other structural features than that are similar to those shown in and described with reference to FIGS. 35 to 37 in connection with the previously described applied mode.

In any one of the foregoing embodiments, the outer member 1 has been shown and described as serving the stationary member, but the present invention is not necessarily limited thereto and is equally applicable to the wheel support bearing assembly of a type, in which the inner member serves as the stationary member, and in this case, the sensor units 20 are provided on a peripheral surface, which will be an inner periphery of the inner member.

Also, in any one of those embodiments, the present invention has been shown and described as applied to the wheel support bearing assembly of the three generation type, but the present invention may be equally applied to the wheel support bearing assembly of the first or second generation type, in which the bearing section and the hub are members separate from each other and also to the wheel support bearing assembly of the fourth generation type, in which a part of the inner member is constituted by an outer ring of a constant velocity universal joint. In addition, this sensor equipped wheel support bearing assembly is applicable to the wheel support bearing assembly for the support of a vehicle driven wheel and also to the wheel support bearing assembly of any generation type in which tapered rollers are employed.

Hereinafter, some applied modes, which do not require which do not require such a feature that "the calculation processing circuit 31 for performing the calculation processing on the output signal of the sensor is fitted to the side face of the vehicle body fitting flange 1a through the circuit fixing stay 32 or is fitted directly to the side face of the vehicle body fitting flange in the form as mounted on the toric circuit substrate", will be described.

[Mode 1]

The sensor equipped wheel support bearing assembly according to this mode 1 is a wheel support bearing assembly for rotatably supporting a vehicle wheel relative to an automotive vehicle body, which bearing assembly includes an outer member having an inner periphery formed with a plurality of rows of rolling surfaces, an inner member having an outer periphery formed with rolling surfaces that are held in face to face relation with the previously described rolling surfaces, and a plurality of rows of rolling elements interposed between the rolling surfaces in the outer and inner members that are held in face to face relation with each other; a vehicle body fitting flange to be fitted to a knuckle being provided in an outer periphery of one of the outer and inner members which serves as a stationary member, and in which a plurality of sensor units for the load detection that is fixed to an outer peripheral surface of the stationary member, a calculation processing circuit for performing a calculation process on respective output signals of those sensor units, and a signal cable for drawing an output signal of the calculation processing circuit to the outside of a bearing section are provided on an outboard side of the flange in the outer periphery of the stationary member; a throughhole is provided in the flange for insertion of the signal cable therethrough; and the signal cable is, after having been passed through the throughhole, drawn outwardly towards an inboard side.

[Mode 2]

In the sensor equipped wheel support bearing assembly according to the mode 1 described above, a tubular protective covering for enclosing the outer periphery of the stationary member in a region ranging from the flange of the stationary member to the outboard end is provided and the sensor units, the calculation processing circuit and a portion of the signal cable are enclosed by this protective covering.

[Mode 3]

In the sensor equipped wheel support bearing assembly according to the mode 2 described above, a waterproofing treatment is applied between the throughhole in the flange and the signal cable.

[Mode 4]

In the sensor equipped wheel support bearing assembly according to the mode described above, the waterproofing treatment referred to above may be the provision of a bushing, made of an elastic material, in a portion of the signal cable, which extends through the throughhole in the flange.

[Mode 5]

In the sensor equipped wheel support bearing assembly according to the mode 3 described above, the waterproofing treatment referred to above may be the application of a sealing material to a portion of the signal cable, which extends through the throughhole in the flange.

[Mode 6]

A method of assembling the sensor equipped wheel support bearing assembly according to this mode 6 is an assembling method of the previously described sensor equipped wheel support bearing assembly, in which in a condition the stationary member stands alone or in a condition in which the rolling elements have been assembled into the stationary member, the sensor units, the calculation processing circuit and the signal cable are fitted to the stationary member and, after the protective covering has been further fitted to the outer periphery of the stationary member, the bearing section is assembled.

[Mode 7]

The sensor equipped wheel support bearing assembly according to this mode 7 is a wheel support bearing assembly for rotatably supporting a vehicle wheel relative to an automotive vehicle body, which bearing assembly includes an outer member having an inner periphery formed with a plurality of rows of rolling surfaces, an inner member having an outer periphery formed with rolling surfaces that are held in face to face relation with the previously described rolling surfaces, and a plurality of rows of rolling elements interposed between the rolling surfaces in the outer and inner members that are held in face to face relation with each other; a vehicle body fitting flange to be fitted to a knuckle being provided in an outer periphery of one of the outer and inner members which serves as a stationary member, and in which a plurality of sensor units for the load detection that is fixed to an outer peripheral surface of the stationary member are provided, those sensor units are enclosed by a tubular protective covering surrounding an outer periphery of the stationary member, and together with this protective covering a waterproofing connector is provided for drawing to the outside of a bearing section, output signals of the sensor units or a signal corresponding to the output signals which have been subjected to a calculation processing.

[Mode 8]

In the sensor equipped wheel support bearing assembly according to the mode 7 described above, an outboard end of the protective covering may be mounted on the outer peripheral surface of the stationary member, in which case a lip member made of an annular elastic element provided along an outboard end of the protective covering is held in abutment with an outboard oriented side face of the flange of the stationary member.

[Mode 9]

In the sensor equipped wheel support bearing assembly according to the mode 8 described above, the lip member may be formed integrally with the protective covering.

[Mode 10]

In the sensor equipped wheel support bearing assembly according to the mode 8 described above, the elastic element forming the lip member may be a rubber material.

[Mode 11]

In the sensor equipped wheel support bearing assembly according to the mode 8 described above, the lip member may be of a shape flaring outwardly towards an inboard side.

[Mode 12]

The method of assembling the sensor equipped wheel support bearing assembly according to the mode 6 described above is a method of assembling the sensor equipped wheel support bearing assembly analog-to-digital described in the mode 7 referred to above, in which in a condition the stationary member stands alone or in a condition in which the rolling elements have been assembled into the stationary member, the sensor units is fitted to a peripheral surface of the stationary member and, after the protective covering has been further fitted to the peripheral surface of the stationary member, the bearing section is assembled.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Outer member
1a . . . Vehicle body fitting flange
2 . . . Inner member
3, 4 . . . Rolling surface
5 . . . Rolling element
20 . . . Sensor unit
21 . . . Strain generating member
21a . . . Contact fixing segment
22, 22A, 22B . . . Strain sensor
30 . . . Flexible substrate
31 . . . Calculation processing circuit
32 . . . Circuit fixing stay
41 . . . Signal cable
41a . . . Signal cable draw-out portion
49 . . . Analog-to-digital converter
51 . . . Offset adjusting circuit
54 . . . Load estimation calculating circuit
71 . . . First load estimating unit
72 . . . Second load estimating unit
73 . . . Selector output unit
80 . . . Protective covering
81 . . . Perforated portion
82 . . . Sealing member
83 . . . Bushing
84 . . . Surface processed layer
85 . . . Throughhole
86A . . . Waterproof connector
88 . . . Lip member

What is claimed is:

1. A wheel support bearing assembly for rotatably supporting a vehicle wheel relative to an automotive vehicle body, which bearing assembly comprising:

an outer member having an inner periphery formed with a plurality of rows of rolling surfaces;

an inner member having an outer periphery formed with rolling surfaces that are held in face to face relation with the rolling surfaces of the outer member, one of the outer member and the inner member being a stationary member;

a plurality of rows of rolling elements interposed between the rolling surfaces in the outer and inner members that are held in face to face relation with each other;

a vehicle body fitting flange fitted to a knuckle, the vehicle body fitting flange being provided on and extending away from an outer periphery of the one of the outer and inner members that is the stationary member;

one or more sensor units for detecting a load provided on an outer diametric surface of the stationary member, each of the load detecting sensor units including a strain generating member, having two or more contact fixing segments that are to be fixed to the stationary member in contact therewith, and also including one or more sensors fitted to the strain generating member for detecting a strain occurring in the strain generating member;

a calculation processing circuit for calculating and processing an output signal of the sensor, the calculation processing circuit being fitted to a side face of the vehicle body fitting flange through a circuit fixing stay or fitted directly to the side face of the vehicle body fitting flange, the calculation processing circuit being mounted on an arcuate circuit substrate.

2. The sensor equipped wheel support bearing assembly as claimed in claim 1, wherein the outer member serves as the stationary member.

3. The sensor equipped wheel support bearing assembly as claimed in claim 1, wherein the calculation processing circuit is fitted to the side face of the vehicle body fitting flange through the circuit fixing stay, and the circuit fixing stay is a press molded article of a steel plate having a corrosion resistance.

4. The sensor equipped wheel support bearing assembly as claimed in claim 1, wherein the calculation processing circuit is fitted to the side face of the vehicle body fitting flange through the circuit fixing stay, and the circuit fixing stay is a press molded article of a steel plate which is plated with metal or painted.

5. The sensor equipped wheel support bearing assembly as claimed in claim 1, wherein the calculation processing circuit is fitted to the side face of the vehicle body fitting flange through the circuit fixing stay, and the circuit fixing stay and the calculation processing circuit are integrally molded with resin.

6. The sensor equipped wheel support bearing assembly as claimed in claim 1, wherein the calculation processing circuit is fitted to the side face of the vehicle body fitting flange through the circuit fixing stay, and the circuit fixing stay is formed by molding with resin.

7. The sensor equipped wheel support bearing assembly as claimed in claim 6, wherein the calculation processing circuit is fitted to the side face of the vehicle body fitting flange through the circuit fixing stay, and the calculation processing circuit is formed by insert-molding in the circuit fixing stay.

8. The sensor equipped wheel support bearing assembly as claimed in claim 1, wherein the calculation processing circuit includes a load estimating unit for estimating a load acting on the vehicle wheel from the output signal of the sensor.

9. The sensor equipped wheel support bearing assembly as claimed in claim 8, wherein the calculation processing circuit includes a first load estimating unit for estimating a load acting on a wheel support bearing assembly with the use of an average value of the output signal of the sensor, a second load estimating unit for estimating a load acting on the wheel support bearing assembly with the use of an amplitude value of the output signal of the sensor or the amplitude value and the average value, and a selector output unit for switching, selecting and outputting an estimated load value of one of the first and second load estimating units.

10. The sensor equipped wheel support bearing assembly as claimed in claim 9, wherein the sensor unit includes three or more contact fixing segments and two sensors, the two sensors being fitted between the neighboring first and second contact fixing segments and the neighboring second and third contact fixing segments, respectively, the spacing between the neighboring contact fixing segments or between the neighboring sensors in a circumferential direction of the stationary member being chosen to be {½+n (in which n represents an integer)} of an arrangement pitch of the rolling elements, the first and second load estimating units utilizing the sum of the respective output signals of the two sensors as the average value.

11. The sensor equipped wheel support bearing assembly as claimed in claim 1, further comprising a toric protective covering fitted to a peripheral surface of the stationary member in a fashion coaxial with the stationary member, wherein the sensor unit and the calculation processing circuit are enclosed by the protective covering.

12. The sensor equipped wheel support bearing assembly as claimed in claim 11, wherein the calculation processing circuit has fitted thereto a signal cable for drawing a signal, which has been processed by the calculation processing circuit, to an outside of a bearing and wherein a cylindrical portion of the protective covering on an outboard side of the vehicle body fitting flange is provided with a perforated portion through which a draw-out portion of the signal cable is drawn outwardly and in which a portion through which the signal cable draw-out portion is drawn outwardly from the perforated portion is applied with a sealing material.

13. The sensor equipped wheel support bearing assembly as claimed in claim 11, wherein the calculation processing circuit has fitted thereto a signal cable for drawing a signal, which has been processed by the calculation processing circuit, to an outside of a bearing and wherein a cylindrical portion of the protective covering on an outboard side of the vehicle body fitting flange is provided with a perforated portion through which a draw-out portion of the signal cable is drawn outwardly from the protective covering and in which a portion through which the signal cable draw-out portion is drawn outwardly from the perforated portion is provided with a bushing made of an elastic material.

14. The sensor equipped wheel support bearing assembly as claimed in claim 11, wherein the calculation processing circuit has fitted thereto a signal cable for drawing a signal, which has been processed by the calculation processing circuit, to an outside of a bearing and wherein a cylindrical portion of the protective covering on an outboard side of the vehicle body fitting flange is provided with a perforated portion through which a draw-out portion of the signal cable is drawn outwardly from the protective covering and in which a portion, through which the signal cable draw-out portion is drawn outwardly from the perforated portion, is applied with a sealing material subjected to a rust proofing treatment and is also provided with a bushing made of an elastic material.

15. The sensor equipped wheel support bearing assembly as claimed in claim 1, further comprising a flexible substrate fitted to a peripheral surface of the stationary member in a fashion coaxial with the stationary member and in which the calculation processing circuit is formed integrally with this flexible substrate.

16. The sensor equipped wheel support bearing assembly as claimed in claim 1, further comprising a flexible substrate fitted to a peripheral surface of the stationary member in a fashion coaxial with the stationary member and in which the sensor unit is fitted to the flexible substrate.

17. The sensor equipped wheel support bearing assembly as claimed in claim 1, wherein the one or more sensor units comprise four sensor units are equidistantly disposed on an upper surface area, a bottom surface area, a left surface area and a right surface area of the stationary member, which is an upper position, a lower position, a left position, and a right position relative to a tire tread, respectively, of the outer diametric surface of the outer member with a phase difference of 90° from each other in a circumferential direction of such outer diametric surface.

18. The sensor equipped wheel support bearing assembly as claimed in claim 1, wherein a surface treatment having a corrosion resistance or a corrosion preventive capability is applied to a peripheral surface of the stationary member, where the flange is provided.

19. A method of assembling the sensor equipped wheel support bearing assembly as defined in claim 11, wherein in a condition the stationary member stands alone or in a condition in which the rolling elements have been assembled into the stationary member, the sensor units are fitted to a peripheral surface of the stationary member and, after the protective covering has been fitted to the peripheral surface of the stationary member, the bearing is assembled.

* * * * *